US012608555B2

(12) United States Patent
Galvin

(10) Patent No.: US 12,608,555 B2
(45) Date of Patent: Apr. 21, 2026

(54) SYSTEMS AND METHODS FOR LATENT HYPERSPACE NAVIGATION IN SPATIOTEMPORAL MEDIA

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/326,730

(22) Filed: Sep. 12, 2025

(65) Prior Publication Data

US 2026/0010728 A1 Jan. 8, 2026

Related U.S. Application Data

(63) Continuation-in-part of application No. 19/321,173, filed on Sep. 6, 2025, which is a continuation-in-part (Continued)

(51) Int. Cl.
G06F 40/30 (2020.01)
G06F 16/332 (2019.01)
(Continued)

(52) U.S. Cl.
CPC .......... *G06F 40/30* (2020.01); *G06F 16/3325* (2019.01); *G06F 16/3329* (2019.01)

(58) Field of Classification Search
CPC ...... G06N 20/00; G06N 3/0475; G06N 3/088; G06F 40/30; G06T 5/60
See application file for complete search history.

(56) References Cited

U.S. PATENT DOCUMENTS 7,629,922 B2    12/2009  Winstead et al.
7,876,257 B2    1/2011   Vetro et al.
(Continued)

FOREIGN PATENT DOCUMENTS

AU    2021105030 A4 *  6/2022  ............. G06F 40/30
CN    112732939 A  *   4/2021  ............... G06N 5/04
(Continued)

OTHER PUBLICATIONS

Moing et al., CCVS: Context-aware Controllable Video Synthesis, journal={Advances in Neural Information Processing Systems}, vol. 34, pp. 14042-14055, year={2021} (Year: 2021).*

(Continued)

*Primary Examiner* — Lamont M Spooner
(74) *Attorney, Agent, or Firm* — GALVIN PATENT LAW LLC; Brian R. Galvin

(57) ABSTRACT

A system and method for latent hyperspace navigation in spatiotemporal media using hierarchical and Lorentzian autoencoders. The system compresses spatiotemporal media into navigable latent representations while preserving geometric and semantic relationships through tensor structure maintenance. A latent hyperspace manager organizes compressed representations as geodesic trajectories within a geometric manifold structure based on differential geometry principles. A geodesic trajectory mapper computes optimal navigation paths through the high-dimensional space, while symbolic anchors positioned at semantically significant locations serve as persistent reference points. Spatiotemporal routing protocols manage navigation decisions across multiple temporal scales. A strategy caching system preserves successful navigation patterns for reuse, enabling continuous learning. The system generates synthetic content during navigation to support infinite zoom capability, allowing exploration beyond original media boundaries. Cross- (Continued)

modal fusion combines diverse input modalities into unified representations, applicable to immersive media exploration, scientific visualization, and surveillance analysis.

20 Claims, 38 Drawing Sheets

Related U.S. Application Data of application No. 19/284,115, filed on Jul. 29, 2025, application No. 19/326,730 is a continuation-in-part of application No. 19/245,366, filed on Jun. 22, 2025, now Pat. No. 12,418,680, and a continuation-in-part of application No. 19/204,525, filed on May 10, 2025, which is a continuation-in-part of application No. 19/192,215, filed on Apr. 28, 2025, said application No. 19/284,115 is a continuation of application No. 19/051,193, filed on Feb. 12, 2025, now Pat. No. 12,387,050, said application No. 19/192,215 is a continuation-in-part of application No. 18/972,797, filed on Dec. 6, 2024, now Pat. No. 12,294,392, which is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(60) Provisional application No. 63/847,889, filed on Jul. 21, 2025, provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,101, filed on Jul. 19, 2025.

(51) Int. Cl.

| | | |
|---|---|---|
| *G06F 16/3329* | (2025.01) | |
| *G06N 3/08* | (2023.01) | |
| *G06T 7/00* | (2017.01) | |

(56) References Cited

U.S. PATENT DOCUMENTS

| | | | | |
|---|---|---|---|---|
| 11,234,006 | B2 | 1/2022 | Wang et al. | |
| 11,436,246 | B2 * | 9/2022 | Lee ........................ | G16H 10/20 |
| 11,656,353 | B2 | 5/2023 | Li et al. | |
| 11,729,406 | B2 | 8/2023 | Habibian et al. | |
| 11,915,690 | B1 | 2/2024 | Chang et al. | |
| 2018/0018557 | A1 * | 1/2018 | Esser ..................... | G06N 3/049 |
| 2019/0179896 | A1 * | 6/2019 | Anisimovich ......... | G06N 3/084 |
| 2019/0325342 | A1 * | 10/2019 | Sikka ........................ | G06N 3/08 |
| 2020/0272605 | A1 | 8/2020 | More | |
| 2020/0404340 | A1 | 12/2020 | Xu et al. | |
| 2021/0027862 | A1 * | 1/2021 | Wei ........................ | G06N 20/00 |
| 2022/0246158 | A1 | 8/2022 | Nam et al. | |
| 2022/0318831 | A1 * | 10/2022 | Marvaniya ............. | G06N 5/022 |
| 2023/0142467 | A1 * | 5/2023 | Kaplanyan ................ | G06T 1/20 |
| | | | | 345/592 |
| 2023/0177281 | A1 * | 6/2023 | Kamath ................. | G06N 3/091 |
| | | | | 704/2 |
| 2023/0229722 | A1 * | 7/2023 | Ishii ........................ | G06F 40/20 |
| | | | | 345/419 |
| 2024/0036599 | A1 * | 2/2024 | Bowen ................. | G06N 3/0675 |
| 2024/0046318 | A1 * | 2/2024 | Muriqi .............. | G06Q 30/0277 |
| 2024/0126811 | A1 * | 4/2024 | Law ..................... | G06F 16/9024 |
| 2024/0386015 | A1 * | 11/2024 | Crabtree ............. | G06F 16/9024 |
| 2025/0156633 | A1 * | 5/2025 | Auchar ................. | G06N 3/084 |
| 2025/0165865 | A1 * | 5/2025 | Ardis ..................... | G06N 5/045 |
| 2025/0259043 | A1 * | 8/2025 | Crabtree ............... | G06N 3/047 |
| 2025/0259085 | A1 * | 8/2025 | Crabtree ............... | G06N 5/043 |
| 2025/0259724 | A1 * | 8/2025 | Crabtree ............... | G16H 50/50 |
| 2025/0306680 | A1 * | 10/2025 | Zhou ........................ | G06F 3/015 |
| 2025/0363593 | A1 * | 11/2025 | Li ........................... | G06F 40/30 |
| 2025/0371354 | A1 * | 12/2025 | Kamkari ............... | G06N 3/088 |
| 2026/0023955 | A1 * | 1/2026 | Fortkort .............. | G06N 3/0455 |
| 2026/0044212 | A1 * | 2/2026 | Zhou ........................ | G06F 3/015 |
| 2026/0046317 | A1 * | 2/2026 | Crabtree ................. | H04L 63/20 |

FOREIGN PATENT DOCUMENTS

| | | | | | |
|---|---|---|---|---|---|
| CN | 112905807 | A | * | 6/2021 | ............. G06N 20/00 |
| CN | 113297395 | B | * | 9/2021 | ............. G06F 40/30 |
| CN | 114860884 | A | * | 8/2022 | ............. G06N 5/02 |
| CN | 116311503 | B | * | 12/2025 | ............. G06N 3/084 |

OTHER PUBLICATIONS

Vlontzos, title={Causal future prediction in a minkowski space-time}, journal={arXiv preprint arXiv:2008.09154}, year={2020}, pp. 1-15 (Year: 2020).*

Cai, Yuanhao et al; "Mask-guided Spectral-wise Transformer for Efficient Hyperspectral Image Reconstruction", Conference on Computer Vision and Pattern Recognition, pp. 17502-17511, 2022.

Cai, Yuanhao et al; "MST++: Multi-stage Spectral-wise Transformer for Efficient Spectral Reconstruction", Conference on Computer Vision and Pattern Recognition, 2022.

He, Kaiming et al; "Deep Residual Learning for Image Recognition", Conference on Computer Vision and Pattern Recognition, pp. 770-778, 2016.

* cited by examiner

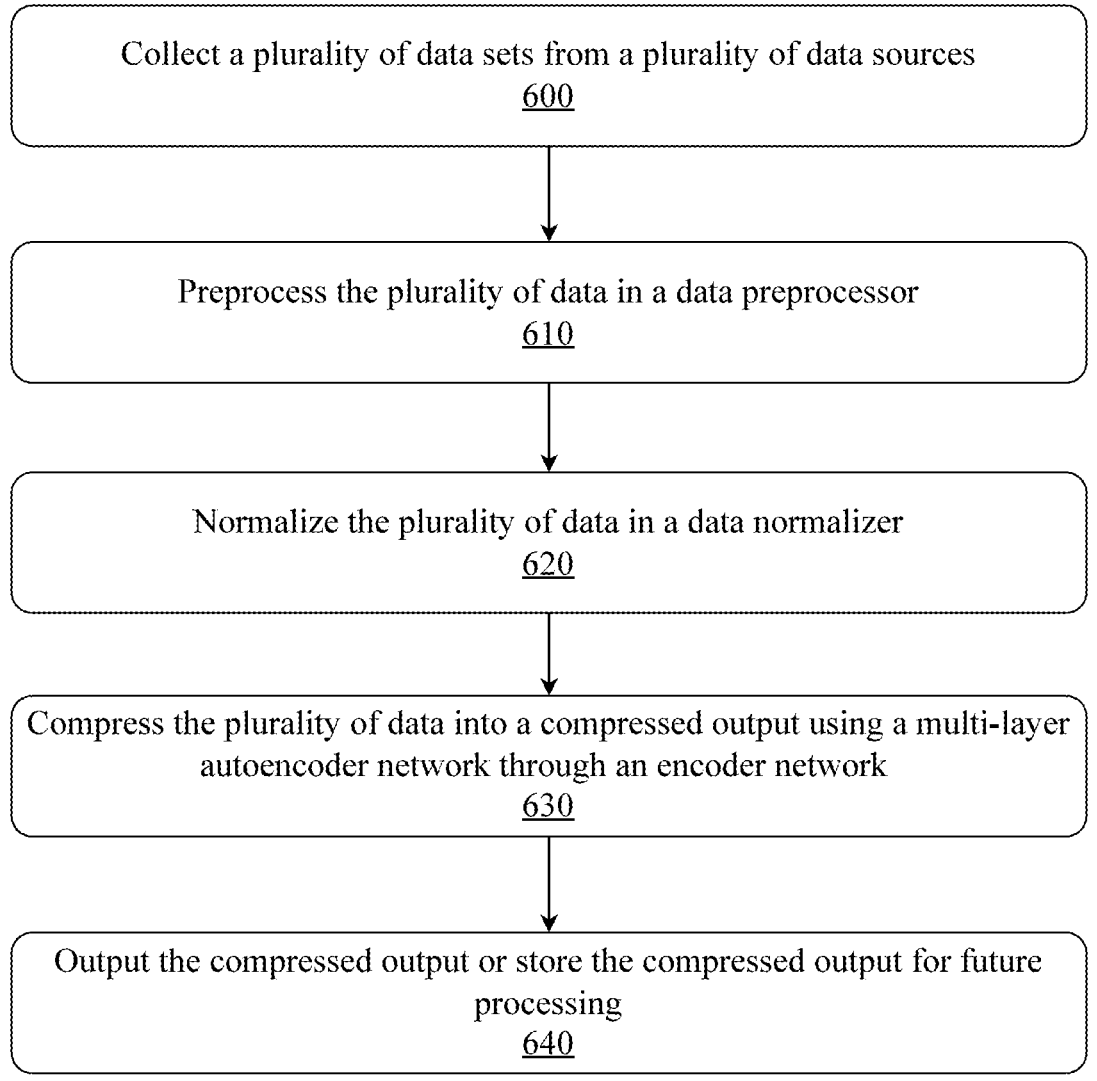

Collect a plurality of data sets from a plurality of data sources
600

Preprocess the plurality of data in a data preprocessor
610

Normalize the plurality of data in a data normalizer
620

Compress the plurality of data into a compressed output using a multi-layer autoencoder network through an encoder network
630

Output the compressed output or store the compressed output for future processing
640

FIG. 6

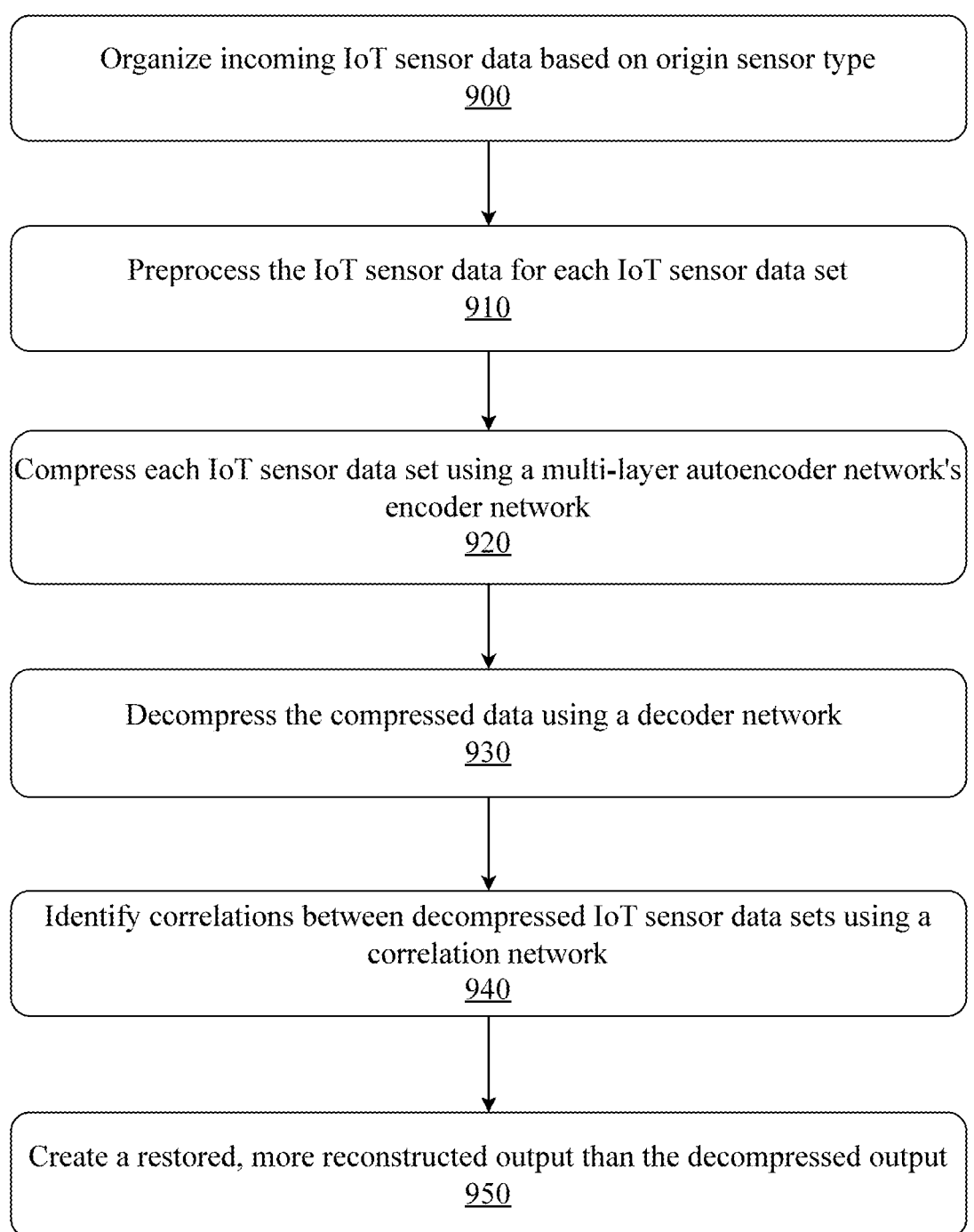

Organize incoming IoT sensor data based on origin sensor type
900

Preprocess the IoT sensor data for each IoT sensor data set
910

Compress each IoT sensor data set using a multi-layer autoencoder network's encoder network
920

Decompress the compressed data using a decoder network
930

Identify correlations between decompressed IoT sensor data sets using a correlation network
940

Create a restored, more reconstructed output than the decompressed output
950

FIG. 9

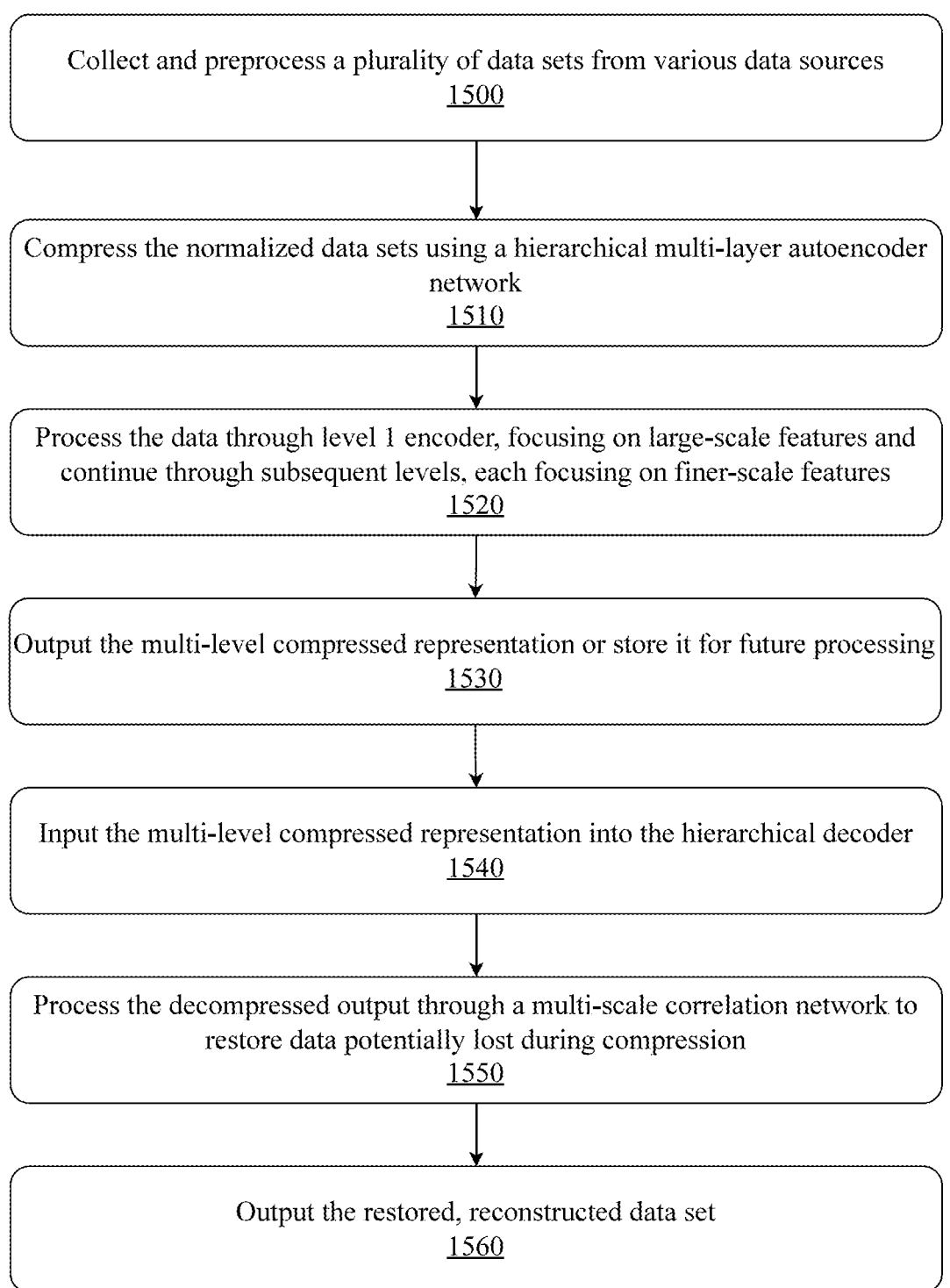

Collect and preprocess a plurality of data sets from various data sources
1500

Compress the normalized data sets using a hierarchical multi-layer autoencoder network
1510

Process the data through level 1 encoder, focusing on large-scale features and continue through subsequent levels, each focusing on finer-scale features
1520

Output the multi-level compressed representation or store it for future processing
1530

Input the multi-level compressed representation into the hierarchical decoder
1540

Process the decompressed output through a multi-scale correlation network to restore data potentially lost during compression
1550

Output the restored, reconstructed data set
1560

FIG. 15

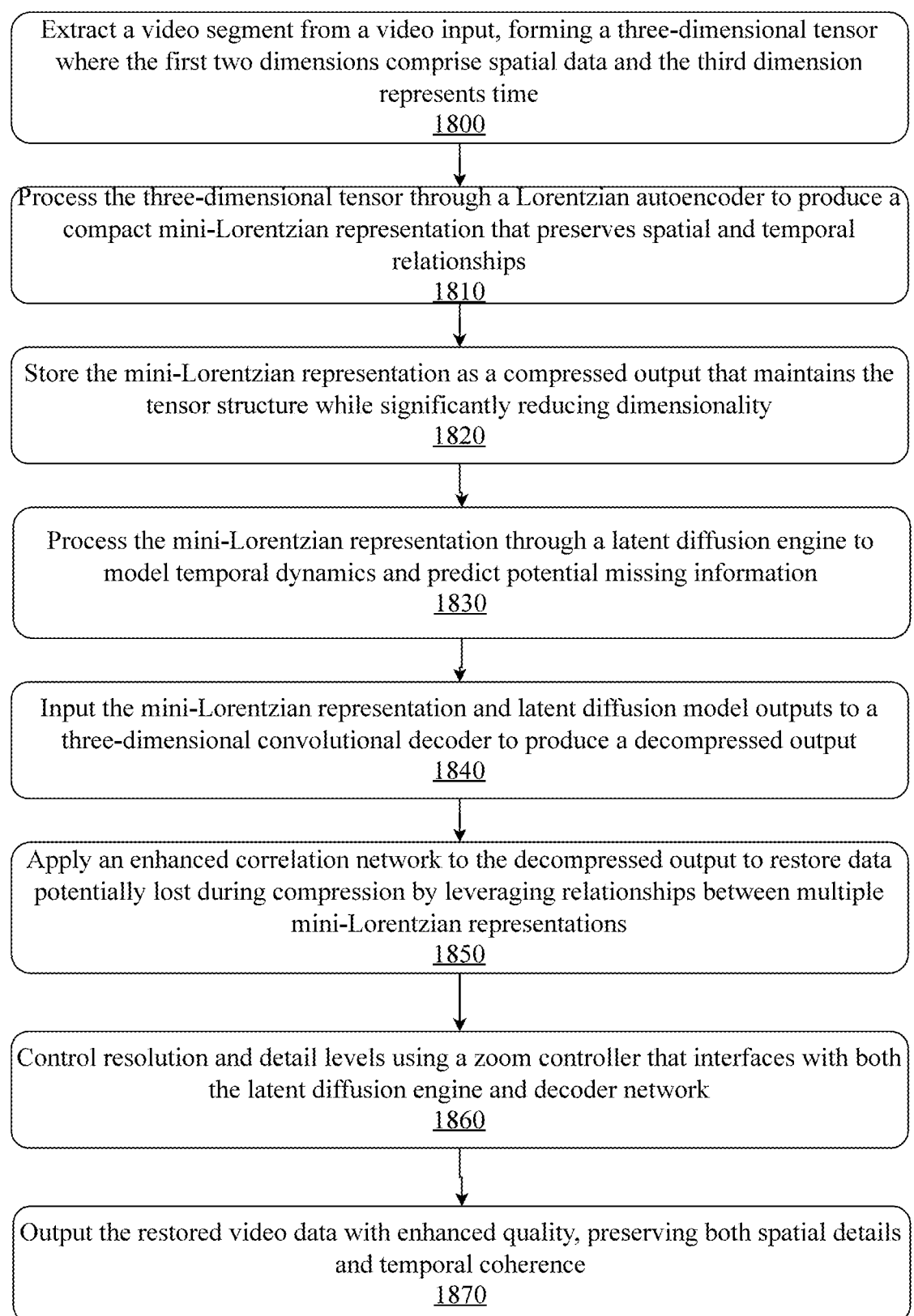

Extract a video segment from a video input, forming a three-dimensional tensor where the first two dimensions comprise spatial data and the third dimension represents time
1800

Process the three-dimensional tensor through a Lorentzian autoencoder to produce a compact mini-Lorentzian representation that preserves spatial and temporal relationships
1810

Store the mini-Lorentzian representation as a compressed output that maintains the tensor structure while significantly reducing dimensionality
1820

Process the mini-Lorentzian representation through a latent diffusion engine to model temporal dynamics and predict potential missing information
1830

Input the mini-Lorentzian representation and latent diffusion model outputs to a three-dimensional convolutional decoder to produce a decompressed output
1840

Apply an enhanced correlation network to the decompressed output to restore data potentially lost during compression by leveraging relationships between multiple mini-Lorentzian representations
1850

Control resolution and detail levels using a zoom controller that interfaces with both the latent diffusion engine and decoder network
1860

Output the restored video data with enhanced quality, preserving both spatial details and temporal coherence
1870

FIG. 18

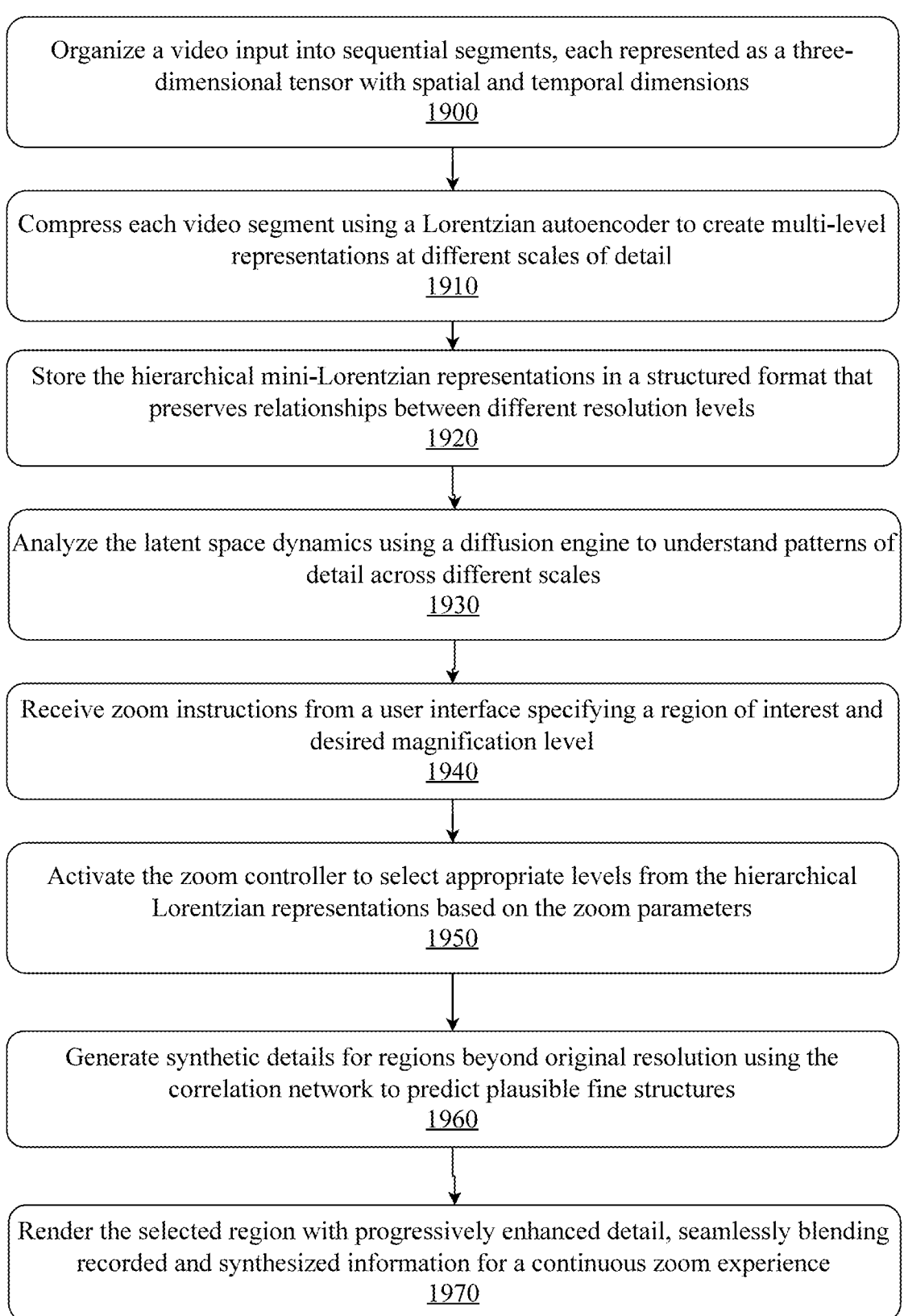

Organize a video input into sequential segments, each represented as a three-dimensional tensor with spatial and temporal dimensions
1900

Compress each video segment using a Lorentzian autoencoder to create multi-level representations at different scales of detail
1910

Store the hierarchical mini-Lorentzian representations in a structured format that preserves relationships between different resolution levels
1920

Analyze the latent space dynamics using a diffusion engine to understand patterns of detail across different scales
1930

Receive zoom instructions from a user interface specifying a region of interest and desired magnification level
1940

Activate the zoom controller to select appropriate levels from the hierarchical Lorentzian representations based on the zoom parameters
1950

Generate synthetic details for regions beyond original resolution using the correlation network to predict plausible fine structures
1960

Render the selected region with progressively enhanced detail, seamlessly blending recorded and synthesized information for a continuous zoom experience
1970

FIG. 19

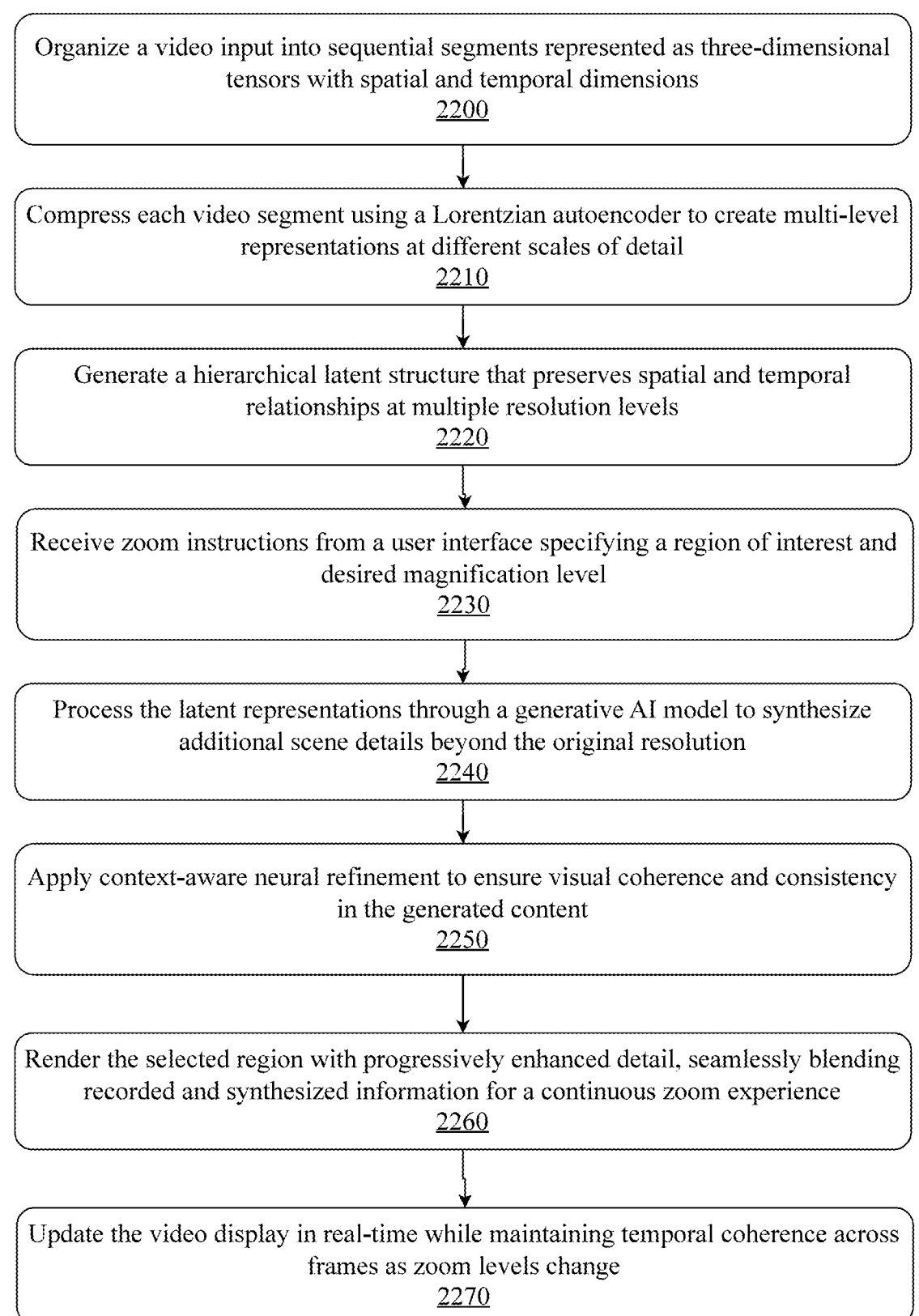

Organize a video input into sequential segments represented as three-dimensional tensors with spatial and temporal dimensions
2200

Compress each video segment using a Lorentzian autoencoder to create multi-level representations at different scales of detail
2210

Generate a hierarchical latent structure that preserves spatial and temporal relationships at multiple resolution levels
2220

Receive zoom instructions from a user interface specifying a region of interest and desired magnification level
2230

Process the latent representations through a generative AI model to synthesize additional scene details beyond the original resolution
2240

Apply context-aware neural refinement to ensure visual coherence and consistency in the generated content
2250

Render the selected region with progressively enhanced detail, seamlessly blending recorded and synthesized information for a continuous zoom experience
2260

Update the video display in real-time while maintaining temporal coherence across frames as zoom levels change
2270

FIG. 22

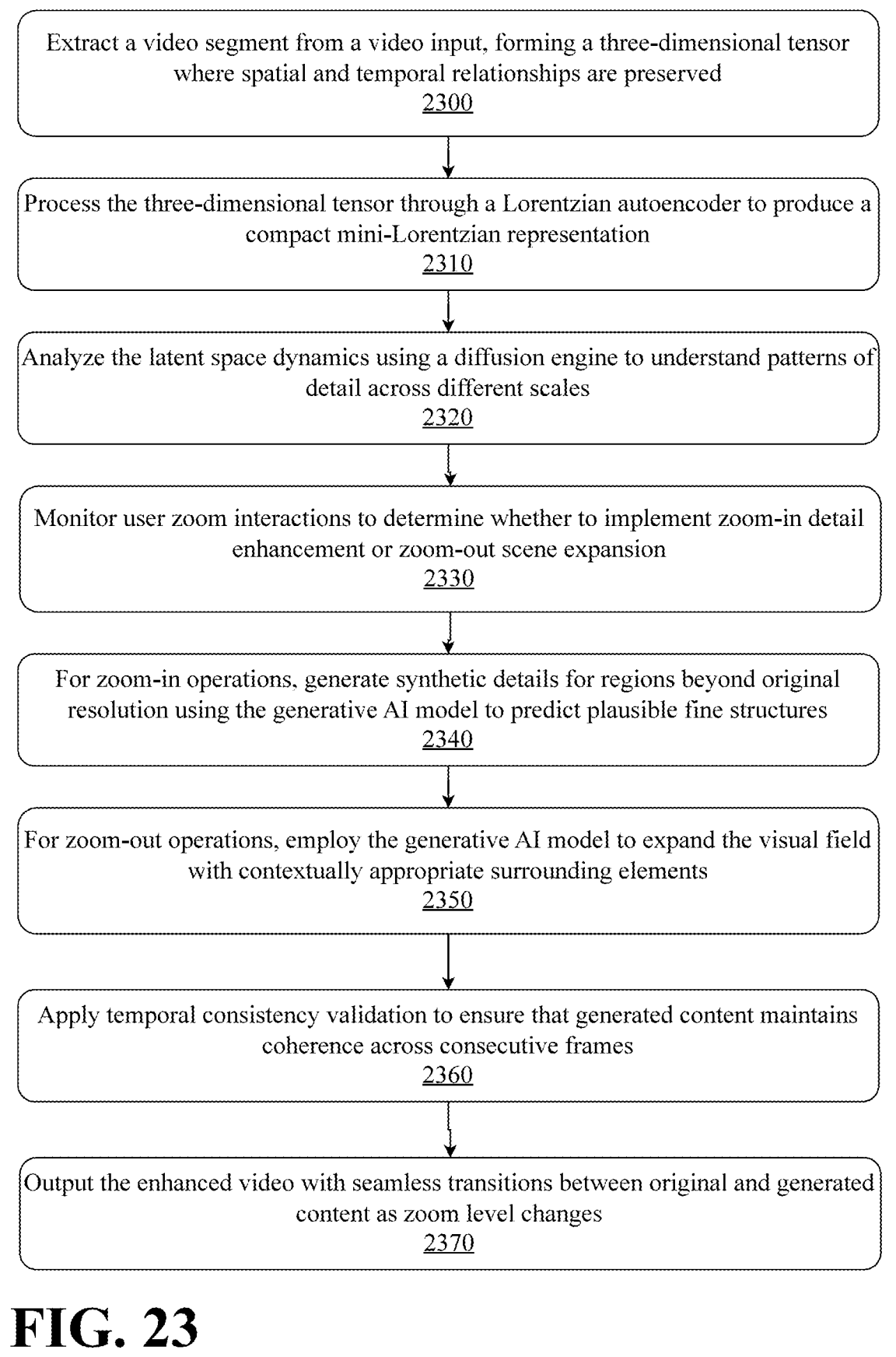

Extract a video segment from a video input, forming a three-dimensional tensor where spatial and temporal relationships are preserved
2300

Process the three-dimensional tensor through a Lorentzian autoencoder to produce a compact mini-Lorentzian representation
2310

Analyze the latent space dynamics using a diffusion engine to understand patterns of detail across different scales
2320

Monitor user zoom interactions to determine whether to implement zoom-in detail enhancement or zoom-out scene expansion
2330

For zoom-in operations, generate synthetic details for regions beyond original resolution using the generative AI model to predict plausible fine structures
2340

For zoom-out operations, employ the generative AI model to expand the visual field with contextually appropriate surrounding elements
2350

Apply temporal consistency validation to ensure that generated content maintains coherence across consecutive frames
2360

Output the enhanced video with seamless transitions between original and generated content as zoom level changes
2370

FIG. 23

Analyze completed navigation sequences
3700

Extract and generalize successful strategies
3710

Store strategy templates in cache
3720

Match current scenarios against cached strategies
3730

Adapt selected strategies for current requirements
3740

Execute adapted strategies with monitoring
3750

Evaluate results and update strategy cache
3760

SYSTEMS AND METHODS FOR LATENT HYPERSPACE NAVIGATION IN SPATIOTEMPORAL MEDIA

CROSS-REFERENCE TO RELATED APPLICATIONS

Priority is claimed in the application data sheet to the following patents or patent applications, each of which is expressly incorporated herein by reference in its entirety:

Ser. No. 19/321,173
Ser. No. 19/284,115
Ser. No. 19/051,193
Ser. No. 19/245,366
Ser. No. 19/204,525
Ser. No. 19/192,215
Ser. No. 18/972,797
Ser. No. 18/648,340
Ser. No. 18/427,716
Ser. No. 18/410,980
Ser. No. 18/537,728
63/847,889
63/847,082
63/847,091
63/847,096
63/847,101

BACKGROUND OF THE INVENTION

Field of the Art

The present invention relates to the field of latent hyperspace navigation, cognitive media processing, and geometric deep learning. More specifically, the invention pertains to systems and methods that utilize hierarchical and Lorentzian autoencoders for spatiotemporal media compression combined with differential geometry-based navigation techniques for intelligent traversal, strategic decision-making, and synthetic content generation within high-dimensional latent representations. The invention enables sophisticated cognitive behaviors through geometric manifold structures, geodesic trajectory mapping, symbolic anchor systems, and multi-scale temporal coordination, transforming spatiotemporal media into navigable cognitive terrain that supports advanced exploration, analysis, and synthesis capabilities beyond the boundaries of original media content.

Discussion of the State of the Art

In recent years, deep learning approaches have shown promising results in data compression and restoration, particularly for spatiotemporal media such as video content. Autoencoders, a type of neural network architecture, have emerged as powerful tools for learning compact representations of data. Multi-layer autoencoders have been successfully applied in various domains, including image compression, video compression, and speech enhancement.

However, existing approaches face significant limitations in their ability to navigate and make intelligent decisions within the high-dimensional latent spaces they create. Traditional autoencoders compress data into latent representations but provide limited mechanisms for understanding the geometric relationships, temporal dependencies, and semantic structures within these spaces. This creates challenges for applications requiring intelligent traversal, contextual understanding, and strategic decision-making within media content.

Current video processing systems also lack sophisticated mechanisms for maintaining persistent cognitive states across temporal sequences, limiting their ability to build cumulative understanding or make informed decisions based on historical context. While some systems implement basic memory mechanisms, they typically operate as simple lookup tables rather than structured cognitive substrates that can support complex reasoning and strategic planning.

Furthermore, existing systems struggle with the integration of symbolic reasoning and neural processing, making it difficult to implement high-level strategic behaviors that require both pattern recognition and logical decision-making. The separation between symbolic AI approaches and deep learning methods creates barriers to developing truly intelligent media processing systems.

What is needed is a comprehensive system that combines advanced spatiotemporal media processing with intelligent navigation capabilities in latent hyperspaces, enabling strategic decision-making, persistent cognitive state management, and seamless integration of symbolic and neural processing approaches.

SUMMARY OF THE INVENTION

Accordingly, the inventor has conceived and reduced to practice, system and method for a system and method for latent hyperspace navigation in spatiotemporal media using hierarchical and Lorentzian autoencoders. The invention transforms spatiotemporal media into navigable cognitive terrain through geometric manifold structures that organize compressed representations as geodesic trajectories. The system comprises multiple integrated components: hierarchical and Lorentzian autoencoders for compression while preserving geometric relationships, a latent hyperspace manager that maintains manifold structure, a geodesic trajectory mapper for computing optimal navigation paths using differential geometry principles, symbolic anchors positioned at semantically significant locations, spatiotemporal routing protocols for multi-scale temporal coordination, a strategy caching system for learning from successful navigation patterns, and a synthetic content generator enabling exploration beyond original media boundaries. The correlation network restores information lost during compression by leveraging cross-correlations between representations. During operation, the system enables sophisticated cognitive behaviors including infinite zoom capabilities, strategic decision-making, and contextually appropriate content synthesis while maintaining semantic coherence across temporal sequences.

According to a preferred embodiment, a computer system for latent hyperspace navigation in spatiotemporal media comprising: a hardware memory, wherein the computer system is configured to execute software instructions stored on nontransitory machine-readable storage media that: train a correlation network using sets of cross-correlated training data sets; obtain a plurality of spatiotemporal media input data sets; compress the input data sets into compressed mini-Lorentzian representations using a plurality of Lorentzian autoencoders that preserve tensor structure and spatiotemporal relationships; establish a latent hyperspace with geometric manifold structure organizing the compressed representations as navigable geodesic trajectories; compute optimal navigation paths through the latent hyperspace using differential geometry principles; position symbolic anchors at semantically significant locations; implement spatiotemporal routing protocols for intelligent navigation across multiple temporal scales; decompress the compressed data sets using three-dimensional convolutional decoders; restore data lost in compression using the correlation network; cache successful navigation strategies; and generate synthetic content during navigation to support exploration beyond original media boundaries, is disclosed.

According to another preferred embodiment, a method for latent hyperspace navigation in spatiotemporal media, comprising the steps of: training a correlation network using sets of cross-correlated training data sets; obtaining a plurality of spatiotemporal media input data sets; compressing the input data sets into compressed mini-Lorentzian representations using Lorentzian autoencoders that preserve geometric relationships; establishing geodesic trajectory maps within the latent hyperspace; positioning symbolic anchors at semantically significant locations; implementing spatiotemporal routing protocols; decompressing the compressed data sets using three-dimensional convolutional decoders; restoring data lost in compression using the correlation network; caching successful navigation strategies; and generating synthetic content during navigation, is disclosed.

According to an aspect of an embodiment, the hierarchical autoencoders comprise multiple encoding levels operating at different scales from global scene structure to fine-grained details, with corresponding decoder levels for progressive reconstruction.

According to an aspect of an embodiment, the spatiotemporal media input data sets comprise video data organized as three-dimensional tensors where spatial and temporal dimensions are preserved throughout the navigation process.

According to an aspect of an embodiment, the synthetic content generator implements infinite zoom capability by generating plausible visual details beyond original resolution while maintaining temporal consistency.

According to an aspect of an embodiment, the symbolic anchors are categorized into types including decision points, semantic boundaries, navigation waypoints, and temporal references serving specific cognitive functions.

BRIEF DESCRIPTION OF THE DRAWING FIGURES

FIG. 6 is a flow diagram illustrating an exemplary method for compressing a data input using a system for compressing and restoring data using multi-level autoencoders and correlation networks.

FIG. 9 is a flow diagram illustrating an exemplary method for compressing and decompressing IoT sensor data using a system for compressing and restoring data using multi-level autoencoders and correlation networks.

FIG. 15 is a flow diagram illustrating an exemplary method for compressing and restoring data using hierarchical autoencoders and correlation networks.

FIG. 18 is a flow diagram illustrating an exemplary method for compressing and restoring video data using Lorentzian autoencoders.

FIG. 19 is a flow diagram illustrating an exemplary method for implementing infinite zoom capability using hierarchical Lorentzian representations.

FIG. 22 is a flow diagram illustrating an exemplary method for implementing continuous zoom in video using hierarchical Lorentzian representations.

FIG. 23 is a flow diagram illustrating an exemplary method for bidirectional zoom using generative AI and Lorentzian autoencoders.

DETAILED DESCRIPTION OF THE INVENTION

Figure 1:
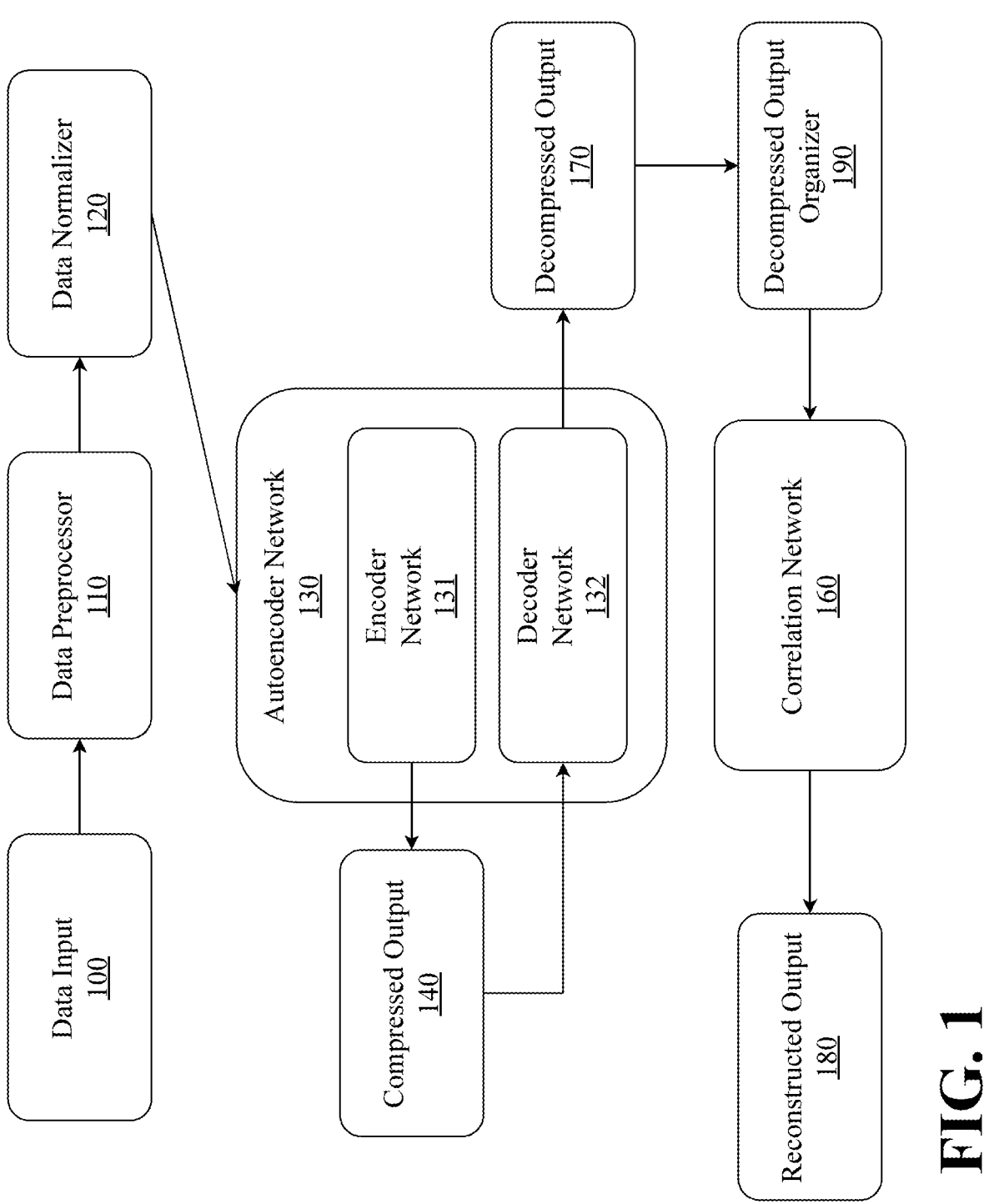
FIG. 1 is a block diagram illustrating an exemplary system architecture for compressing and restoring data using multi-level autoencoders and correlation networks.

The inventor has conceived, and reduced to practice, system and method for latent hyperspace navigation in spatiotemporal media that fundamentally transforms traditional compression and restoration approaches by treating media content as navigable cognitive terrain. The invention integrates hierarchical and Lorentzian autoencoders with sophisticated geometric navigation capabilities, enabling intelligent traversal through high-dimensional latent representations using differential geometry principles. Unlike conventional media processing systems that operate on static data, this invention creates dynamic geometric manifold structures where compressed spatiotemporal content is organized as geodesic trajectories, supporting advanced cognitive behaviors including strategic decision-making, temporal reasoning across multiple scales, and contextually appropriate synthetic content generation. The system implements persistent symbolic anchors that serve as cognitive landmarks, enabling consistent navigation and strategic planning across extended temporal sequences, while a strategy caching mechanism preserves successful navigation patterns for continuous learning and increasingly sophisticated behaviors. Through this innovative approach, the invention enables unprecedented capabilities such as infinite zoom exploration beyond original media boundaries, cross-modal fusion of diverse input modalities, and seamless integration of recorded and synthesized content, creating immersive experiences that support applications ranging from scientific visualization and educational systems to advanced surveillance analysis and interactive media exploration.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 29:
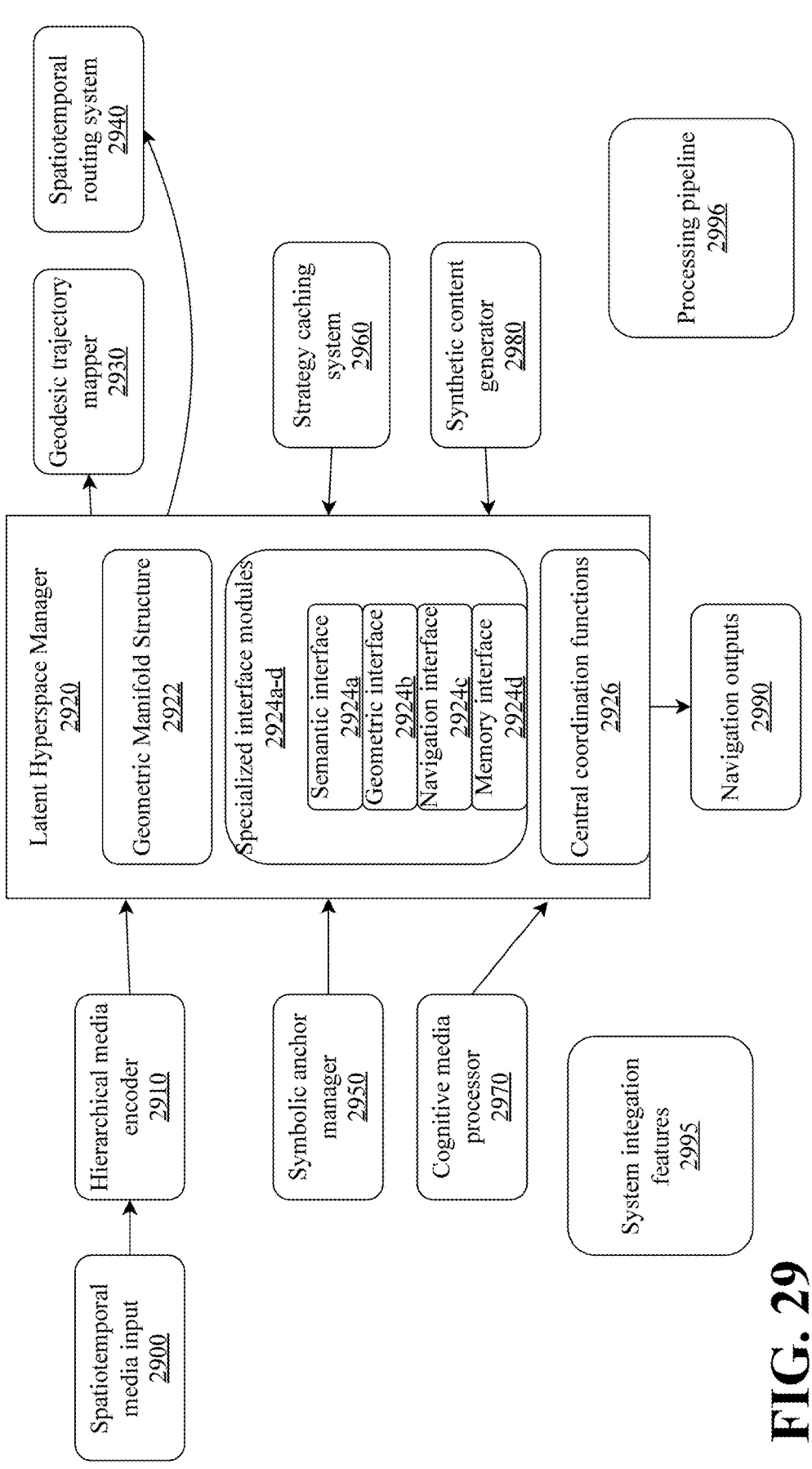
FIG. 29 is a block diagram illustrating an exemplary system architecture for latent hyperspace navigation in spatiotemporal media.

FIG. 29 is a block diagram illustrating an exemplary comprehensive system architecture for latent hyperspace navigation in spatiotemporal media, representing an advancement in intelligent media processing that combines hierarchical and Lorentzian autoencoders with cognitive navigation capabilities within high-dimensional latent spaces. This architecture enables seamless traversal, compression, reconstruction, and synthesis of spatiotemporal media content through geometric principles derived from differential geometry and cognitive science, creating a unified framework that treats video and temporal media as navigable cognitive terrain rather than static data streams.

The system receives spatiotemporal media input 2900 comprising forms of time-based media content including video streams, sequential images, temporal sensor data, and other data structures with inherent spatiotemporal organization. The input section 2900 accommodates diverse media platforms and data sources, providing a standardized interface for subsequent processing while preserving the essential temporal and spatial relationships that characterize the original content. This input capability enables the system to process not only traditional video content but also multimodal sensor streams, scientific visualization data, and other temporally structured information that benefits from intelligent navigation and compression techniques.

The hierarchical media encoder 2910 implements the foundational compression and embedding functionality that transforms high-dimensional spatiotemporal media into navigable latent representations while preserving essential geometric and semantic relationships. The encoder 2910 incorporates both hierarchical autoencoders for general data processing and specialized Lorentzian autoencoders optimized for video content that maintain three-dimensional tensor structures throughout the compression process. The Lorentzian autoencoder implements a pseudo-Riemannian metric tensor g of signature $(-, +, +, +, \ldots)$ where $g=\text{diag}(-1, +1, +1, \ldots, +1)$, with the first coordinate designated as time-like to preserve temporal causality and causal flow within the latent representation. The hierarchical autoencoder handles the multi-scale decomposition of media content, creating nested representations that span from global scene structure to fine-grained detail levels, while the Lorentzian autoencoder ensures that temporal causality and motion dynamics are preserved through pseudo-Riemannian geometric constraints. The encoder optimizes a composite loss function $Ltotal=Lrec+\lambda 1Lgeo+\lambda 2Lcurv+\lambda 3Ltemp$, where Lrec represents reconstruction loss, Lgeo penalizes deviation from geodesic smoothness via $\|zt+1-2zt+zt-1\|^2$, Lcurv provides curvature regularization, and Ltemp enforces temporal consistency through optical flow alignment between consecutive frames. The encoder 2910 also implements 3D tensor structure preservation mechanisms that maintain spatial and temporal relationships intact throughout the compression process, enabling downstream processing capabilities that depend on these structural properties.

The hierarchical media encoder 2910 implements a nested latent structure $H \supset Hmacro \supset Hmeso \supset Hmicro$, where each hierarchical level captures features at different scales of semantic abstraction. Hmacro represents global scene layout, object positions, and semantic objects; Hmeso captures texture patterns, edge structures, and motion boundaries; and Hmicro preserves fine-grained visual details including surface textures, noise patterns, and reflection artifacts. Zooming operations correspond to traversal between hierarchical levels, where zoom-in operations expand neighborhoods along high-resolution fibers $zzoomed=\gamma(t)+\delta$, $\delta \in T\gamma(t)Hmicro$, and zoom-out operations project to coarser representations $\pi:H \rightarrow Hmacro$. This hierarchical structure enables continuous detail modulation based on cognitive intent and processing requirements.

The latent hyperspace manager 2920 serves as the central coordination hub for all navigation activities within the high-dimensional latent space, maintaining the geometric structure of compressed representations and providing standardized interfaces for other system components to interact with the spatiotemporal media in semantically meaningful ways. The hyperspace manager 2920 implements a sophisticated geometric manifold structure 2922 that organizes compressed media representations as geodesic trajectories within a mathematically rigorous framework based on different geometry principles. These geodesic trajectories encode the temporal evolution of media content as smooth paths through the latent manifold, enabling efficient compression by representing long, semantically coherent segments as low-curvature paths requiring only sparse control points for complete reconstruction.

In another embodiment, the latent hyperspace manager 2920 computes compression pressure fields $P(z)=\|\nabla \cdot \vec{v}(z)\|$ throughout the latent manifold, where $\vec{v}(z)$ represents the latent velocity field and $\nabla \cdot \vec{v}$ denotes the divergence operator. The compression pressure field identifies regions of high information density that indicate semantic bottlenecks, scene transitions, or cognitively significant content requiring focused attention. High compression pressure regions $(P(z)>0.7)$ correspond to areas where multiple semantic concepts converge, creating natural attention targets for detailed analysis. Low compression pressure corridors $(P(z) <0.2)$ enable efficient navigation pathways with minimal computational overhead, optimizing traversal between regions of interest. The compression pressure field serves as an autonomous saliency mechanism, guiding attention allocation and resource management without requiring external supervision or manual configuration.

The hyperspace manager 2920 provides multiple specialized interface types 2924a-d that enable different system components to interact appropriately with the latent space according to their specific functional requirements. The semantic interface 2924a enables components focused on content understanding and meaning extraction to access and manipulate latent representations based on conceptual relationships and semantic similarity measures. The geometric interface 2924b provides mathematically oriented components with direct access to the underlying manifold structure, curvature properties, and geodesic computation capabilities required for trajectory optimization and path planning. The navigation interface 2924c supports real-time traversal operations by providing streamlined access to path-following algorithms, waypoint management, and dynamic route adjustment capabilities. The memory interface 2924d enables persistent storage and retrieval of latent trajectories, supporting long-term cognitive memory formation and experience-based learning processes.

The central coordination functions 2926 implemented by the hyperspace manager 2920 ensure consistent operation across all system components through geometric relationships maintenance, component interface management, and semantic consistency enforcement. Geometric relationship maintenance preserves the mathematical properties of the latent manifold during dynamic operations, ensuring that navigation activities do not compromise the structural integrity required for accurate reconstruction and semantic coherence. Component interface management coordinates information exchange between different subsystems, managing data format conversions, timing synchronization, and resource allocation to maintain optimal system performance. Semantic consistency enforcement monitors the conceptual coherence of navigation operations, preventing trajectory modifications that would create meaningless or contradictory content relationships.

The geodesic trajectory mapper 2930 computes optimal paths through the latent hyperspace based on criteria including semantic similarity, temporal coherence, and strategic objectives, implementing geometric calculations that account for the curved nature of the latent space and the complex relationships between different regions of the compressed representation. Unlike simple distance-based routing approaches, the trajectory mapper 2930 employs advanced mathematical techniques from differential geometry and optimal control theory to identify paths that optimize multiple competing objectives while respecting the geometric constraints imposed by the manifold structure. The optimal path computation capability enables intelligent navigation that balances efficiency with semantic coherence, ensuring that traversal operations produce meaningful and contextually appropriate results.

The spatiotemporal routing system 2940 manages navigation decisions across multiple temporal scales and semantic domains, providing intelligent coordination between immediate navigation requirements and long-term strategic objectives while maintaining temporal consistency and semantic coherence throughout extended navigation sequences. The routing system 2940 implements multi-scale coordination mechanisms that operate simultaneously across different time horizons, from frame-to-frame transitions to long-term strategic planning spanning entire media sequences or extended cognitive sessions. Decision arbitration capabilities enable the routing system 2940 to resolve conflicts between competing navigation objectives and select optimal paths when multiple viable options exist, considering factors such as objective priorities, resource constraints, temporal requirements, and strategic context to make informed routing decisions.

The symbolic anchor manager 2950 maintains persistent reference points throughout the latent space that serve as cognitive landmarks for navigation and decision-making, representing semantically significant locations, decision points, or strategic waypoints within the latent hyperspace. These cognitive landmarks enable consistent navigation across extended temporal sequences and provide stable reference points for strategic planning and execution. The anchor manager 2950 implements sophisticated placement algorithms that identify semantically significant locations based on content analysis, user interaction patterns, and strategic importance measures, ensuring that anchors provide maximum utility for navigation and cognitive processing. Reference point management capabilities enable the system to maintain, update, and utilize anchors effectively as the latent space evolves through continued use and learning.

The symbolic anchor manager 2950 implements visual thought integration by treating encoded video segments as structured cognitive objects represented as geodesic trajectories $\gamma(t) \subset H$ with associated symbolic anchors $A=\{(t_i, s_i)\}$, where $s_i \in \Sigma$ represents symbolic labels timestamped to specific trajectory points $t_i$. These visual thoughts are stored in cognitive caches that support revisitation at variable resolution, generalization across similar content, and recombination through trajectory interpolation $\gamma_{meta}(t)=\alpha\gamma_1(t)+(1-\alpha)\gamma_2(t)$. The system performs geometric coherence analysis using latent velocity $\vec{v}(t)=\dot{\gamma}(t)$ and acceleration $\vec{a}(t)=\ddot{\gamma}(t)$ to identify semantic transitions, anomalous events, and narrative boundaries based on geodesic curvature properties.

The strategy caching system 2960 preserves successful navigation patterns, decision sequences, and contextual associations for reuse across similar scenarios, creating a form of procedural memory that enables the system to develop increasingly sophisticated behaviors through experience and learning. Pattern preservation mechanisms capture not only the navigation paths themselves but also the contextual conditions, decision criteria, and outcome measures that contributed to their success, enabling intelligent strategy selection and adaptation based on scenario similarity and expected effectiveness. Experience learning capabilities allow the caching system 2960 to generalize from specific successful instances to create more broadly applicable strategy templates that can be adapted and applied across diverse navigation scenarios.

In a further embodiment, the cognitive media processor 2970 implements counterfactual simulation capabilities by applying localized perturbations $\delta$ to latent trajectories $\gamma(t)$ and decoding the resulting modified paths to generate alternative scenario outcomes. The counterfactual generator computes modified trajectories $\gamma'(t)=\gamma(t)+\delta$, where $\delta$ represents a perturbation vector applied at specific temporal points to simulate "what if" scenarios. This enables event reconstruction for safety-critical analysis, predictive planning with alternative futures, and interactive explanation of system behavior. For example, in surveillance applications, the system can generate counterfactual trajectories showing how events might have unfolded under different conditions, supporting forensic analysis and decision-making processes.

The cognitive media processor 2970 integrates symbolic reasoning with neural processing to support complex cognitive behaviors within media systems, enabling high-level reasoning about media content, strategic decision-making about navigation objectives, and coordination between different system components to achieve complex goals that require both pattern recognition and logical reasoning. The symbolic reasoning component handles abstract conceptual relationships, logical inference, and rule-based decision-making processes that benefit from explicit symbolic representation and manipulation. The neural processing component manages pattern recognition, statistical learning, and adaptive behavior modification through connectionist approaches that excel at handling noisy, incomplete, or ambiguous information. The integration of these complementary processing paradigms enables the cognitive media processor 2970 to handle complex reasoning tasks that require both symbolic manipulation and statistical inference.

The synthetic content generator 2980 creates contextually appropriate media content during navigation to support infinite exploration capabilities, enabling the system to extend beyond the boundaries of original media content while maintaining consistency with existing material and supporting continuous exploration and interaction within the latent hyperspace. Contextual generation capabilities ensure that synthesized content maintains appropriate semantic relationships with surrounding material, preserving narrative coherence and stylistic consistency while enabling creative exploration of alternate scenarios or extended content sequences. Infinite exploration support enables users to navigate continuously through media space without encountering artificial boundaries or discontinuities, creating seamless experiences that blend authentic captured content with intelligently synthesized extensions.

In an additional embodiment, the synthetic content generator 2980 implements cross-modal fusion capabilities through a fusion operator $R:\{\tau i\}\rightarrow H$visual that combines diverse input modalities including text descriptions, sensor readings, images, and symbolic metadata into unified latent representations. The fusion process enables thought-to-video generation, where abstract conceptual inputs are projected through the latent manifold to produce coherent visual sequences. The cross-modal projection mechanism supports predictive visualization, where future events are rendered based on current sensor states and textual descriptions, and explanatory video synthesis, where complex concepts are visualized through generated sequences that illustrate abstract relationships and processes.

The system integration features 2995 implement comprehensive coordination mechanisms that ensure optimal operation across all system components through bidirectional data flow, real-time coordination, semantic consistency enforcement, adaptive resource allocation, and cognitive feedback loops. Bidirectional data flow enables all components to both contribute information to and receive guidance from the central coordination framework, creating a truly integrated system where each component benefits from the capabilities and insights of all others. Real-time coordination through the hyperspace manager ensures that all operations remain synchronized and mutually compatible, preventing conflicts and optimizing overall system performance. Semantic consistency enforcement maintains conceptual coherence across all processing operations, ensuring that the system's outputs remain meaningful and contextually appropriate regardless of the complexity of navigation and synthesis operations performed.

The processing pipeline 2996 defines the systematic sequence of operations performed by the complete system, beginning with media compression and latent embedding, followed by trajectory planning and navigation execution, then content synthesis and cognitive integration, and concluding with output generation. Media compression transforms the input spatiotemporal media into efficient latent representations that preserve essential structure while enabling computational tractability. Latent embedding establishes the geometric framework within which all subsequent navigation and processing operations occur. Trajectory planning computes optimal paths through the latent space based on specified objectives and constraints. Navigation execution implements the computed trajectories while monitoring progress and making real-time adjustments as needed. Content synthesis generates additional material as required to support continuous exploration beyond original content boundaries. Cognitive integration incorporates symbolic reasoning and strategic planning to ensure that all operations align with higher-level objectives. Output generation produces the final results in formats appropriate for specific applications and user requirements.

The intelligent navigation outputs 2990 represent the culmination of the sophisticated processing performed by all system components, providing enhanced media content with improved quality and accessibility, navigation recommendations that guide users toward content of interest, strategic insights that inform decision-making processes, control signals for integration with other systems, cognitive feedback that supports learning and adaptation, and system integration capabilities that enable deployment within larger technological frameworks. Enhanced media content includes both reconstructed original material with improved quality and synthesized extensions that enable exploration beyond original boundaries. Navigation recommendations provide intelligent guidance based on content analysis, user preferences, and strategic objectives. Strategic insights offer high-level understanding of content relationships, temporal patterns, and semantic structures that inform decision-making processes. Control signals enable the system to interface with external equipment, software platforms, or automated processes that require media-based guidance or control inputs.

The architecture shown in FIG. 29 thus provides a complete framework for intelligent navigation within spatiotemporal media through the integration of advanced compression techniques, sophisticated geometric navigation algorithms, cognitive processing capabilities, and synthetic content generation. The system's foundation in differential geometry and cognitive science principles ensures mathematical rigor while enabling intuitive interaction paradigms that treat media content as explorable cognitive terrain rather than static data collections. This approach enables applications ranging from immersive media exploration and adaptive learning systems to advanced surveillance analysis and scientific data visualization, all unified within a coherent framework that leverages the geometric structure of latent space to provide intelligent, contextually aware navigation and content synthesis capabilities.

Figure 30:
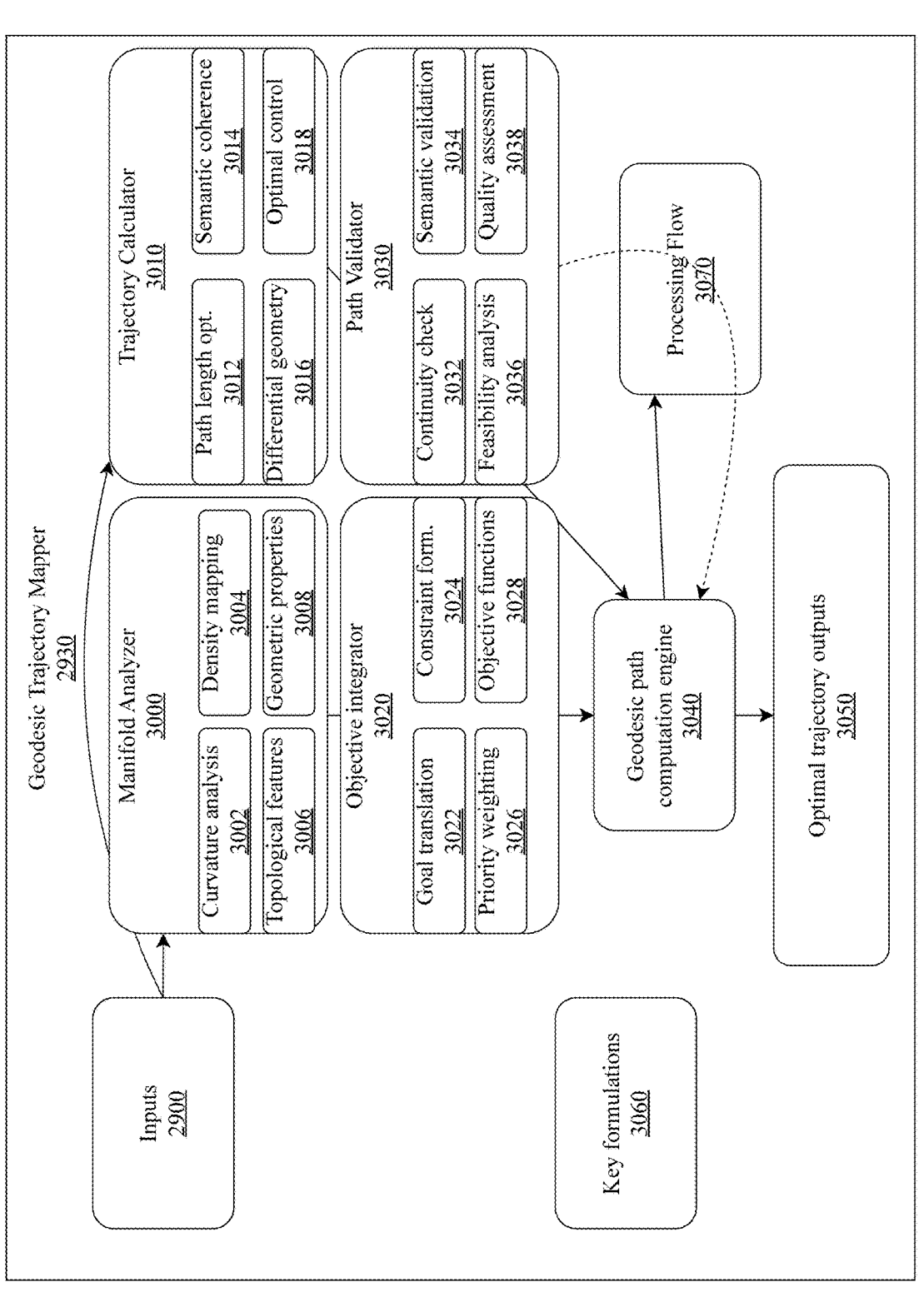
FIG. 30 is a block diagram illustrating an exemplary architecture for a geodesic trajectory mapper.

FIG. 30 is a block diagram illustrating an exemplary architecture for a geodesic trajectory mapper 2930 configured to compute optimal navigation paths through high-dimensional latent hyperspaces within the latent hyperspace navigation system for spatiotemporal media. The geodesic trajectory mapper 2930 implements sophisticated geometric calculations that account for the curved nature of the latent space and the complex relationships between different regions of the compressed representation, enabling intelligent traversal that respects both semantic similarity and temporal coherence constraints while optimizing for strategic navigation objectives.

The system receives inputs 2900 including the latent space H representing the high-dimensional manifold structure, source points indicating current positions within the latent hyperspace, target points specifying desired destinations or regions of interest, and navigation goals defining the strategic objectives and constraints that should guide trajectory computation. These inputs 2900 provide the essential context and parameters required for the geodesic trajectory mapper 2930 to perform meaningful path optimization that aligns with both immediate navigation requirements and broader cognitive objectives within the spatiotemporal media processing framework.

The manifold analyzer 3000 serves as the foundational component responsible for examining the geometric properties of the latent hyperspace to provide essential mathematical context for all subsequent trajectory calculations. The manifold analyzer 3000 operates through four specialized sub-components that collectively characterize the geometric landscape of the latent space. The curvature analysis module 3002 computes local and global curvature measures including Ricci curvature, sectional curvature, and mean curvature to understand how the manifold curves in different regions, providing critical information about the geometric constraints that affect geodesic path formation. The density mapping module 3004 analyzes the distribution of semantic information throughout the latent space, identifying regions of high information density that may require special consideration during path planning and regions of low density that may offer efficient transit corridors. The topological features module 3006 examines the global connectivity and structural properties of the manifold, identifying critical points, saddle regions, and topological obstacles that may affect path feasibility and optimization strategies. The geometric properties module 3008 characterizes additional manifold properties including metric tensor variations, coordinate chart relationships, and local geometric invariants that influence the mathematical formulation of geodesic equations and path optimization algorithms.

The trajectory calculator 3010 implements the core computational functionality for geodesic path optimization using principles from differential geometry and optimal control theory. This component considers multiple factors including path length, traversal difficulty, semantic coherence along the path, and alignment with specified objectives through four specialized processing modules. The path length optimization module 3012 computes geodesic distances and implements algorithms to minimize trajectory length while respecting the curved geometry of the latent manifold, ensuring efficient navigation that takes advantage of the natural geometric structure of the space. The semantic coherence module 3014 evaluates the consistency of semantic relationships along proposed trajectories, ensuring that paths maintain meaningful transitions between related concepts or content regions without introducing jarring discontinuities or semantic conflicts. The differential geometry module 3016 implements the mathematical foundations for geodesic computation including Christoffel symbol calculations, parallel transport operations, and curvature tensor evaluations that enable precise trajectory optimization within the pseudo-Riemannian geometry of the latent hyperspace. The optimal control module 3018 applies advanced optimization techniques to balance competing trajectory objectives, incorporating constraints and penalty functions that ensure computed paths satisfy both geometric requirements and strategic navigation goals.

The objective integrator 3020 serves the critical function of translating high-level abstract navigation goals into precise mathematical constraints and optimization criteria that can be incorporated into the trajectory planning process. This component bridges the gap between conceptual navigation intentions and the mathematical formulations required for geodesic computation through four specialized translation mechanisms. The goal translation module 3022 converts abstract objectives such as "find similar content," "explore creative variations," or "maintain temporal consistency" into quantitative measures and mathematical expressions that can be incorporated into optimization algorithms. The constraint formulation module 3024 transforms strategic requirements and operational limitations into mathematical constraint equations that ensure computed trajectories remain within acceptable operational boundaries while satisfying performance requirements. The priority weighting module 3026 implements mechanisms for balancing competing objectives when multiple goals cannot be simultaneously optimized, providing systematic approaches for making trade-off decisions based on strategic priorities and contextual requirements. The objective functions module 3028 constructs the complete mathematical objective function that combines path efficiency measures, semantic coherence criteria, and strategic alignment metrics into a unified optimization target that guides the geodesic computation process.

The path validator 3030 ensures that computed trajectories are feasible and maintain semantic coherence throughout their length, providing essential quality assurance and validation capabilities that prevent the system from generating paths that would compromise navigation quality or produce unacceptable results. The validation process operates through four complementary assessment mechanisms that collectively ensure trajectory quality and feasibility. The continuity check module 3032 verifies that computed paths maintain mathematical continuity and smoothness properties required for stable navigation, detecting potential discontinuities, sharp transitions, or mathematical singularities that could compromise path traversal. The semantic validation module 3034 ensures that trajectories maintain meaningful semantic relationships throughout their length, preventing paths that would create jarring conceptual transitions or semantically incoherent progressions that could confuse users or compromise system effectiveness. The feasibility analysis module 3036 evaluates whether computed trajectories can be successfully executed within the operational constraints of the navigation system, considering factors such as computational requirements, memory limitations, and real-time performance constraints. The quality assessment module 3038 applies comprehensive evaluation criteria to rate trajectory quality across multiple dimensions including efficiency, smoothness, semantic coherence, and strategic alignment, providing quantitative measures that enable comparison and selection among multiple candidate paths.

The geodesic path computation engine 3040 serves as the central mathematical processing core that implements the fundamental geodesic equation $\ddot{\gamma}+\Gamma_{ij}^{k}\dot{\gamma}^{i}\dot{\gamma}^{k}=0$, where $\gamma$ represents the trajectory path, $\dot{\gamma}$ and $\ddot{\gamma}$ represent first and second derivatives with respect to the path parameter, and $\Gamma_{ij}^{k}$ represents the Christoffel symbols encoding the manifold's geometric structure. This engine integrates inputs from all other components to perform the actual trajectory computation using advanced numerical methods that account for the complex geometric properties of the latent hyperspace while satisfying the constraints and objectives established by the other system components.

The mathematical formulations section 3060 provides the essential theoretical foundation supporting the geodesic computation process, incorporating key mathematical expressions that govern trajectory optimization. The path length calculation $L[\gamma]=\int\sqrt{g(\dot{\gamma},\dot{\gamma})}dt$ defines the metric-based distance measure used to evaluate trajectory efficiency, where g represents the metric tensor of the latent manifold. The curvature tensor $R^{\alpha}\_{\{\beta\gamma\delta\}}$ encodes the intrinsic geometric properties of the manifold that influence geodesic behavior and constraint the space of feasible trajectories. The objective function $J[\gamma]=\int L(\gamma,\dot{\gamma},t)dt$ provides the mathematical framework for incorporating multiple optimization criteria into the trajectory computation process, where L represents the Lagrangian function encoding the various objectives and constraints.

The processing flow 3070 defines the systematic sequence of operations performed by the geodesic trajectory mapper 2930, ensuring consistent and comprehensive trajectory computation across all operational scenarios. The process begins with manifold geometry analysis to characterize the mathematical properties of the latent space, followed by calculation of candidate paths using the established geometric constraints. Objective integration then incorporates strategic goals and requirements into the mathematical optimization framework, after which trajectory validation ensures that computed paths meet quality and feasibility requirements. The process concludes with output of optimal paths that satisfy all specified criteria and constraints.

The optimal trajectory outputs 3050 represent the final products of the geodesic computation process, providing comprehensive information required for successful navigation execution. The geodesic path $\gamma(t)$ constitutes the primary output, defining the complete trajectory as a parameterized curve through the latent hyperspace that optimally satisfies the specified objectives and constraints. Navigation waypoints provide discrete reference points along the trajectory that enable incremental navigation and progress monitoring during path execution. Quality metrics quantify the performance characteristics of the computed trajectory across various evaluation dimensions, enabling assessment of trajectory suitability for specific navigation scenarios. Execution parameters provide the technical specifications and operational settings required for successful trajectory traversal, including timing constraints, computational resource requirements, and performance optimization settings.

The data flow architecture implements an information processing pipeline that ensures optimal integration between all system components. Geometric analysis data flows from the manifold analyzer 3000 to the central computation engine 3040, providing essential mathematical context for geodesic calculation. Trajectory calculations flow from the trajectory calculator 3010 to the computation engine 3040, supplying the algorithmic frameworks and optimization methods required for path computation. Objective integration data flows from the objective integrator 3020 to the computation engine 3040, ensuring that strategic goals and constraints are properly incorporated into the mathematical optimization process. Validation feedback flows from the path validator 3030 back to the computation engine 3040 through a feedback loop, enabling iterative refinement of trajectory computation when initial results do not meet quality or feasibility requirements.

The geodesic trajectory mapper 2930 thus provides a comprehensive framework for computing optimal navigation paths through high-dimensional latent hyperspaces using sophisticated geometric analysis, mathematical optimization, and quality validation techniques. The system's integration of differential geometry, optimal control theory, and semantic analysis enables the generation of trajectories that effectively balance efficiency, coherence, and strategic alignment while maintaining mathematical rigor and operational feasibility. This capability forms an essential foundation for intelligent navigation within spatiotemporal media systems, enabling sophisticated traversal strategies that respect both the geometric structure of the latent space and the semantic requirements of cognitive media processing applications.

FIG. 6 is a flow diagram illustrating an exemplary method for compressing a data input using a system for compressing and restoring data using multi-level autoencoders and correlation networks. In a first step 600, a plurality of data sets is collected from a plurality of data sources. These data sources can include various sensors, devices, databases, or any other systems that generate or store data. The data sets may be heterogeneous in nature, meaning they can have different formats, structures, or modalities. For example, the data sets can include images, videos, audio recordings, time-series data, numerical data, or textual data. The collection process involves acquiring the data sets from their respective sources and bringing them into a centralized system for further processing.

In a step 610, the collected data sets are preprocessed using a data preprocessor. The data preprocessor may be responsible for cleaning, transforming, and preparing the data sets for subsequent analysis and compression. Preprocessing tasks may include but are not limited to data cleansing, data integration, data transformation, and feature extraction. Data cleansing involves removing or correcting any erroneous, missing, or inconsistent data points. Data integration combines data from multiple sources into a unified format. Data transformation converts the data into a suitable representation for further processing, such as scaling, normalization, or encoding categorical variables. Feature extraction identifies and selects relevant features or attributes from the data sets that are most informative for the given task.

A step 620 involves normalizing the preprocessed data sets using a data normalizer. Normalization is a step that brings the data into a common scale and range. It helps to remove any biases or inconsistencies that may exist due to different units or scales of measurement. The data normalizer applies various normalization techniques, such as min-max scaling, z-score normalization, or unit vector normalization, depending on the nature of the data and the requirements of the subsequent compression step. Normalization ensures that all the data sets have a consistent representation and can be compared and processed effectively.

In a step 630, the normalized data sets are compressed into a compressed output using a multi-layer autoencoder network. The multi-layer autoencoder network is a deep learning model designed to learn compact and meaningful representations of the input data. It consists of an encoder network and a decoder network. The encoder network takes the normalized data sets as input and progressively compresses them through a series of layers, such as but not limited to convolutional layers, pooling layers, and fully connected layers. The compressed representation is obtained at the bottleneck layer of the encoder network, which has a significantly reduced dimensionality compared to the original data. The multi-layer autoencoder network may utilize a plurality of encoder networks to achieve optimal compression performance. These encoder networks can include different architectures, loss functions, or optimization techniques. The choice of compression technique depends on the specific characteristics and requirements of the data sets being compressed. During the compression process, the multi-layer autoencoder network learns to capture the essential features and patterns present in the data sets while discarding redundant or irrelevant information. It aims to minimize the reconstruction error between the original data and the reconstructed data obtained from the compressed representation. In step 640, the compressed output generated by the multi-layer autoencoder network is either outputted or stored for future processing. The compressed output represents the compact and informative representation of the original data sets. It can be transmitted, stored, or further analyzed depending on the specific application or use case. The compressed output significantly reduces the storage and transmission requirements compared to the original data sets, making it more efficient for downstream tasks.

Figure 7:
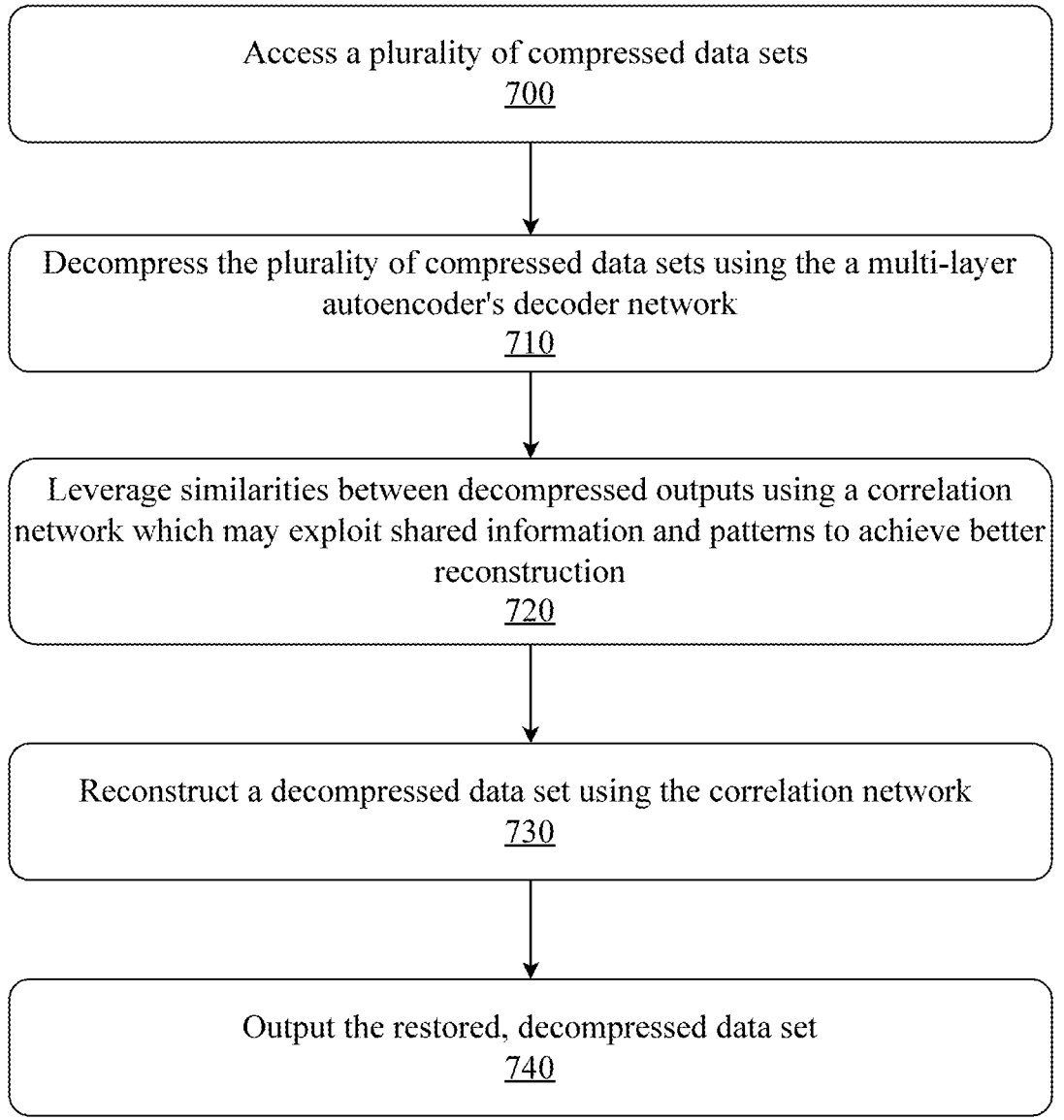
FIG. 7 is a flow diagram illustrating an exemplary method for decompressing a compressed data input using system for compressing and restoring data using multi-level autoencoders and correlation networks.

FIG. 7 is a flow diagram illustrating an exemplary method for decompressing a compressed data input using system for compressing and restoring data using multi-level autoencoders and correlation networks. In a first step, 700, access a plurality of compressed data sets. In a step 710, decompress the plurality of compressed data sets using a multi-layer autoencoder's decoder network. The decoder network is responsible for mapping the latent space vectors back to the original data space. The decoder network may include techniques such as transposed convolutions, upsampling layers, or generative models, depending on the specific requirements of the data and the compression method used.

In a step 720, leverage the similarities between decompressed outputs using a correlation network which may exploit shared information and patterns to achieve a better reconstruction. The correlation network is a deep learning model specifically designed to exploit the shared information and patterns among the compressed data sets. It takes the organized decompressed data sets as input and learns to capture the correlations and dependencies between them. The correlation network may consist of multiple layers, such as convolutional layers, recurrent layers, or attention mechanisms, which enable it to effectively model the relationships and similarities among the compressed data sets.

In a step 730, the compressed data sets are reconstructed using the correlation network. The reconstruction process in step 730 combines the capabilities of the correlation network and the decompression systems. The correlation network provides the enhanced and refined latent space representations, while the decompression systems use these representations to generate the reconstructed data. In a step 740, the restored, decompressed data set is outputted. The restored data set represents the reconstructed version of the original data, which includes recovered information lost during the compression process. The outputted data set more closely resembles the original data than would a decompressed output passed solely through a decoder network.

Figure 8:
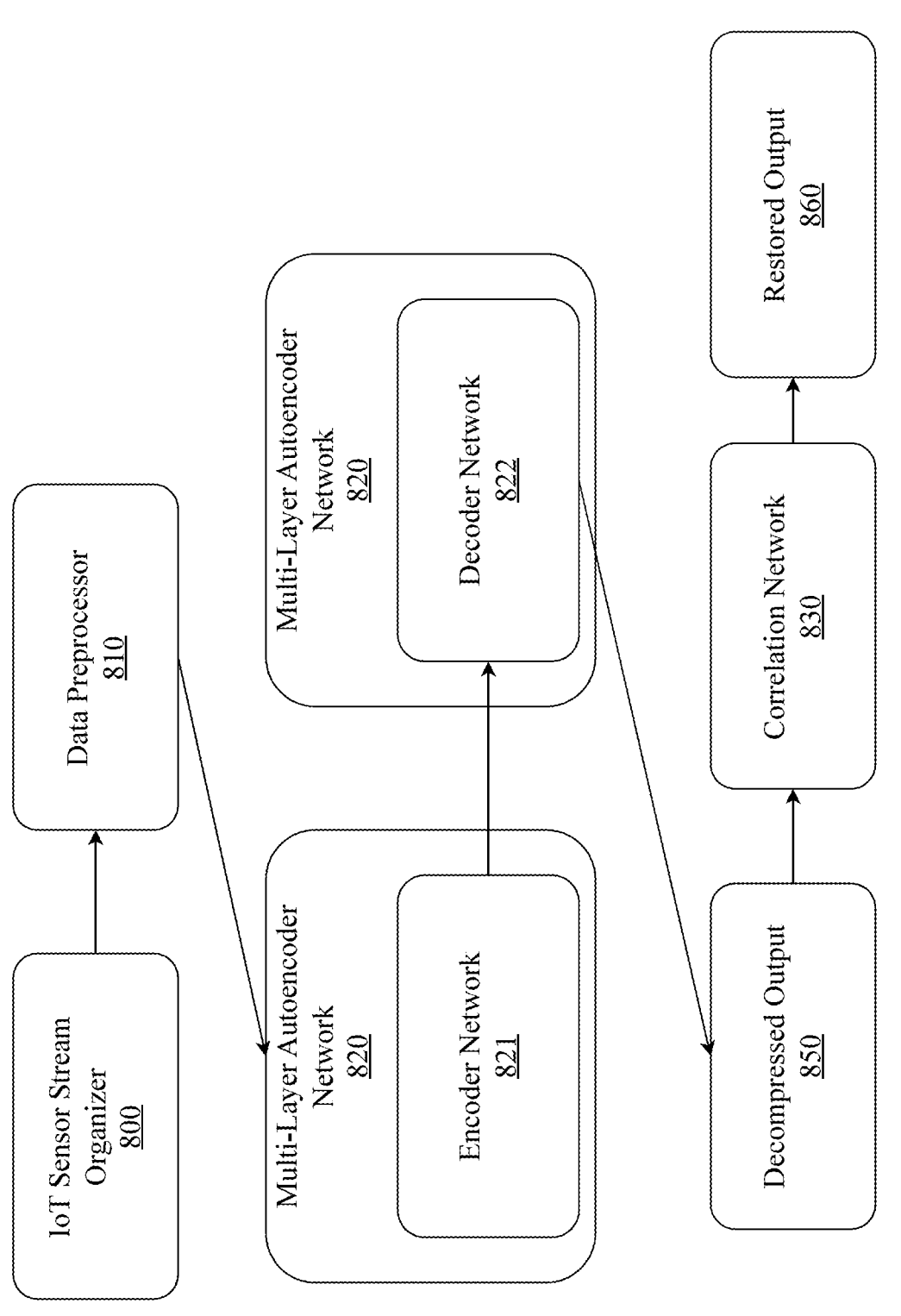
FIG. 8 is a block diagram illustrating an exemplary system architecture for compressing and restoring IoT sensor data using a system for compressing and restoring data using multi-level autoencoders and correlation networks.

FIG. 8 is a block diagram illustrating an exemplary system architecture for compressing and restoring IoT sensor data using a system for compressing and restoring data using multi-level autoencoders and correlation networks. The IoT Sensor Stream Organizer 800 is responsible for collecting and organizing data streams from various IoT sensors. It receives raw sensor data from multiple sources, such as but not limited to temperature sensors, humidity sensors, and accelerometers. The IoT Sensor Stream Organizer 800 may perform necessary preprocessing tasks, such as data cleaning, normalization, and synchronization, to ensure the data is in a suitable format for further processing. The preprocessed IoT sensor data is then passed to a data preprocessor 810. The data preprocessor 810 prepares the data for compression by transforming it into a latent space representation. It applies techniques such as feature extraction, dimensionality reduction, and data normalization to extract meaningful features and reduce the dimensionality of the data. The latent space representation captures the essential characteristics of the IoT sensor data while reducing its size.

The multi-layer autoencoder 820 is responsible for compressing and decompressing the latent space representation of the IoT sensor data. It consists of an encoder network 821 and a decoder network 822. The encoder network 821 takes the latent space representation as input and progressively compresses it through a series of layers, such as but not limited to convolutional layers, pooling layers, and fully connected layers. The compressed representation may pass through a bottleneck layer which transforms the original data to have a significantly reduced dimensionality compared to the original data. Further, the encoder network 821 manages the compression process and stores the compressed representation of the IoT sensor data. It determines the optimal compression settings based on factors such as the desired compression ratio, data characteristics, and available storage resources. The compressed representation is efficiently stored or transmitted, reducing the storage and bandwidth requirements for IoT sensor data.

The decoder network 822 is responsible for reconstructing the original IoT sensor data from the compressed representation. It utilizes the multi-layer autoencoder 820 to map the compressed representation back to the original data space. The decoder network consists of layers such as transposed convolutional layers, upsampling layers, and fully connected layers. It learns to reconstruct the original data by minimizing the reconstruction error between the decompressed output and the original IoT sensor data. The decompressed output 850 represents the decompressed IoT sensor data obtained from the decoder network 822. It closely resembles the original data and retains the essential information captured by the sensors, but includes some information lost during the compressed process. The decompressed output 850 may be further processed, analyzed, or utilized by downstream applications or systems.

To further enhance the compression and reconstruction quality, the system includes a correlation network 830. The correlation network 830 learns and exploits correlations and patterns within the IoT sensor data to improve the reconstruction process. It consists of multiple correlation layers that capture dependencies and relationships among different sensors or data streams. The correlation network 830 helps in preserving important information that may have been lost during the compression process. Following the identification of dependencies and relationships among different data streams, the correlation network 830 reconstruct a decompressed output 850 into a restored output 860 which recovers much of the data lost during the compression and decompression process.

The system may be trained using an end-to-end approach, where the multi-layer autoencoder 820 and the correlation network 830 are jointly optimized to minimize the reconstruction error and maximize the compression ratio. The training process may involves feeding the IoT sensor data through the system, comparing the decompressed output with the original data, and updating the network parameters using backpropagation and gradient descent techniques. The proposed system offers several advantages for IoT sensor data compression. It achieves high compression ratios while preserving the essential information in the data. The multi-layer autoencoder 820 learns compact and meaningful representations of the data, exploiting spatial and temporal correlations. The correlation network 830 further enhances the compression quality by capturing dependencies and patterns within the data. Moreover, the system is adaptable and can handle various types of IoT sensor data, making it suitable for a wide range of IoT applications. It can be deployed on resource-constrained IoT devices or edge servers, reducing storage and transmission costs while maintaining data quality.

FIG. 9 is a flow diagram illustrating an exemplary method for compressing and decompressing IoT sensor data using a system for compressing and restoring data using multi-level autoencoders and correlation networks. In a first step 900, incoming IoT sensor data is organized based on its origin sensor type. IoT sensor data can be generated from various types of sensors, such as but not limited to temperature sensors, humidity sensors, pressure sensors, accelerometers, or any other sensors deployed in an IoT network. Each sensor type captures specific measurements or data points relevant to its function. The organization step involves categorizing and grouping the incoming IoT sensor data based on the type of sensor it originated from. This step helps to maintain a structured and organized representation of the data, facilitating subsequent processing and analysis.

In a step 910, the latent space vectors for each IoT sensor data set are preprocessed. Latent space vectors are lower-dimensional representations of the original data that capture the essential features and patterns. Preprocessing the latent space vectors involves applying various techniques to ensure data quality, consistency, and compatibility. This may include but is not limited to data cleaning, normalization, feature scaling, or dimensionality reduction. The preprocessing step aims to remove any noise, outliers, or inconsistencies in the latent space vectors and prepare them for the compression process.

A step 920 involves compressing each IoT sensor data set using a multi-layer autoencoder network. The multi-layer autoencoder network is a deep learning model designed to learn compact and meaningful representations of the input data. It consists of an encoder network and a decoder network. The encoder network takes the preprocessed latent space vectors as input and progressively compresses them through a series of layers, such as convolutional layers, pooling layers, and fully connected layers. The compressed representation is obtained at the bottleneck layer of the encoder network, which has a significantly reduced dimensionality compared to the original data. The multi-layer autoencoder network may include a compression system that specifically handles the compression of IoT sensor data. The compression system can employ various techniques, such as quantization, entropy coding, or sparse representations, to achieve efficient compression while preserving the essential information in the data. The compression system outputs a compressed IoT sensor data set, which is a compact representation of the original data. In step 930, the original IoT sensor data is decompressed using a decoder network. The decoder network is responsible for reconstructing the original data from the compressed representation. It takes the compressed IoT sensor data sets and applies a series of decompression operations, such as transposed convolutions or upsampling layers, to map the compressed data back to its original dimensionality.

In a step 940, correlations between compressed IoT sensor data sets are identified using a correlation network. The correlation network is a separate deep learning model that learns to capture the relationships and dependencies among different compressed IoT sensor data sets. It takes the decompressed data sets as input and identifies patterns, similarities, and correlations among them. The correlation network can utilize techniques such as convolutional layers, attention mechanisms, or graph neural networks to effectively model the interactions and dependencies between the compressed data sets. The identified correlations provide valuable insights into how different IoT sensor data sets are related and how they influence each other. These correlations can be used to improve the compression efficiency and enhance the restoration quality of the data.

In a step 950, the correlation network creates a restored, more reconstructed version of the decompressed output. By leveraging correlations between decompressed outputs, the correlation network may recover a large portion of information lost during the compression and decompression process. The restored, reconstructed output is similar to the decompressed output and the original input, but recovers information that may have been missing in the decompressed output.

Figure 10:
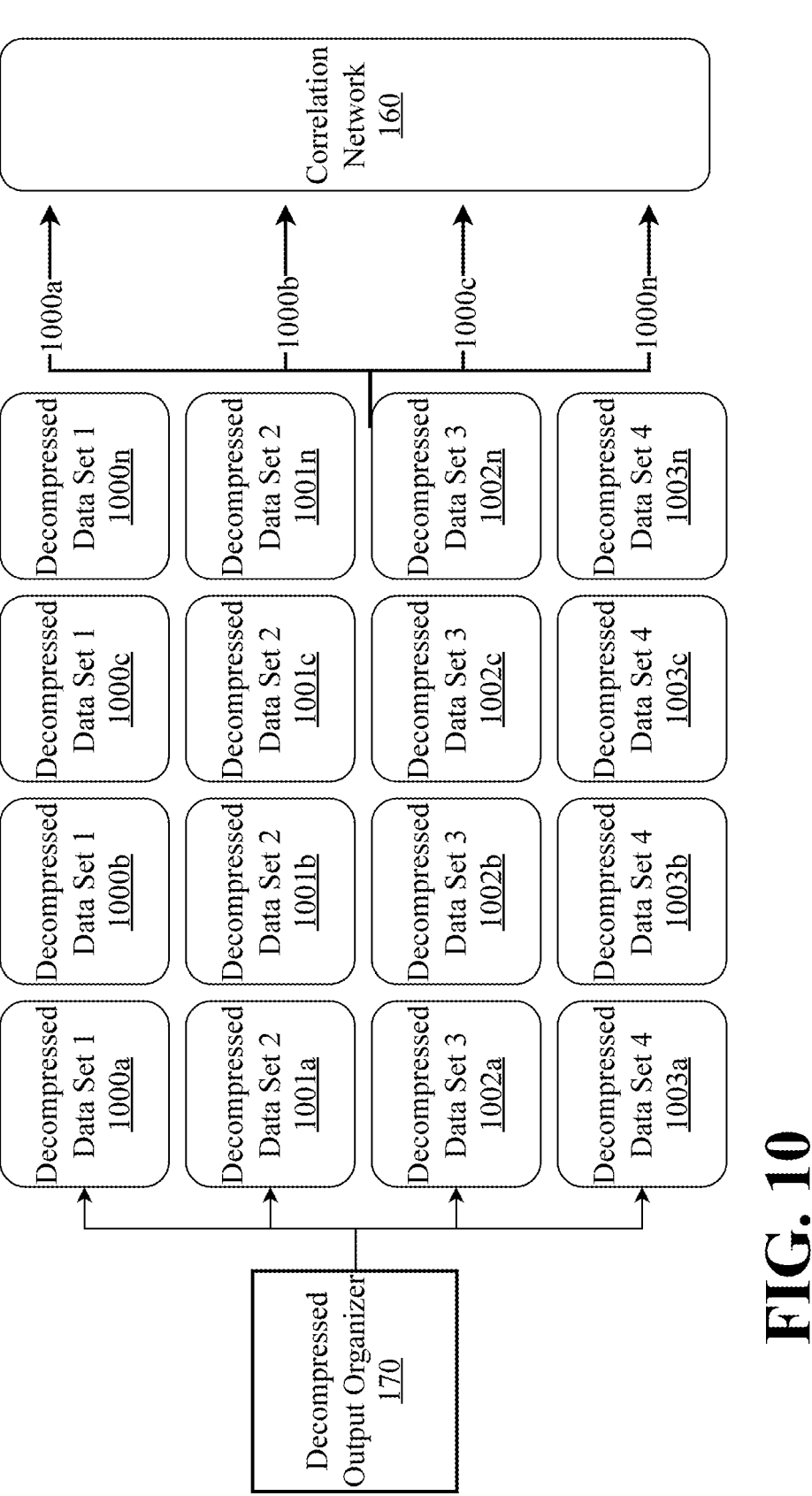
FIG. 10 is a block diagram illustrating an exemplary system architecture for a subsystem of the system for compressing and restoring data using multi-level autoencoders and correlation networks, the decompressed output organizer.

FIG. 10 is a block diagram illustrating an exemplary system architecture for a subsystem of the system for compressing and restoring data using multi-level autoencoders and correlation networks, the decompressed output organizer. In one embodiment, the decompressed output organizer 170 may create a matrix of n-by-n data sets where each data sets represents a decompressed set of information. In the embodiment depicted, the decompressed output organizer 170 outputs a 4 by 4 matrix of decompressed data sets. The organizer 170 may organizer the decompressed data sets into groups based on how correlated each data set is to each other. For example, decompressed data set 1 which includes 1000a, 1000b, 1000c, and 1000n, is a set of four data sets that the decompressed output organizer 170 has determined to be highly correlated. The same is true for decompressed data sets 2, 3, and 4.

The decompressed output organizer primes the correlation network 160 to receive an already organizer plurality of inputs. The correlation network may take a plurality of decompressed data sets as its input, depending on the size of the organized matrix produced by the decompressed output organizer 170. For example, in the embodiment depicted in FIG. 10, the decompressed output organizer 170 produces a 4 by 4 matrix of data sets. The correlation network in turn receives a 4-element data set as its input. If decompressed data set 1 were to be processed by the correlation network 160, the correlation network 160 may take 1000a, 1000b, 1000c, and 1000n, as the inputs and process all four data sets together. By clustering data sets together into groups based on how correlated they are, the decompressed output organizer 170 allows the correlation network 160 to produce more outputs that better encompass the original pre-compressed and decompressed data sets. More information may be recovered by the correlation network 160 when the inputs are already highly correlated.

Figure 11:
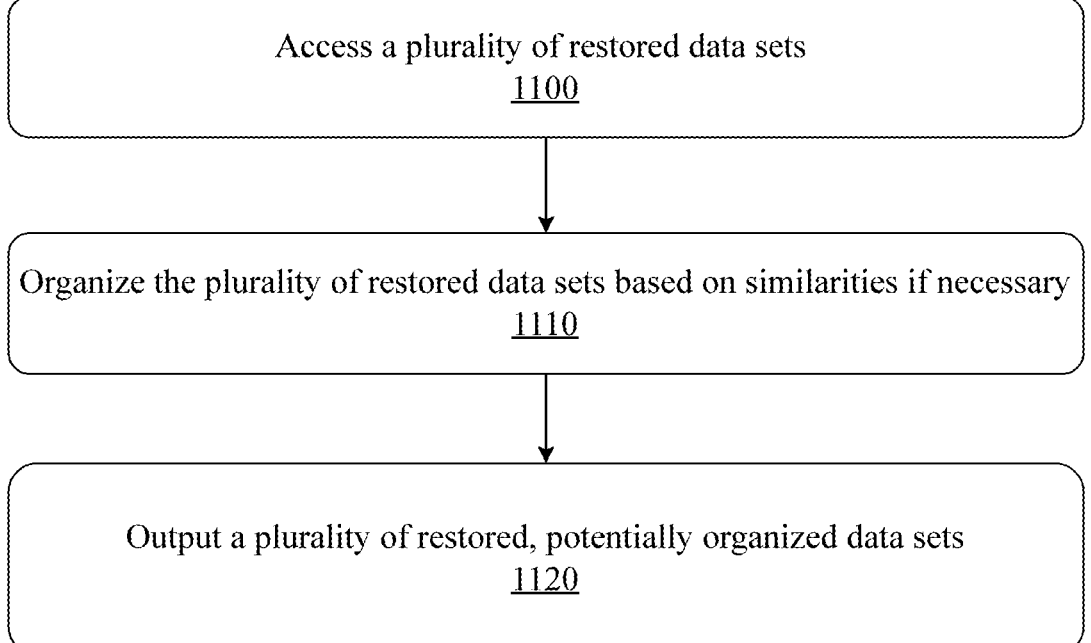
FIG. 11 is a flow diagram illustrating an exemplary method for organizing restored, decompressed data sets after correlation network processing.

FIG. 11 is a flow diagram illustrating an exemplary method for organizing restored, decompressed data sets after correlation network processing. In a first step 1100, access a plurality of restored data sets. In a step 1110, organize the plurality of restored data sets based on similarities if necessary. In a step 1120, output a plurality of restored, potentially organizer data sets. This method essentially reassesses the organizational grouping performed by the decompressed output organizer 170. The correlation network 160 may output a matrix where the matrix contains a plurality of restored, decompressed data sets. The final output of the system may reorganize the restored, decompressed data sets within the outputted matrix based on user preference and the correlations between each data set within the matrix.

Figure 12:
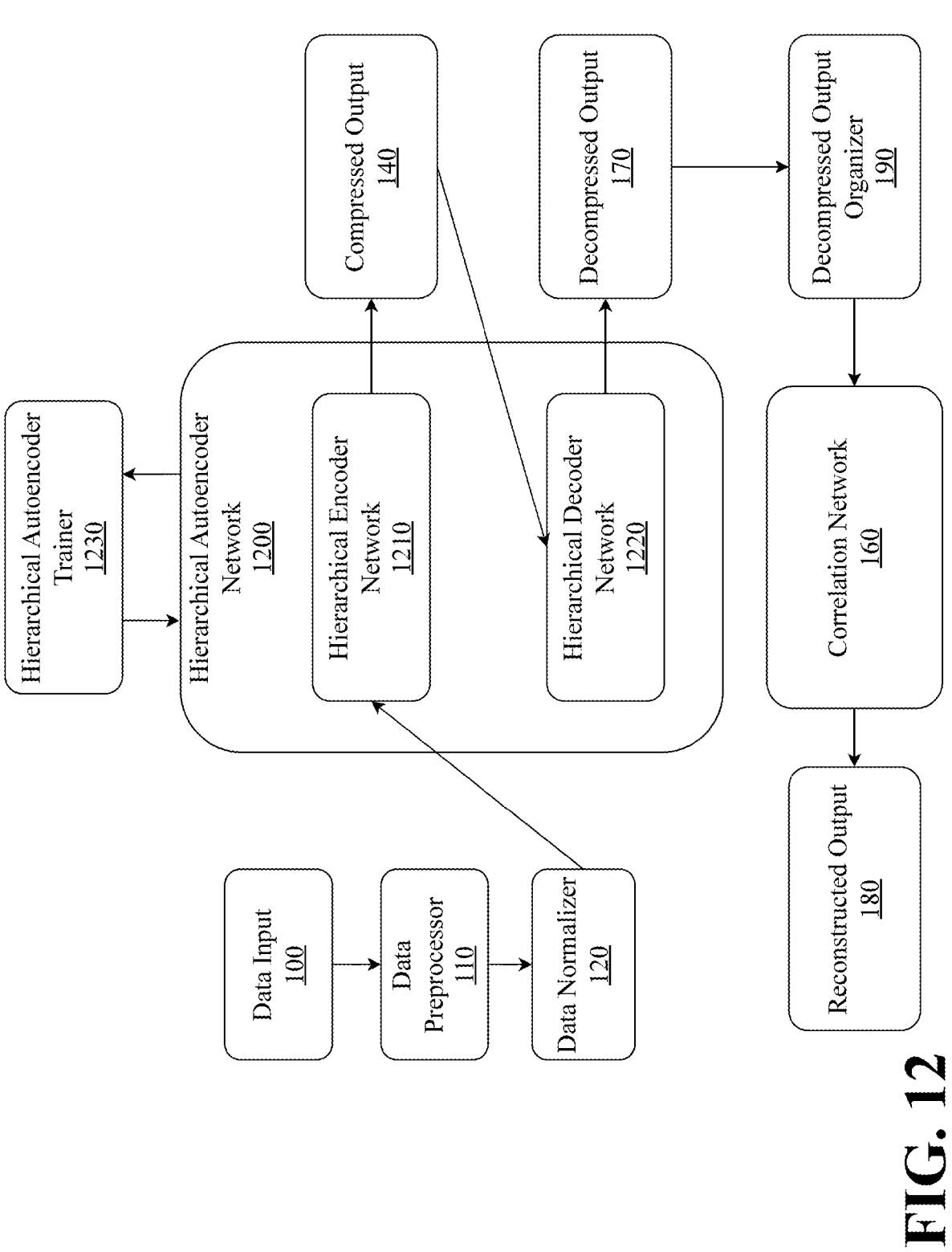
FIG. 12 is a block diagram illustrating an exemplary system architecture for compressing and restoring data using hierarchical autoencoders and correlation networks.

FIG. 12 is a block diagram illustrating an exemplary system architecture for compressing and restoring data using hierarchical autoencoders and correlation networks. This network replaces the previous single-level autoencoder, offering improved compression and decompression capabilities across multiple scales of data features.

A hierarchical autoencoder network 1200 comprises of two main components: a hierarchical encoder network 1210 and a hierarchical decoder network 1220. The hierarchical encoder network 1210 comprises multiple levels of encoders, each designed to capture and compress features at different scales. As data flows through the encoder levels, it is progressively compressed, with each level focusing on increasingly fine-grained features of the input data.

When compressing data, the system first processes the input data 100 through the data preprocessor 110 and data normalizer 120. The normalized data then enters the hierarchical encoder network 1210. The first level of the encoder captures large-scale features, passing its output to the second level, which focuses on medium-scale features. This process continues through subsequent levels, each concentrating on finer details. The final output of the hierarchical encoder network is a multi-level compressed representation, stored as the compressed output 140.

For decompression, the system utilizes the hierarchical decoder network 1220. This network mirrors the structure of the encoder but operates in reverse. The compressed output 140 enters the highest level of the decoder, which begins reconstructing the coarsest features. Each subsequent level of the decoder adds finer details to the reconstruction, using both the output from the previous level and the corresponding level's compressed representation. The final level of the decoder produces the decompressed output 170.

In one embodiment, hierarchical encoder network 1210 may include of several levels, each designed to capture features at different scales. For instance, in a four-level encoder, Level 1 (largest scale) might use convolutional layers with large kernels and aggressive pooling to capture the most general features of the image, such as overall color distribution and major structural elements. It could reduce the image to, say, ⅛ of its original dimensions. A level 2 (medium scale) which operates on the output of Level 1 might use slightly smaller kernels and less aggressive pooling to capture medium-scale features like edges and basic shapes. It might further reduce the representation to ¼ of Level 1's output. A level 3 (fine scale) could focus on more detailed features, potentially using dilated convolutions to capture longer-range dependencies without further dimension reduction. A level 4 (finest scale) might use very small kernels to capture the finest details and textures in the image, with minimal or no further dimension reduction. The compressed output 140 would be a combination of the outputs from all these levels, providing a multi-scale representation of the original image.

Similarly, hierarchical decoder network 1220 would mirror this structure in reverse. A level 4 decoder may start with the finest scale compressed representation that begins reconstructing the detailed features and textures. A level 3 decoder may combine its input with the Level 3 compressed representation, adding finer details to the reconstruction. A level 2 decoder may utilize upsampling or transposed convolutions. This level begins to restore the spatial dimensions, adding medium-scale features back into the image. A final level further upsamples the image, restoring it to its original dimensions and reconstructing the coarsest features. Each decoder level would combine the output from the previous level with the corresponding encoder level's output, allowing for the progressive restoration of details at each scale.

This multi-level approach allows the system to efficiently compress and accurately reconstruct features at various scales, potentially leading to better overall compression performance and reconstruction quality compared to a single level autoencoder. The system integrates a hierarchical autoencoder trainer 1230 to optimize the performance of the hierarchical autoencoder network 1200. This trainer adjusts the parameters of both the encoder and decoder networks across all levels, ensuring efficient compression and accurate reconstruction for various types of input data. After decompression, the system continues to employ the decompressed output organizer 190 and correlation network 160 leveraging multi-scale correlations to further enhance the reconstructed output 180. This hierarchical approach allows the system to adapt to a wide range of data types and scales, potentially achieving higher compression ratios while maintaining or improving the quality of data restoration.

Figure 13:
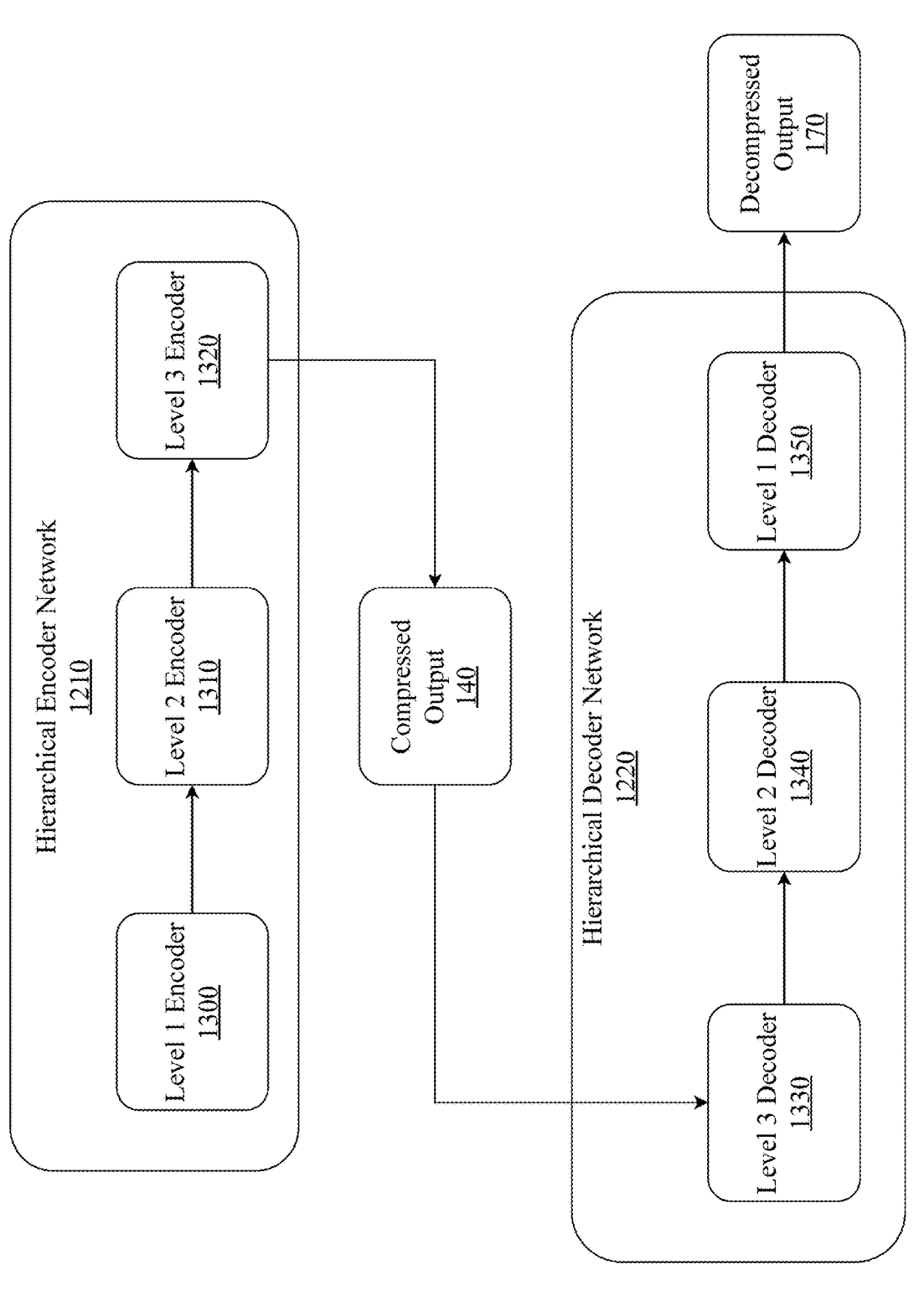
FIG. 13 is a block diagram illustrating an exemplary system architecture for a subsystem of the system for compressing and restoring data using hierarchical autoencoders and correlation networks, a hierarchical autoencoder.

FIG. 13 is a block diagram illustrating an exemplary system architecture for a subsystem of the system for compressing and restoring data using hierarchical autoencoders and correlation networks, a hierarchical autoencoder. This multi-level architecture enables the system to process and represent data at various scales, leading to more efficient compression and higher-quality restoration.

The hierarchical encoder network 1210 comprises multiple encoding levels. In the illustrated example the hierarchical encoder network includes 3 layers of both encoders and decoders to effectively compress and decompress various levels of input representations. Each level is designed to capture and compress different aspects of the input data:

A level 1 encoder 1300 focuses on large-scale, global features of the input. For instance, in image data, this level might capture overall color distributions, major structural elements, or low-frequency patterns. It employs techniques such as large convolutional kernels or aggressive pooling to downsample the input significantly. A level 2 encoder 1310 processes the output from level 1 encoder 1300, concentrating on medium-scale features. It might identify edges, basic shapes, or texture patterns. This level typically uses smaller convolutional kernels and less aggressive pooling, striking a balance between feature detail and data reduction.

A level 3 encoder 1320 targets fine-grained details in the data. It might employ techniques like dilated convolutions to capture intricate patterns or long-range dependencies without further downsampling. This level preserves the highest frequency components of the input that are still relevant for reconstruction. The outputs from all encoder levels are combined to form the compressed output 140, which is a multi-scale representation of the original input. This approach allows the system to retain important information at various scales, facilitating more effective compression than a single-scale approach.

The hierarchical decoder network 1220 mirrors the encoder structure, with level 3 decoder 1330, level 2 decoder 1340, and level 1 decoder 1350. These decoders work in concert to progressively reconstruct the original input. Level 3 decoder 1330 begins the reconstruction process using the finest-scale information from the compressed output. It may employ techniques like small convolutional kernels or attention mechanisms to start rebuilding detailed features. A level 2 decoder 1340 combines its input with corresponding information from the compressed output to add medium-scale features. It may use upsampling or transposed convolutions to increase spatial dimensions, reconstructing shapes and edges.

Level 1 decoder 1350 finalizes the reconstruction, integrating coarse-scale features and restoring the output to its original dimensions. It may use larger convolutional kernels or sophisticated upsampling techniques to ensure smooth, globally coherent outputs. In one embodiment, each decoder level not only uses the output from the previous decoder level but also incorporates the corresponding encoder level's output. This creates short-cut connections that allow high-fidelity details to flow more directly from input to output, potentially improving reconstruction quality.

By leveraging different aspects of the input at each level, this hierarchical structure allows the system to compress data more efficiently and restore it more accurately. Coarse levels capture global structure and context, while finer levels preserve intricate details. This multi-scale approach enables the system to adapt to various types of data and achieve a better balance between compression ratio and reconstruction quality compared to single-scale methods. The decompressed output 170 produced by this hierarchical process retains both large-scale structures and fine details of the original input, providing a high-quality reconstruction that can be further refined by subsequent stages of the system, such as the correlation network.

Figure 14:
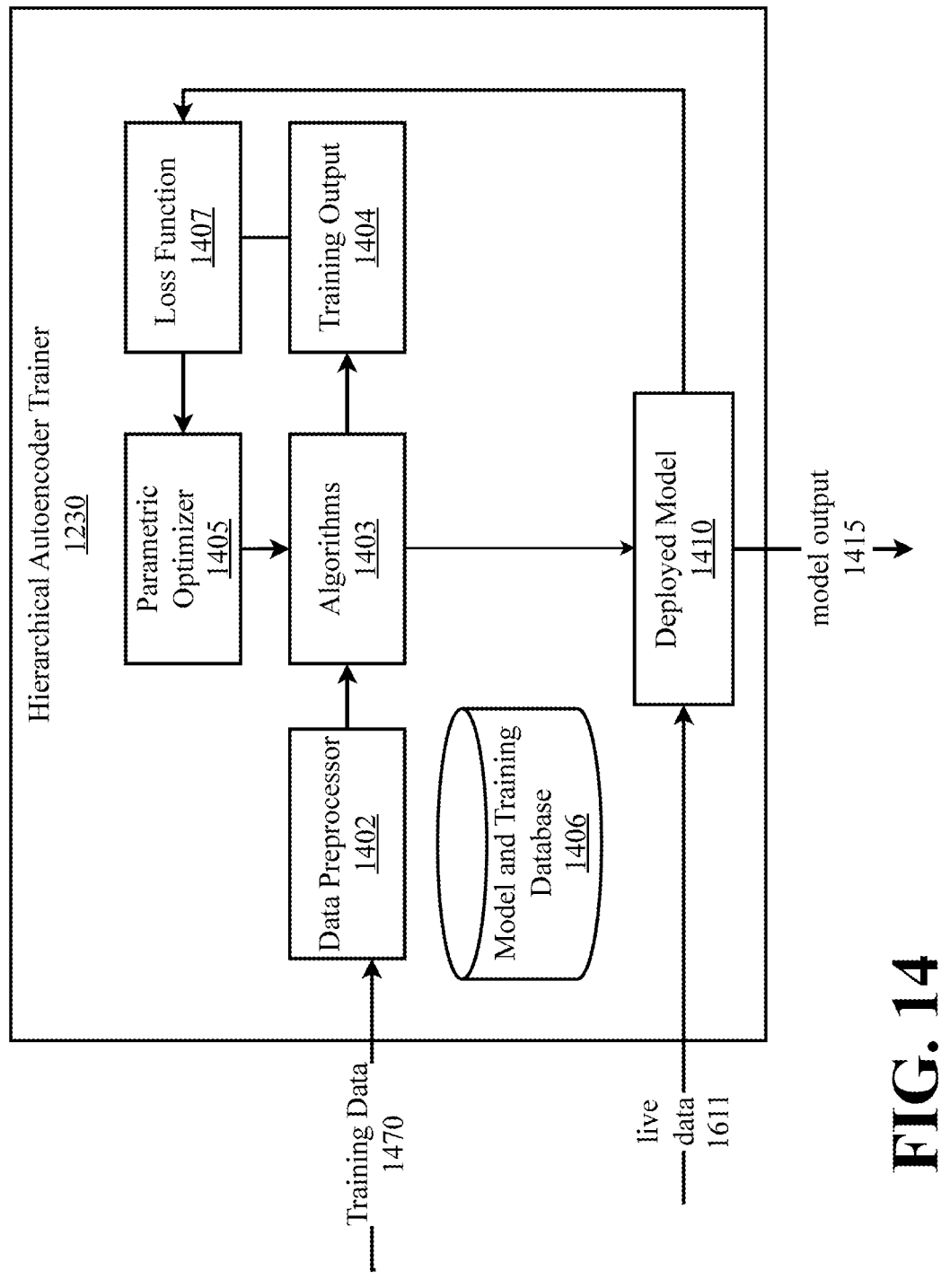
FIG. 14 is a block diagram illustrating an exemplary system architecture for a subsystem of the system for compressing and restoring data using hierarchical autoencoders and correlation networks, a hierarchical autoencoder trainer.

FIG. 14 is a block diagram illustrating an exemplary system architecture for a subsystem of the system for compressing and restoring data using hierarchical autoencoders and correlation networks, a hierarchical autoencoder trainer. According to the embodiment, the hierarchical autoencoder training system 1230 may comprise a model training stage comprising a data preprocessor 1402, one or more machine and/or deep learning algorithms 1403, training output 1404, and a parametric optimizer 1405, and a model deployment stage comprising a deployed and fully trained model 1410 configured to perform tasks described herein such as transcription, summarization, agent coaching, and agent guidance. Hierarchical autoencoder trainer 1230 may be used to train and deploy the hierarchical autoencoder network 1200 to support the services provided by the compression and restoration system.

At the model training stage, a plurality of training data 401 may be received at the hierarchical autoencoder trainer 270. In a use case directed to hyperspectral images, a plurality of training data may be sourced from data collectors including but not limited to satellites, airborne sensors, unmanned aerial vehicles, ground-based sensors, and medical devices. Hyperspectral data refers to data that includes wide ranges of the electromagnetic spectrum. It could include information in ranges including but not limited to the visible spectrum and the infrared spectrum. Data preprocessor 1402 may receive the input data (e.g., hyperspectral data, text data, image data, audio data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 1403 to train a predictive model for object monitoring and detection.

During model training, training output 1404 is produced and used to measure the quality and efficiency of the compressed outputs. During this process a parametric optimizer 1405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the hierarchical autoencoder trainer 1230 to evaluate a model's performance. Metrics can include, but are not limited to, compression ratio, the amount of data lost, the size of the compressed file, and the speed at which data is compressed, to name a few. In one embodiment, the system may utilize a loss function 407 to measure the system's performance. The loss function 1407 compares the training outputs with an expected output and determined how the algorithm needs to be changed in order to improve the quality of the model output. During the training stage, all outputs may be passed through the loss function 1407 on a continuous loop until the algorithms 1403 are in a position where they can effectively be incorporated into a deployed model 1415.

The test dataset can be used to test the accuracy of the model outputs. If the training model is compressing or decompressing data to the user's preferred standards, then it can be moved to the model deployment stage as a fully trained and deployed model 1410 in a production environment compressing or decompressing live input data 1411 (e.g., hyperspectral data, text data, image data, video data, audio data). Further, model compressions or decompressions made by deployed model can be used as feedback and applied to model training in the training stage, wherein the model is continuously learning over time using both training data and live data and predictions.

A model and training database 1406 is present and configured to store training/test datasets and developed models. Database 1406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 1403 may comprise a deep learning algorithm such as neural networks (e.g., recurrent, convolutional, long short-term memory networks, etc.). In some implementations, the hierarchical autoencoder trainer 1230 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 1406.

In one embodiment, hierarchical autoencoder trainer 1230 may employ a flexible approach to optimize the performance of both the hierarchical encoder and decoder networks. It can train each level of the encoders and decoders either separately or jointly, adapting to the specific requirements of the system and the characteristics of the input data. When training levels separately, the trainer focuses on optimizing each level's ability to capture or reconstruct features at its particular scale, allowing for fine-tuned performance at each stage of the compression and decompression process. This approach can be particularly useful when dealing with diverse data types or when specific levels require specialized attention. Alternatively, joint training of multiple or all levels enables the system to learn inter-level dependencies and optimize the overall compression-decompression pipeline as a cohesive unit. This can lead to improved global performance and more efficient use of the network's capacity. The trainer may also employ a hybrid approach, starting with separate level training to establish baseline performance, followed by joint fine-tuning to enhance overall system coherence. This adaptive training strategy ensures that the hierarchical autoencoder network can be optimized for a wide range of applications and data types, maximizing both compression efficiency and reconstruction quality.

FIG. 15 is a flow diagram illustrating an exemplary method for compressing and restoring data using hierarchical autoencoders and correlation networks. In a first step 1500, the system collects and preprocesses a plurality of data sets from various data sources. This initial stage involves gathering diverse data types, which may include images, videos, sensor readings, or other forms of structured or unstructured data. The preprocessing phase is crucial for preparing the data for efficient compression. It may involve tasks such as noise reduction, normalization, and feature extraction. By standardizing the input data, this step ensures that the subsequent compression process can operate effectively across different data modalities and scales.

In a step 1510, the system compresses the normalized data sets using a hierarchical multi-layer autoencoder network. This step marks the beginning of the advanced compression process, utilizing the sophisticated hierarchical structure of the autoencoder. The hierarchical approach allows for a more nuanced and efficient compression compared to traditional single-layer methods, as it can capture and preserve information at multiple scales simultaneously.

In a step 1520, the system processes the data through the level 1 encoder, focusing on large-scale features, and continues through subsequent levels, each focusing on finer-scale features. This multi-level encoding is at the heart of the hierarchical compression process. The level 1 encoder captures broad, global features of the data, while each subsequent level concentrates on increasingly fine-grained details. This approach ensures that the compressed representation retains a rich, multi-scale characterization of the original data, potentially leading to better compression ratios and more accurate reconstruction.

In a step 1530, the system outputs the multi-level compressed representation or stores it for future processing. This step represents the culmination of the compression process, where the hierarchically compressed data is either immediately utilized or securely stored. The multi-level nature of this compressed representation allows for flexible use in various applications, potentially enabling progressive decompression or scale-specific analysis without full decompression.

In a step 1540, the system inputs the multi-level compressed representation into the hierarchical decoder when decompression is required. This step initiates the reconstruction process, leveraging the multi-scale information captured during compression. The hierarchical decoder mirrors the structure of the encoder, progressively rebuilding the data from the coarsest to the finest scales.

In a step 1550, the system processes the decompressed output through a correlation network to restore data potentially lost during compression. This advanced restoration step goes beyond simple decompression, utilizing learned correlations at multiple scales to infer and recreate details that may have been diminished or lost in the compression process. The approach of the correlation network complements the hierarchical nature of the autoencoder, potentially leading to higher quality reconstructions.

In a step 1560, the system outputs the restored, reconstructed data set. This final step delivers the fully processed data, which has undergone hierarchical compression, decompression, and correlation-based enhancement. The resulting output aims to closely resemble the original input data, with the potential for even enhancing certain aspects of the data through the learned correlations and multi-scale processing.

Figure 31:
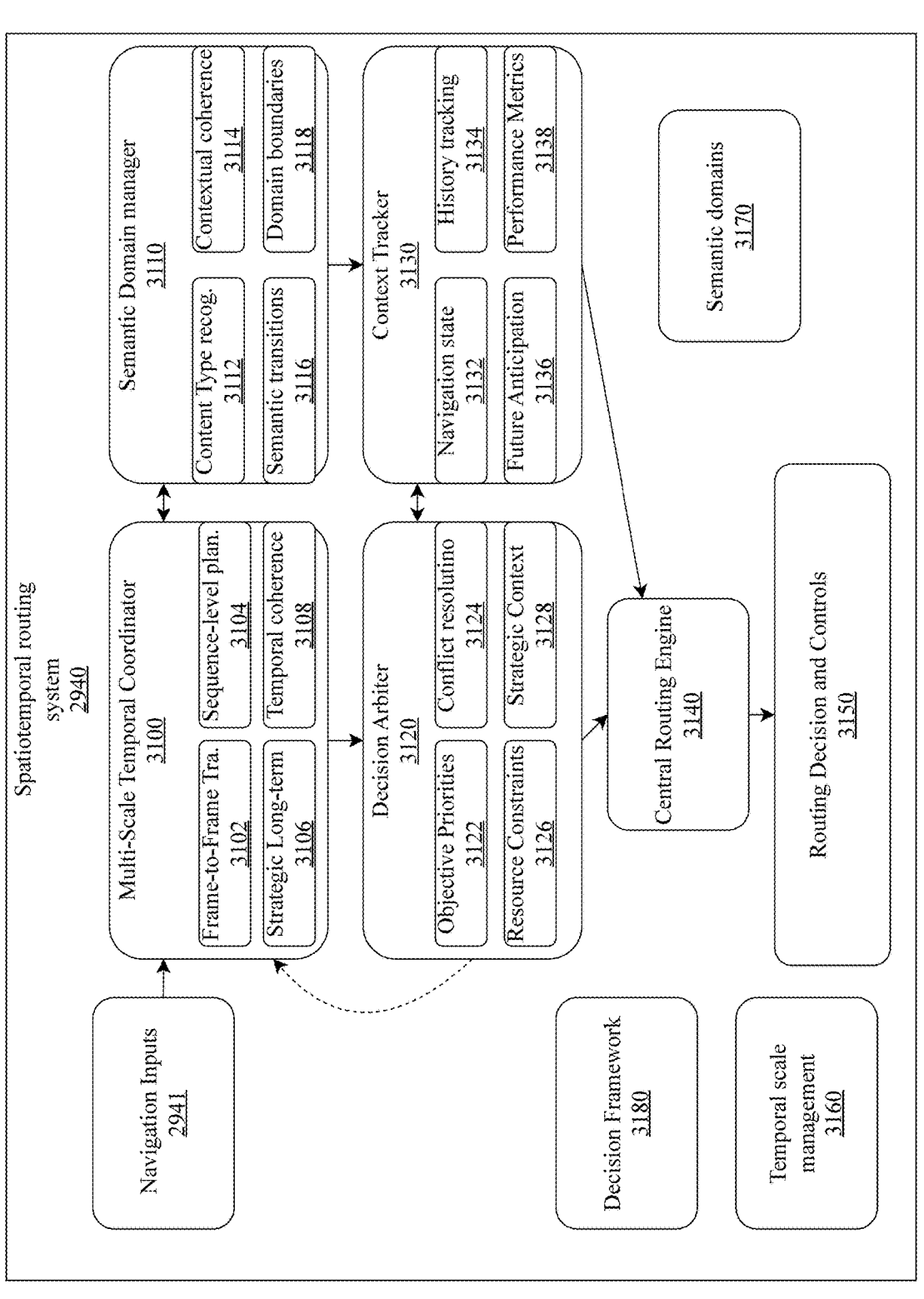
FIG. 31 is a block diagram illustrating an exemplary architecture for a spatiotemporal routing system.

FIG. 31 is a block diagram illustrating an exemplary architecture for a spatiotemporal routing system 2940 configured to manage navigation decisions across multiple temporal scales and semantic domains within the latent hyperspace navigation system for spatiotemporal media. The spatiotemporal routing system 2940 provides intelligent coordination between immediate navigation requirements and long-term strategic objectives while maintaining temporal consistency and semantic coherence throughout extended navigation sequences, enabling sophisticated traversal strategies that balance local optimization with global strategic considerations.

The system receives navigation inputs 2941 comprising essential contextual information required for intelligent routing decisions, including the current position within the latent space providing spatial context for navigation planning, strategic objectives defining the desired outcomes and constraints that should guide routing decisions, and temporal constraints specifying timing requirements, sequence dependencies, and deadline considerations that affect routing feasibility and optimization strategies. These navigation inputs 2941 provide the foundation for all subsequent routing decisions by establishing the current state, desired outcomes, and operational limitations that must be considered during path planning and execution.

The multi-scale temporal coordinator 3100 serves as a critical component responsible for managing navigation decisions across different time horizons, from immediate frame-to-frame transitions to long-term strategic planning spanning entire media sequences or extended cognitive sessions. This coordinator ensures that immediate navigation decisions remain consistent with broader temporal objectives and maintain coherent progression through the media content across multiple temporal scales simultaneously. The multi-scale temporal coordinator 3100 operates through four specialized processing modules that collectively address the complete spectrum of temporal coordination requirements.

The frame-to-frame transitions module 3102 handles the finest temporal granularity, managing smooth navigation between adjacent frames or immediate temporal neighbors within the latent space while ensuring that micro-scale movements maintain continuity and avoid jarring discontinuities that could compromise the user experience or system performance. This module operates at the highest frequency, making rapid decisions about immediate navigation steps while considering their cumulative impact on longer-term trajectory goals.

The sequence-level planning module 3104 coordinates navigation decisions across intermediate temporal spans, typically encompassing complete scenes, actions, or thematically coherent segments of media content. This module balances the immediate requirements managed by the frame-to-frame transitions module 3102 with the broader strategic considerations handled by higher-level planning components, ensuring that sequence-level coherence is maintained while supporting both detailed navigation and strategic objectives.

The strategic long-term module 3106 handles navigation planning across extended temporal horizons, coordinating decisions that affect entire sessions, episodes, or comprehensive exploration sequences. This module considers the broadest temporal context and ensures that immediate and intermediate decisions support overarching strategic goals while maintaining flexibility for adaptive responses to changing conditions or emerging opportunities.

The temporal coherence module 3108 monitors and enforces consistency across all temporal scales, ensuring that decisions made at different time horizons remain mutually compatible and collectively contribute to coherent navigation experiences. This module detects and resolves temporal conflicts, prevents contradictory decisions across different temporal scales, and maintains the mathematical and semantic consistency required for successful navigation execution.

The semantic domain manager 3110 handles navigation across different semantic regions within the latent space, ensuring that transitions between different types of content maintain appropriate contextual coherence while supporting strategic navigation objectives. This component understands the relationships between different semantic domains and facilitates smooth transitions or deliberate contrasts between different content regions depending on the specific requirements of the navigation task.

The content type recognition module 3112 identifies and categorizes the semantic characteristics of different regions within the latent space, enabling the routing system to make informed decisions about appropriate navigation strategies based on the nature of the content being traversed. This module maintains awareness of content categories, style variations, thematic elements, and other semantic distinctions that affect routing decisions.

The contextual coherence module 3114 ensures that navigation paths maintain semantic consistency and meaningful relationships between traversed content regions, preventing jarring transitions that would create semantic conflicts or conceptual discontinuities. This module evaluates the semantic compatibility of proposed navigation paths and suggests adjustments when coherence issues are detected.

The semantic transitions module 3116 manages the specific mechanisms for navigating between different semantic domains, implementing strategies for smooth transitions, deliberate contrasts, or other semantic navigation patterns based on strategic objectives and contextual requirements. This module handles the technical aspects of semantic boundary traversal while maintaining content quality and user experience.

The domain boundaries module 3118 identifies and characterizes the boundaries between different semantic regions, providing essential information for navigation planning and execution. This module maps the semantic landscape of the latent space and identifies optimal crossing points, transition zones, and potential barriers that affect routing feasibility and efficiency.

The decision arbiter 3120 resolves conflicts between competing navigation objectives and selects optimal paths when multiple viable options exist, implementing sophisticated decision-making algorithms that consider multiple factors including objective priorities, resource constraints, temporal requirements, and strategic context. This component serves as the central decision-making authority that integrates inputs from all other system components to make final routing determinations.

The objective priorities module 3122 evaluates and ranks competing navigation goals based on strategic importance, user preferences, system capabilities, and contextual factors, providing a systematic framework for making trade-off decisions when multiple objectives cannot be simultaneously optimized. This module implements priority assessment algorithms that adapt to changing conditions and emerging requirements.

The conflict resolution module 3124 identifies and resolves contradictions between different navigation objectives, temporal requirements, semantic constraints, and resource limitations, implementing systematic approaches for finding acceptable compromises or alternative solutions when direct conflicts cannot be avoided. This module employs advanced optimization techniques to find solutions that satisfy the most critical requirements while minimizing compromise on secondary objectives.

The resource constraints module 3126 monitors and enforces limitations on computational resources, memory usage, processing time, and other system capabilities that affect routing feasibility and performance, ensuring that routing decisions remain within acceptable operational boundaries while maximizing navigation effectiveness. This module provides essential feedback about system capacity and performance limitations that influence routing strategy selection.

The strategic context module 3128 maintains awareness of broader strategic considerations, long-term objectives, and contextual factors that influence routing decisions beyond immediate tactical requirements, ensuring that navigation choices support overarching goals and maintain consistency with established strategic directions. This module provides the high-level perspective necessary for intelligent long-term navigation planning.

The context tracker 3130 maintains awareness of the current navigation state, recent history, and anticipated future requirements, providing essential contextual information that enables intelligent routing decisions based on comprehensive situational understanding. This component ensures that routing decisions consider not only immediate requirements but also historical patterns, performance trends, and anticipated future needs.

The navigation state module 3132 continuously monitors the current position, velocity, and trajectory within the latent space, providing real-time awareness of system status and navigation progress that informs immediate routing decisions and enables adaptive responses to changing conditions or unexpected obstacles.

The history tracking module 3134 maintains records of recent navigation decisions, performance outcomes, and system behavior patterns, enabling the routing system to learn from experience and avoid repeating unsuccessful strategies while building on proven approaches that have demonstrated effectiveness in similar scenarios.

The future anticipation module 3136 analyzes current trends, strategic objectives, and contextual factors to predict likely future requirements and challenges, enabling proactive routing decisions that position the system advantageously for anticipated developments and emerging opportunities.

The performance metrics module 3138 continuously evaluates routing effectiveness across multiple dimensions including efficiency, accuracy, user satisfaction, and strategic goal achievement, providing quantitative feedback that enables continuous improvement of routing algorithms and strategies through data-driven optimization approaches.

The central routing engine 3140 integrates inputs from all specialized components to perform multi-objective optimization and implement real-time route adjustments based on comprehensive analysis of temporal, semantic, strategic, and contextual factors. This engine represents the computational core that transforms the analyzed information into concrete routing decisions and navigation commands.

The multi-objective optimization capability enables the central routing engine 3140 to balance competing requirements and constraints while finding solutions that maximize overall system effectiveness across multiple evaluation criteria simultaneously. Real-time route adjustment capability enables dynamic adaptation to changing conditions, emerging opportunities, or unexpected obstacles without requiring complete re-planning of navigation strategies.

The temporal scale management framework 3160 provides systematic coordination across multiple time horizons ranging from immediate frame-level decisions (1-10 milliseconds) through short-term sequence planning (100 milliseconds to 1 second), medium-term scene coordination (1-10 seconds), long-term episode management (10 seconds to minutes), and strategic session planning (minutes to hours). This comprehensive temporal framework ensures that decisions made at each scale remain compatible and mutually supportive while enabling adaptive responses appropriate to the specific temporal context.

The semantic domains framework 3170 manages navigation across diverse content categories including visual scenes, object categories, motion patterns, narrative elements, emotional content, and contextual settings, ensuring smooth transitions between semantic regions while maintaining content quality and user experience. This framework provides the semantic intelligence necessary for meaningful navigation that respects content relationships and maintains conceptual coherence.

The decision framework 3180 implements a systematic seven-step process for routing decisions: assessment of current context and objectives, evaluation of temporal scale requirements, analysis of semantic domain constraints, resolution of competing objectives, selection of optimal routing strategy, execution with continuous monitoring, and adaptation based on performance feedback. This structured approach ensures consistent and comprehensive decision-making that considers all relevant factors while maintaining efficiency and effectiveness.

The routing decisions and controls 3150 represent the final outputs of the spatiotemporal routing system 2940, providing optimal navigation paths that balance all considered factors, timing coordination that ensures proper temporal sequencing and synchronization, and resource allocation that manages system capabilities effectively while maximizing navigation performance. These outputs enable successful navigation execution that achieves strategic objectives while maintaining operational efficiency and user satisfaction.

The spatiotemporal routing system 2940 thus provides a comprehensive framework for intelligent navigation decision-making that operates effectively across multiple temporal scales and semantic domains while maintaining consistency with strategic objectives and operational constraints. The system's integration of temporal coordination, semantic management, decision arbitration, and contextual awareness enables sophisticated routing strategies that adapt dynamically to changing conditions while maintaining coherent and effective navigation performance across diverse scenarios and applications.

Figure 32:
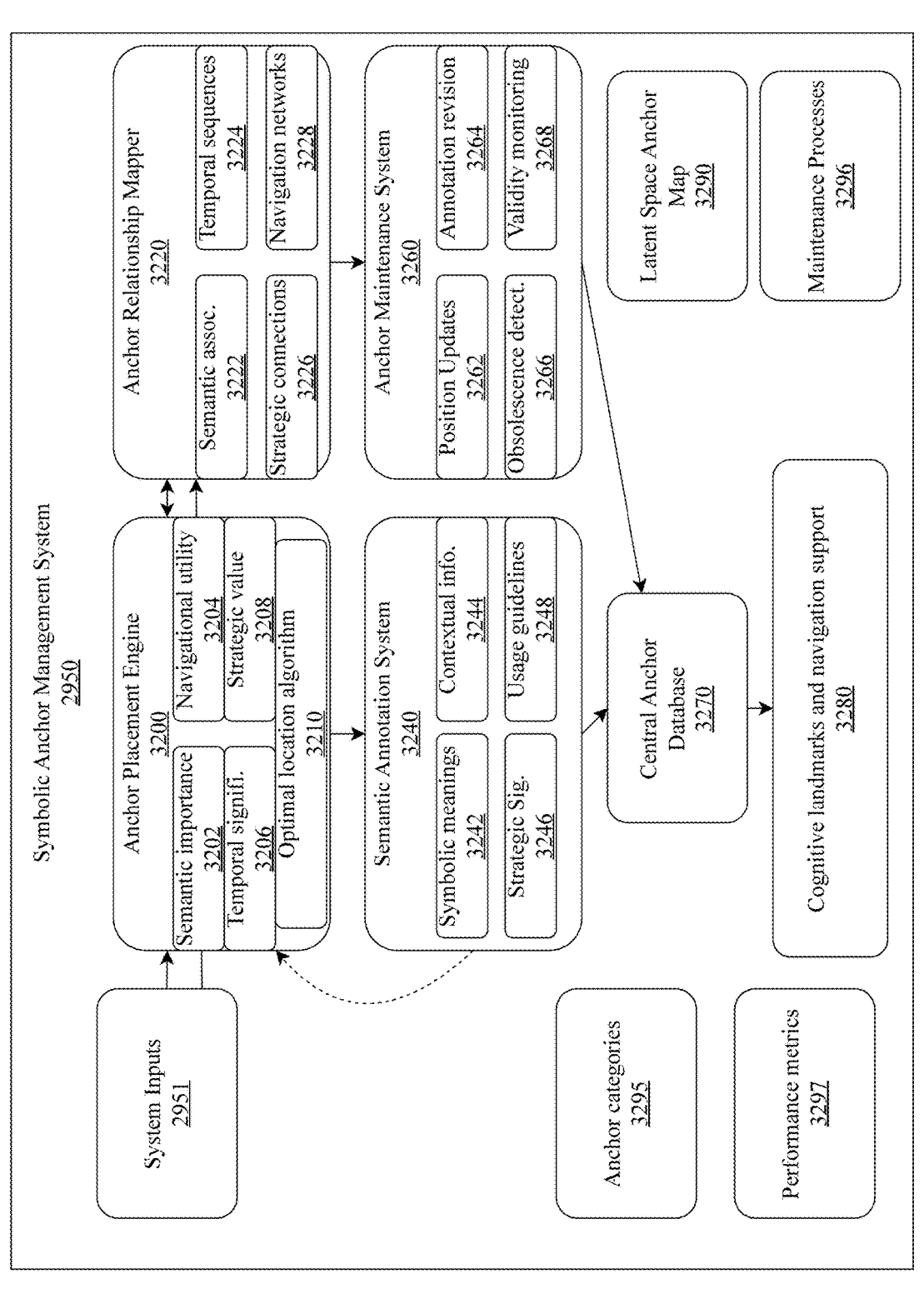
FIG. 32 is a block diagram illustrating an exemplary architecture for a symbolic anchor management system.

FIG. 32 is a block diagram illustrating an exemplary architecture for a symbolic anchor management system 2950 configured to maintain persistent reference points throughout the latent hyperspace that serve as cognitive landmarks for navigation and decision-making within the spatiotemporal media processing framework. The symbolic anchor management system 2950 creates and maintains a structured network of semantically significant waypoints that enable consistent navigation across extended temporal sequences, provide stable reference points for strategic planning and execution, and support intelligent decision-making by establishing persistent landmarks that retain their identity and utility as the latent space evolves through continued use and learning.

The system receives comprehensive system inputs 2951 that provide the essential contextual information required for intelligent anchor placement and management, including the latent space structure that defines the geometric and semantic organization of the compressed media representations, navigation patterns that reveal frequently traversed paths and preferred routes through the hyperspace, semantic content analysis that identifies meaningful concepts, themes, and relationships within the media content, and strategic objectives that define the goals and priorities that should guide anchor placement and utilization decisions. These inputs 2951 establish the foundation for all anchor management operations by providing both the structural context within which anchors must operate and the functional requirements that anchors must satisfy to support effective navigation and cognitive processing.

The anchor placement engine 3200 serves as the primary component responsible for identifying semantically significant locations within the latent space and establishing symbolic anchors at optimal positions that maximize their utility for navigation, cognitive processing, and strategic decision-making. The placement engine 3200 implements sophisticated analysis algorithms that evaluate potential anchor locations across multiple dimensions to ensure that established anchors provide maximum value for the intended applications while avoiding redundancy and maintaining efficient resource utilization.

The semantic importance assessment module 3202 analyzes the conceptual significance of different regions within the latent space, identifying locations that represent important semantic boundaries, conceptual clusters, or meaningful content categories that warrant persistent reference points for navigation and cognitive processing. This module employs advanced semantic analysis techniques to evaluate the conceptual density, thematic coherence, and semantic distinctiveness of potential anchor locations, ensuring that anchors are placed at positions that provide maximum semantic utility for content understanding and navigation guidance.

The navigational utility evaluation module 3204 assesses the strategic value of potential anchor locations for supporting efficient and effective navigation through the latent hyperspace, considering factors such as centrality within frequently traversed regions, accessibility from multiple navigation paths, and connectivity to other important locations within the space. This module analyzes traffic patterns, path optimization requirements, and navigation efficiency metrics to identify locations that would serve as optimal waypoints for common navigation scenarios and strategic routing objectives.

The temporal significance analysis module 3206 evaluates the importance of potential anchor locations within the temporal structure of the media content, identifying positions that represent critical temporal milestones, narrative turning points, or significant temporal boundaries that provide valuable reference points for temporal navigation and sequence understanding. This module considers factors such as temporal stability, sequence relationships, and chronological significance to ensure that anchors support coherent temporal navigation and maintain appropriate temporal context awareness.

The strategic value assessment module 3208 analyzes potential anchor locations in terms of their alignment with broader strategic objectives, long-term navigation goals, and overall system effectiveness requirements, ensuring that anchor placement decisions support not only immediate navigation needs but also contribute to long-term strategic success and operational efficiency. This module considers factors such as strategic alignment, objective support, resource optimization, and system-wide performance enhancement to guide anchor placement decisions that contribute to overall system effectiveness.

The optimal location algorithm 3210 integrates inputs from all assessment modules to compute the most advantageous positions for anchor placement, using advanced optimization techniques that balance competing requirements and constraints to identify locations that maximize overall utility while satisfying operational limitations and resource constraints. This algorithm employs multi-objective optimization approaches that consider semantic importance, navigational utility, temporal significance, and strategic value simultaneously to produce anchor placement decisions that optimize system performance across all relevant dimensions.

The anchor relationship mapper 3220 maintains comprehensive understanding of the relationships between different anchors, enabling the system to utilize anchors not as isolated waypoints but as components of larger navigation strategies and decision frameworks that leverage the interconnected structure of the anchor network. The relationship mapper 3220 creates and maintains a graph structure that captures the various types of relationships between anchors and supports intelligent navigation planning that takes advantage of anchor connectivity and relationship patterns.

The semantic associations mapping module 3222 identifies and maintains records of conceptual relationships between different anchors, including thematic similarities, categorical relationships, and semantic proximity measures that enable intelligent navigation based on content meaning and conceptual coherence. This module creates semantic linkages that support content-aware navigation and enable the system to suggest navigation paths that maintain conceptual consistency and thematic coherence.

The temporal sequences tracking module 3224 analyzes and records the temporal relationships between anchors, including chronological ordering, sequence dependencies, and temporal proximity measures that support navigation strategies based on temporal logic and narrative flow. This module enables the system to provide navigation guidance that respects temporal constraints and supports coherent progression through temporally structured content.

The strategic connections analysis module 3226 identifies and maintains awareness of strategic relationships between anchors, including hierarchical relationships, dependency structures, and strategic pathways that support navigation strategies aligned with broader objectives and long-term goals. This module creates strategic linkages that enable the system to coordinate anchor utilization with overall strategic planning and objective achievement.

The navigation networks construction module 3228 synthesizes information from all relationship analysis components to create comprehensive navigation networks that connect related anchors through multiple types of relationships, enabling sophisticated navigation strategies that leverage the full structure of the anchor ecosystem. This module constructs multi-layered network representations that support various navigation approaches and enable the system to adapt navigation strategies based on current objectives and contextual requirements.

The semantic annotation system 3240 associates symbolic meanings, contextual information, and strategic significance with each anchor, creating rich metadata structures that enable informed decision-making about anchor usage and facilitate effective communication between different system components about navigation objectives and constraints. The annotation system 3240 provides the semantic intelligence necessary for anchors to serve as meaningful cognitive landmarks rather than simple geometric waypoints. The symbolic meanings assignment module 3242 creates and maintains symbolic representations of anchor significance, including conceptual labels, thematic categories, and semantic descriptors that enable both human users and system components to understand and utilize anchors effectively based on their conceptual significance and symbolic meaning. This module provides the conceptual framework that transforms geometric positions into meaningful cognitive landmarks. The contextual information management module 3244 maintains comprehensive contextual data associated with each anchor, including situational factors, environmental conditions, and usage contexts that affect anchor utility and appropriateness for different navigation scenarios. This module ensures that anchor utilization decisions consider not only the inherent properties of anchors but also the contextual factors that influence their effectiveness and appropriateness. The strategic significance evaluation module 3246 assesses and maintains records of the strategic importance of each anchor within the broader context of system objectives and long-term goals, enabling intelligent prioritization of anchor utilization and maintenance resources based on strategic value and objective alignment. This module provides the strategic intelligence necessary for effective anchor management and resource allocation decisions. The usage guidelines development module 3248 creates and maintains operational guidelines for anchor utilization, including recommended usage patterns, appropriate application contexts, and optimization strategies that enable both automated systems and human operators to utilize anchors effectively and efficiently. This module provides the operational intelligence necessary for consistent and effective anchor utilization across diverse scenarios and applications.

The anchor maintenance system 3260 ensures that anchors remain valid and useful as the system accumulates experience and the latent space evolves through continued use, implementing comprehensive maintenance processes that preserve anchor utility while adapting to changing conditions and requirements. The maintenance system 3260 provides the adaptive capabilities necessary for long-term anchor effectiveness and system sustainability. The position updates module 3262 monitors anchor positions within the evolving latent space and implements position adjustments when necessary to maintain optimal anchor utility and accessibility as the underlying geometric structure changes through learning, adaptation, or content evolution. This module ensures that anchors maintain their intended functionality even as the latent space undergoes dynamic changes. The annotation revision module 3264 continuously evaluates and updates anchor annotations to reflect changing semantic significance, evolving contextual factors, and updated strategic priorities, ensuring that anchor metadata remains accurate and useful for navigation and decision-making purposes. This module maintains the semantic intelligence of anchors through adaptive annotation management. The obsolescence detection module 3266 identifies anchors that have become outdated, redundant, or counterproductive, implementing systematic approaches for recognizing when anchors no longer serve useful purposes and should be removed or significantly modified to maintain system efficiency and effectiveness. This module prevents anchor proliferation and maintains optimal anchor network density and utility. The validity monitoring module 3268 continuously assesses anchor performance, utility, and effectiveness across multiple dimensions, providing quantitative feedback about anchor value and identifying opportunities for improvement or optimization in anchor placement, annotation, or utilization strategies. This module enables data-driven anchor management and continuous system improvement.

The central anchor database 3270 provides persistent storage and efficient access mechanisms for the complete anchor ecosystem, implementing sophisticated data structures that support rapid retrieval, relationship querying, and complex navigation planning while maintaining data integrity and system performance. The database 3270 includes persistent anchor storage capabilities that ensure anchor information survives system restarts and maintains long-term continuity, and relationship indexing mechanisms that enable efficient querying of anchor connections and support complex navigation planning algorithms.

The latent space anchor map 3290 provides a visual and computational representation of anchor positions and relationships within the geometric structure of the latent hyperspace, showing strategic anchors, semantic landmarks, and their interconnections that enable both human understanding and automated navigation planning. This map includes strategic anchors that represent important decision points and navigation waypoints, and semantic landmarks that mark significant conceptual boundaries and thematic regions within the latent space.

The anchor categories framework 3295 defines and manages different types of anchors based on their functional roles and semantic significance, including decision points that mark important choice nodes in navigation paths, semantic boundaries that delineate different conceptual regions, navigation waypoints that provide efficient routing support, content landmarks that mark significant media features, strategic checkpoints that support long-term planning objectives, memory markers that provide persistent reference points for recall and recognition, temporal references that mark important chronological positions, and contextual boundaries that delineate different situational contexts. Each anchor type serves specific cognitive and navigation functions that contribute to overall system effectiveness and user experience.

The maintenance processes framework 3296 implements systematic procedures for anchor lifecycle management, including usage monitoring that tracks anchor utilization patterns and effectiveness metrics, relevance assessment that evaluates anchor significance and utility over time, position optimization that adjusts anchor locations for maximum effectiveness, relationship updates that maintain accurate connection information between anchors, obsolescence pruning that removes outdated or counterproductive anchors, new anchor creation that establishes additional landmarks as needed, and performance evaluation that assesses overall anchor network effectiveness. This continuous adaptation ensures optimal utility and prevents performance degradation over time.

The performance metrics system 3297 provides comprehensive quantitative assessment of anchor network effectiveness, including navigation efficiency measures that evaluate how well anchors support optimal routing, anchor utilization rates that monitor usage patterns and identify underutilized or overutilized anchors, semantic accuracy metrics that assess the correctness and utility of anchor semantic annotations, strategic alignment measures that evaluate how well anchors support broader system objectives, user satisfaction indicators that capture user experience quality, maintenance overhead assessments that monitor resource requirements for anchor management, and adaptation effectiveness measures that evaluate the success of anchor evolution and optimization processes. This quantitative assessment drives optimization decisions and enables continuous improvement of anchor management strategies.

The cognitive landmarks and navigation support outputs 3280 represent the final products of the symbolic anchor management system 2950, providing strategic waypoints that guide navigation planning and execution, semantic reference points that support content understanding and conceptual navigation, navigation guidance that assists in route planning and execution, decision support that aids in strategic choice-making, memory anchors that support recall and recognition processes, and contextual landmarks that provide situational awareness and environmental understanding. These outputs enable sophisticated navigation and cognitive processing capabilities that transform the latent hyperspace into a navigable cognitive terrain with persistent landmarks and reliable reference points.

The symbolic anchor management system 2950 thus provides a comprehensive framework for creating, maintaining, and utilizing persistent cognitive landmarks within the latent hyperspace, enabling sophisticated navigation strategies that leverage semantic understanding, temporal awareness, and strategic intelligence. The system's integration of placement optimization, relationship mapping, semantic annotation, and adaptive maintenance creates a robust and intelligent anchor ecosystem that enhances navigation effectiveness while supporting complex cognitive processing requirements across diverse applications and scenarios.

Figure 33:
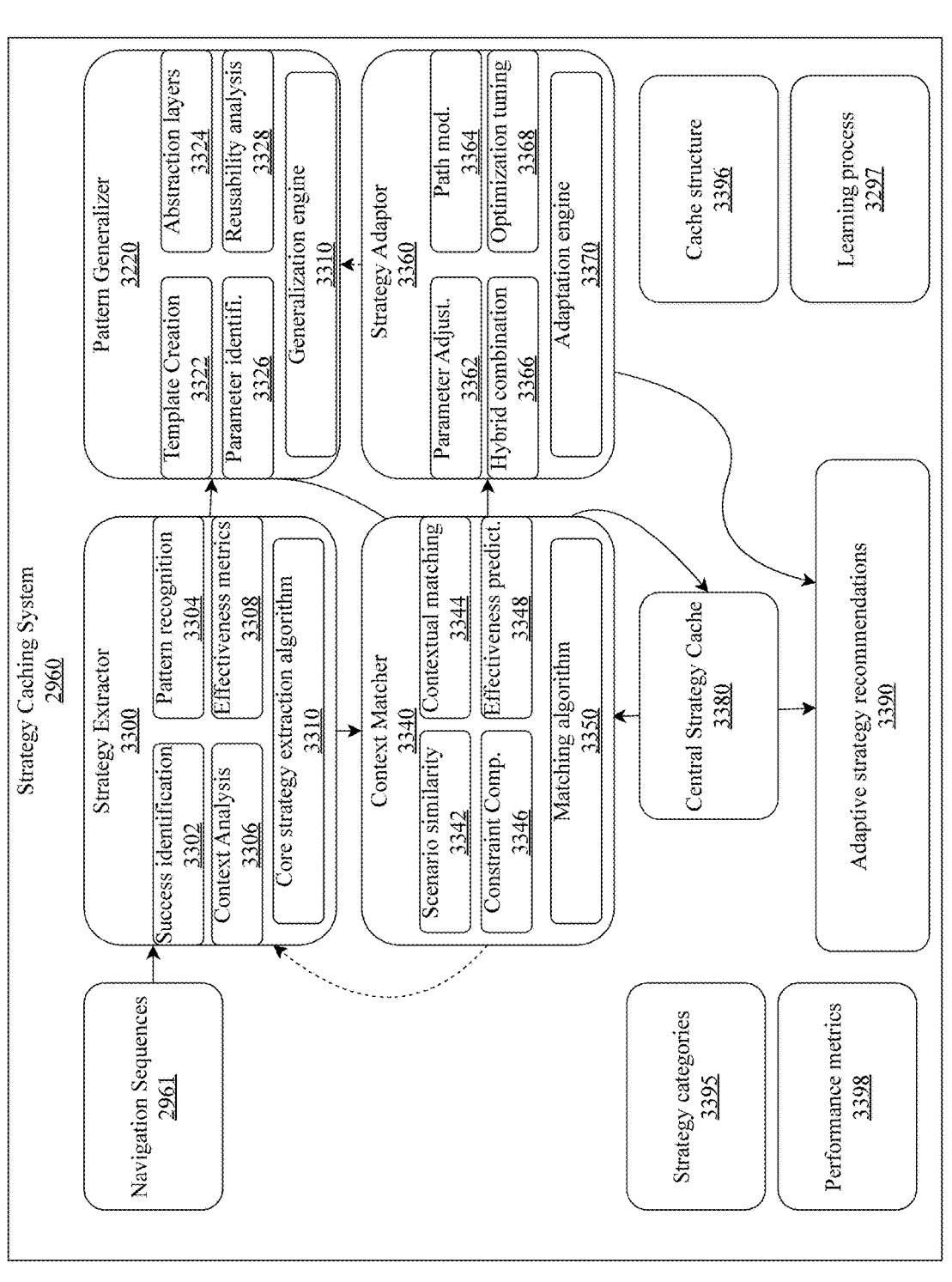
FIG. 33 is a block diagram illustrating an exemplary architecture for a strategy caching system.

FIG. 33 is a block diagram illustrating an exemplary architecture for a strategy caching system 2960 configured to preserve successful navigation patterns, decision sequences, and contextual associations for reuse across similar scenarios within the latent hyperspace navigation system for spatiotemporal media. The strategy caching system 2960 creates a form of procedural memory that enables the system to develop increasingly sophisticated behaviors through experience and learning, capturing not only the navigation paths themselves but also the contextual conditions, decision criteria, and outcome measures that contributed to their success, thereby enabling intelligent strategy selection and adaptation based on scenario similarity and expected effectiveness.

The system receives navigation sequences 2961 comprising comprehensive records of completed navigation activities that serve as the raw material for strategy extraction and learning processes. These navigation sequences 2961 include completed navigation paths that document the actual routes taken through the latent hyperspace during successful navigation episodes, decision sequences that record the specific choices made at each decision point along with the reasoning and criteria that influenced those decisions, contextual conditions that capture the environmental, strategic, and operational factors that were present during navigation execution, and outcome measures that quantify the success, efficiency, and effectiveness of the navigation activities across multiple performance dimensions. These inputs 2961 provide the foundation for all strategy learning and caching operations by establishing both the behavioral patterns that should be preserved and the contextual frameworks that determine when those patterns are applicable and effective.

The strategy extractor 3300 serves as the primary component responsible for identifying successful navigation patterns from completed sequences and extracting the essential elements that contributed to their success, implementing sophisticated analysis algorithms that distinguish between incidental features of navigation episodes and the fundamental patterns that enable successful outcomes. The extractor 3300 transforms raw navigation data into structured strategy representations that capture the essential characteristics of successful approaches while abstracting away scenario-specific details that might limit reusability across different contexts.

The success identification module 3302 analyzes completed navigation sequences to determine which episodes achieved their objectives effectively and efficiently, implementing comprehensive evaluation criteria that consider multiple dimensions of success including objective achievement, resource efficiency, temporal performance, user satisfaction, and strategic alignment. This module establishes the foundation for all subsequent strategy extraction by ensuring that only genuinely successful patterns are captured and preserved for future reuse.

The pattern recognition module 3304 identifies recurring themes, decision patterns, and behavioral sequences within successful navigation episodes, employing advanced machine learning techniques to detect both obvious and subtle patterns that contribute to navigation success. This module analyzes decision trees, path characteristics, timing patterns, and optimization strategies to extract the underlying principles that enable effective navigation across diverse scenarios. The context analysis module 3306 examines the environmental, strategic, and operational conditions that were present during successful navigation episodes, identifying the contextual factors that influenced strategy effectiveness and determining the range of conditions under which specific strategies are likely to remain effective. This module provides essential information for strategy applicability assessment and adaptation planning. The effectiveness metrics module 3308 quantifies the performance characteristics of successful strategies across multiple evaluation dimensions, establishing objective measures of strategy quality that enable comparative assessment and optimization prioritization. This module creates performance profiles that guide strategy selection and adaptation decisions based on quantitative effectiveness data.

The core strategy extraction algorithm 3310 integrates inputs from all analysis modules to identify and formalize the essential elements of successful navigation strategies, creating structured representations that capture both the behavioral patterns and the contextual requirements that enable strategy effectiveness. This algorithm produces strategy templates that serve as the foundation for generalization and reuse across similar scenarios.

The pattern generalizer 3320 transforms specific successful strategies into more general templates that can be applied across similar but not identical scenarios, implementing sophisticated abstraction techniques that identify the core principles underlying successful strategies while removing scenario-specific details that might limit broader applicability. The generalizer 3320 creates reusable strategy templates that capture the essential characteristics of successful approaches while maintaining sufficient flexibility for adaptation to new contexts and requirements.

The template creation module 3322 develops structured strategy representations that capture the essential patterns, decision criteria, and execution approaches from successful navigation episodes, creating standardized formats that enable consistent strategy storage, retrieval, and application across diverse scenarios. This module produces templates that balance specificity with generality to maximize reusability while maintaining effectiveness. The abstraction layers module 3324 implements hierarchical abstraction mechanisms that capture strategy characteristics at multiple levels of detail, from high-level strategic approaches to specific tactical implementations, enabling strategy application across scenarios with different complexity levels and detail requirements. This module creates multi-level strategy representations that support both strategic planning and tactical execution. The parameter identification module 3326 analyzes strategy templates to identify the variable parameters that can be adjusted to adapt strategies to different contexts while maintaining their essential effectiveness characteristics. This module creates parameterized strategy representations that enable systematic adaptation based on contextual requirements and constraints. The reusability analysis module 3328 evaluates strategy templates to assess their potential applicability across different scenarios, identifying the range of contexts where strategies are likely to remain effective and the types of adaptations that may be required for successful application. This module provides essential guidance for strategy selection and adaptation planning.

The generalization engine 3330 integrates inputs from all generalization modules to produce optimized strategy templates that maximize reusability while maintaining effectiveness, implementing advanced optimization techniques that balance generality with specificity to create templates that provide maximum value across diverse application scenarios. The context matcher 3340 identifies when cached strategies are applicable to current navigation scenarios by comparing contextual conditions, objectives, and constraints between current scenarios and the historical contexts where strategies demonstrated effectiveness. The matcher 3340 implements sophisticated similarity assessment algorithms that consider multiple dimensions of scenario compatibility to ensure that strategy selection decisions are based on comprehensive contextual analysis rather than superficial similarities. The scenario similarity assessment module 3342 analyzes the correspondence between current navigation scenarios and the historical contexts where cached strategies achieved success, implementing multi-dimensional similarity measures that consider strategic objectives, environmental conditions, resource constraints, and performance requirements. This module provides quantitative similarity assessments that guide strategy selection decisions. The contextual matching module 3344 evaluates the compatibility between current contextual conditions and the environmental factors that influenced strategy effectiveness in historical episodes, ensuring that strategy selection considers not only objective similarities but also the contextual prerequisites for strategy success. This module prevents inappropriate strategy application by identifying contextual mismatches that could compromise effectiveness. The constraint compatibility module 3346 analyzes whether current operational constraints and limitations are compatible with the requirements and assumptions underlying cached strategies, ensuring that strategy selection considers practical feasibility and resource availability rather than relying solely on strategic desirability. This module prevents strategy selection errors that could result from constraint violations or resource insufficiency. The effectiveness prediction module 3348 estimates the likely performance of cached strategies in current scenarios based on similarity assessments and contextual analysis, providing quantitative predictions that enable informed strategy selection decisions based on expected outcomes rather than historical performance alone. This module supports data-driven strategy selection that considers scenario-specific effectiveness predictions.

The matching algorithm 3350 integrates inputs from all assessment modules to produce comprehensive strategy compatibility evaluations that guide selection decisions, implementing advanced decision-making algorithms that balance multiple competing factors to identify the most appropriate strategies for current scenarios while considering both effectiveness potential and adaptation requirements.

The strategy adaptor 3360 modifies cached strategies to better fit current navigation requirements when direct application is not optimal, implementing sophisticated adaptation techniques that preserve the essential characteristics that enabled strategy success while adjusting parameters, approaches, and implementations to match current contextual requirements and constraints. The adaptor 3360 enables flexible strategy reuse that maintains effectiveness while accommodating scenario variations and evolving requirements. The parameter adjustment module 3362 modifies the variable parameters within strategy templates to optimize their performance for current scenarios, implementing systematic parameter optimization techniques that consider current objectives, constraints, and environmental conditions. This module enables fine-tuned strategy adaptation that maintains strategic coherence while optimizing tactical implementation. The path modification module 3364 adapts navigation paths and routing decisions within cached strategies to accommodate current spatial, temporal, and semantic constraints while preserving the strategic principles that contributed to original strategy success. This module enables strategy application across scenarios with different geometric and temporal characteristics. The hybrid combination module 3366 creates new strategies by combining elements from multiple cached strategies when no single strategy provides optimal coverage for current requirements, implementing intelligent fusion techniques that preserve the most effective elements from different strategies while creating coherent integrated approaches. This module enables creative strategy synthesis that leverages multiple successful approaches simultaneously. The optimization tuning module

3368 fine-tunes adapted strategies to maximize their performance in current scenarios, implementing advanced optimization techniques that consider current objectives, constraints, and performance criteria to produce strategies that are specifically optimized for current requirements rather than merely adapted from historical patterns.

The adaptation engine 3370 coordinates all adaptation activities to produce optimized strategies that effectively address current navigation requirements while maintaining the essential characteristics that enabled success in historical contexts, ensuring that adaptation preserves strategic effectiveness while enabling contextual flexibility and optimization.

The central strategy cache 3380 provides persistent storage and efficient access mechanisms for the complete strategy ecosystem, implementing sophisticated data structures that support rapid retrieval, similarity querying, and performance-based ranking while maintaining data integrity and system performance. The cache 3380 includes template storage capabilities that preserve strategy representations with their associated metadata, performance histories, and applicability criteria, and performance indexing mechanisms that enable efficient retrieval of strategies based on effectiveness measures, contextual requirements, and similarity criteria.

The strategy categories framework 3395 organizes cached strategies into functional classifications based on their operational characteristics and application domains, including navigation patterns that focus on efficient path planning and route optimization, decision sequences that capture effective choice-making approaches for complex scenarios, optimization strategies that maximize performance across various evaluation dimensions, resource allocation approaches that manage computational and operational resources effectively, error recovery protocols that handle unexpected obstacles and failures gracefully, efficiency improvements that enhance performance while maintaining quality standards, adaptation protocols that enable flexible responses to changing conditions, and learning strategies that facilitate continuous improvement and capability development. Each category supports specific operational needs and enables targeted strategy retrieval based on functional requirements.

The cache structure framework 3396 implements hierarchical organization of cached strategies based on performance levels and applicability scope, including high-performance strategies that have demonstrated exceptional effectiveness across multiple scenarios, medium-performance strategies that provide reliable but not optimal results across standard scenarios, learning strategies that show promise but require additional validation and refinement, and experimental strategies that represent novel approaches requiring careful evaluation before broader application. This hierarchical organization enables efficient strategy selection based on performance requirements and risk tolerance.

The learning process framework 3397 implements systematic procedures for strategy discovery, validation, and integration, including pattern extraction that identifies promising behavioral patterns from navigation data, success evaluation that assesses strategy effectiveness across multiple performance dimensions, template creation that formalizes successful patterns into reusable representations, generalization that extends strategy applicability across broader scenario ranges, cache integration that incorporates new strategies into the persistent storage system, performance monitoring that tracks strategy effectiveness over time, and adaptive refinement that continuously improves strategy quality through experience accumulation. This continuous improvement through experience accumulation ensures that the strategy cache evolves and improves over time.

The performance tracking framework 3398 provides comprehensive quantitative assessment of strategy cache effectiveness, including success rates that measure strategy achievement of intended objectives, efficiency measures that evaluate resource utilization and temporal performance, adaptation quality assessments that evaluate how well strategies adjust to new contexts, resource utilization monitoring that tracks computational and operational overhead, user satisfaction indicators that capture user experience quality, learning velocity measures that assess the rate of strategy improvement and capability development, and strategy diversity metrics that evaluate the breadth and variety of available strategic approaches. This quantitative feedback drives optimization decisions and enables continuous improvement of strategy caching effectiveness.

The adaptive strategy recommendations 3390 represent the final products of the strategy caching system 2960, providing optimized navigation strategies that have been selected and adapted based on comprehensive analysis of current requirements and historical effectiveness patterns, context-adapted approaches that have been modified to match current scenario characteristics while preserving proven effectiveness principles, hybrid solutions that combine elements from multiple successful strategies to address complex requirements that no single strategy could handle optimally, performance predictions that estimate expected outcomes based on historical data and current scenario analysis, resource estimates that project computational and operational requirements for strategy execution, and success probabilities that quantify the likelihood of achieving desired outcomes based on strategy characteristics and scenario compatibility. These recommendations enable informed decision-making about navigation approaches while providing transparency about expected performance and resource requirements. The strategy caching system 2960 thus provides a comprehensive framework for learning from navigation experience and applying accumulated knowledge to improve future performance through intelligent strategy selection, adaptation, and optimization. The system's integration of pattern extraction, generalization, contextual matching, and adaptive modification creates a robust procedural memory capability that enables continuous improvement and increasingly sophisticated navigation behaviors through systematic learning from successful experience.

Figure 20:
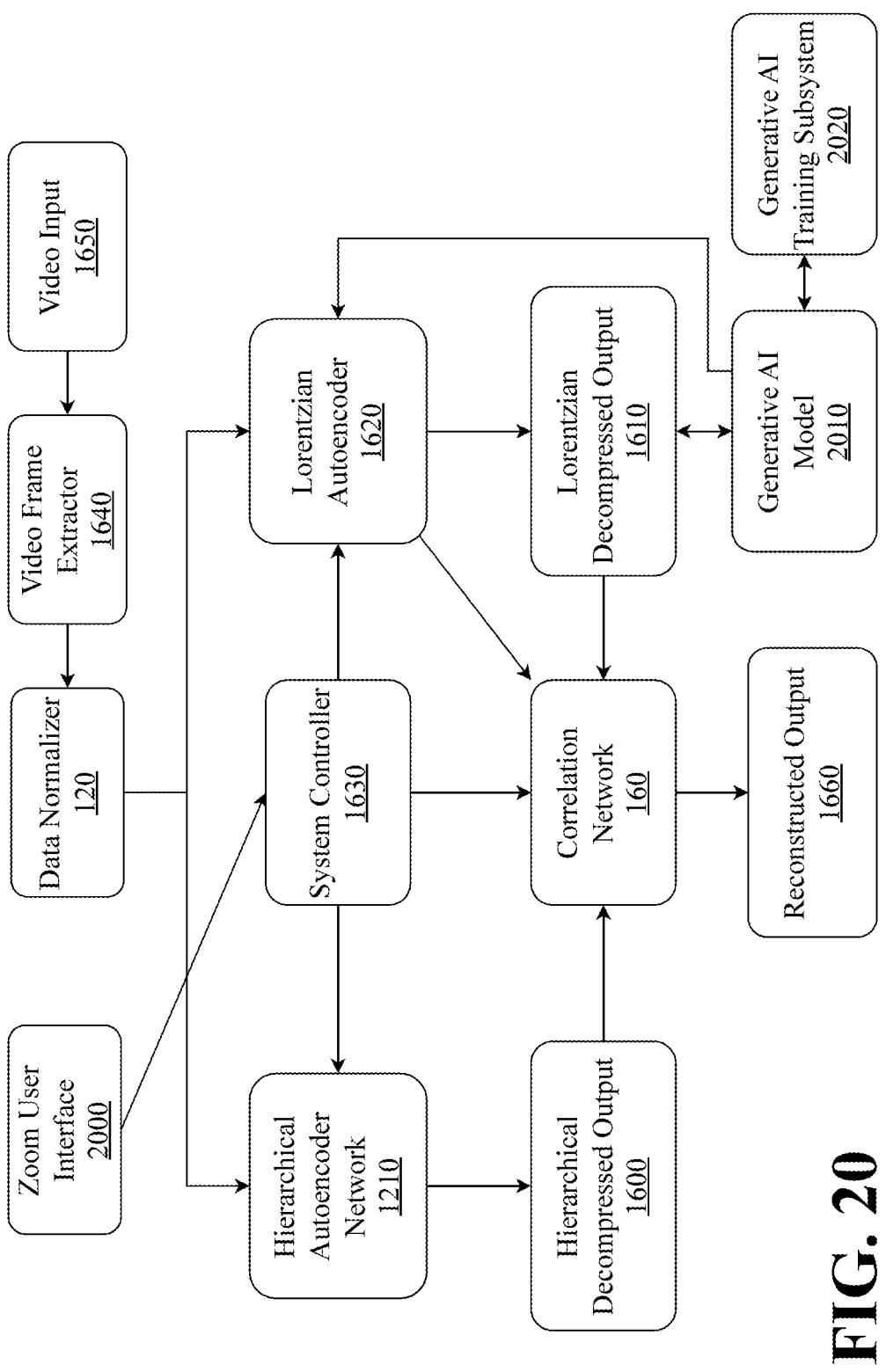
FIG. 20 is a block diagram illustrating an exemplary system architecture for video-focused compression with enhanced continuous zoom capabilities.

FIG. 20 is a block diagram illustrating an exemplary system architecture for video-focused compression with enhanced continuous zoom capabilities. The system combines traditional compression techniques with generative AI to enable seamless infinite zoom functionality across multiple scales.

The system begins with a video input 1650 which provides the source video content for processing. This video input may include various forms of video content such as movies, sports broadcasts, documentaries, surveillance footage, or other video media that would benefit from interactive zoom capabilities. The video input is processed by a video frame extractor 1640 which segments the incoming video stream into appropriate units for processing, extracting frames and organizing them into three-dimensional tensors where the first two dimensions represent spatial information and the third dimension represents time, preserving spatiotemporal relationships necessary for continuous zoom operations.

The extracted video frames are then passed to a data normalizer 120 which standardizes the data to consistent ranges and scales. This normalization ensures that different video sources with varying characteristics can be processed effectively by the neural networks in subsequent stages, maintaining consistency when zooming across different lighting conditions or visual styles.

For traditional data processing, the system employs a hierarchical autoencoder network 1210 which processes data through multiple levels of abstraction, capturing features at different scales and resolutions. This hierarchical approach enables multi-resolution representation that supports zooming by providing appropriate levels of detail at different magnification levels, producing a hierarchical decompressed output 1600 that preserves the multi-scale nature of the original content.

For video-specific processing, the system utilizes a Lorentzian autoencoder 1620 which maintains the tensor structure throughout the compression process. This specialized autoencoder preserves spatiotemporal relationships by applying 3D convolutional operations directly to the video tensor structure, ensuring that motion patterns, temporal continuity, and spatial coherence are maintained during zoom operations at any magnification level. Lorentzian autoencoder produces a Lorentzian decompressed output 1610 that retains the essential structural information needed for high-quality restoration and infinite zoom capabilities.

A system controller 1630 coordinates operations between the different processing components, managing compression parameters, quality settings, and zoom functionality. System controller receives input from a zoom user interface 2000 which allows users to interactively select regions of interest and specify desired magnification levels. For example, in a sports broadcast application, a user might start with a wide view of the field, zoom in to focus on a particular play, and continue zooming to see intricate details of player interactions that weren't clearly visible in the original video frame.

The system employs a generative AI model 2010 which works in conjunction with the Lorentzian autoencoder to generate plausible visual details beyond the resolution of the original video. When a user zooms into a region beyond the original resolution, the generative AI model synthesizes new details based on learned patterns and contextual information. For instance, when zooming into a historical battle scene, the generative AI might generate historically accurate uniform details, weapon characteristics, and environmental elements based on the context of the scene and historical reference data.

A generative AI training subsystem 2020 provides continuous improvement of the generative capabilities through specialized training on diverse video content. This training subsystem ensures that the generative components can produce realistic and contextually appropriate details across a wide range of video scenarios and zoom levels, learning to simulate plausible fine details for both zoom-in operations and broader contextual elements for zoom-out operations.

Both the hierarchical decompressed output and Lorentzian decompressed output are enhanced by a correlation network 160 which analyzes patterns and relationships between different aspects of the decompressed data. The correlation network exploits temporal and spatial patterns to recover information that might have been lost during compression, enhancing the continuity and realism of video as users navigate through different zoom levels.

The final stage of the system produces a reconstructed output which represents the fully processed and restored video data, with seamless integration of both compressed/decompressed original content and generatively enhanced details. This reconstructed output enables bidirectional continuous zoom experiences where users can explore video content at any scale, from wide panoramic views (zooming out from the original frame) to extreme close-ups (zooming in beyond original resolution), with smooth transitions between scales and consistent visual quality throughout the zoom range.

In practical implementation, this architecture enables applications such as virtual tourism where viewers can start with a landscape view and zoom in to explore architectural details or cultural artifacts; educational documentaries where students can examine scientific phenomena at progressively finer scales; and entertainment experiences where viewers can discover hidden details in scenes or explore contextual surroundings beyond the original frame, creating a more immersive and interactive viewing experience.

Figure 21:
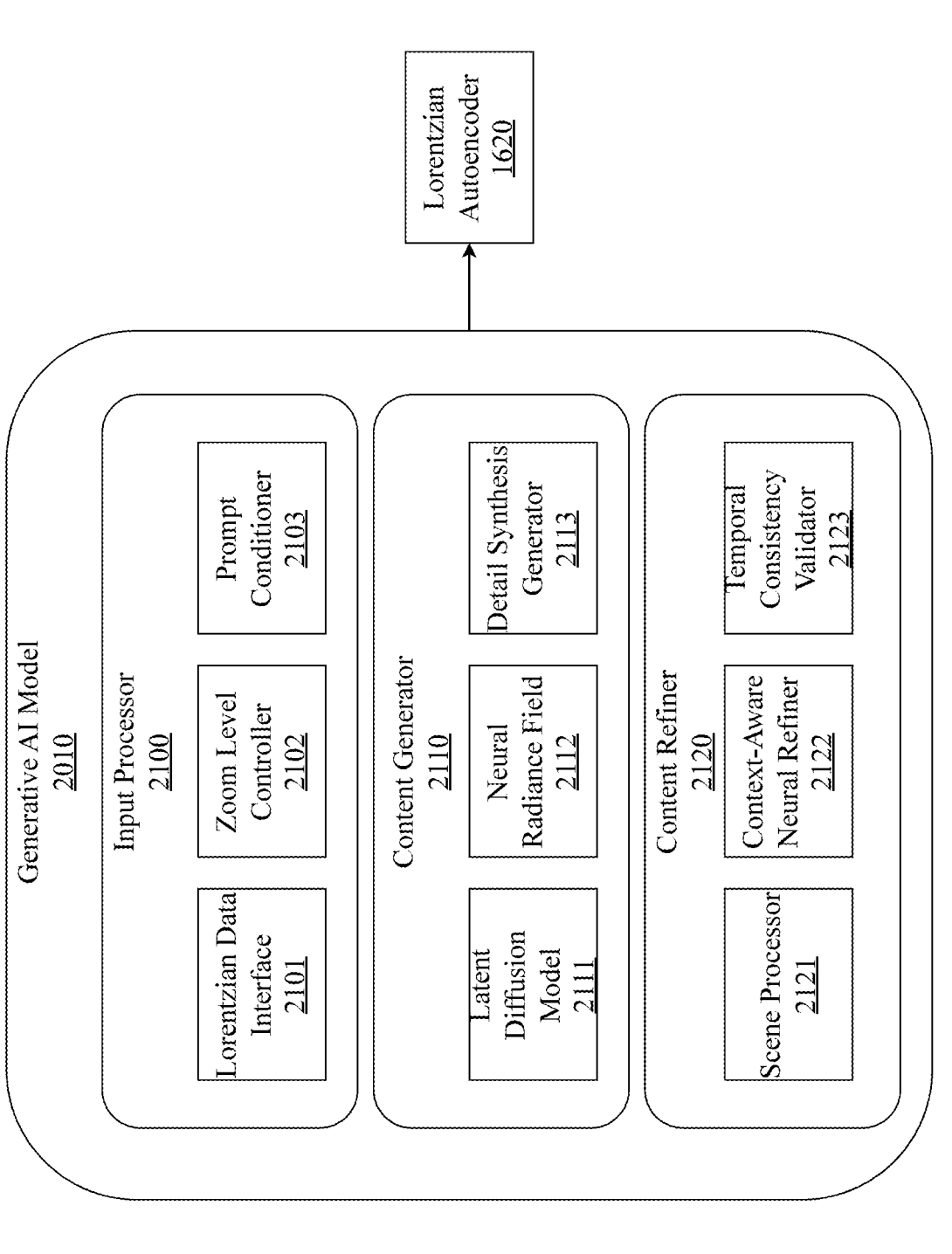
FIG. 21 is a block diagram illustrating an exemplary architecture for a subsystem of the system for video-focused compression with enhanced continuous zoom capabilities, a generative AI model.

FIG. 21 is a block diagram illustrating an exemplary architecture for a subsystem of the system for video-focused compression with enhanced continuous zoom capabilities, a generative AI model. The generative AI model is organized into three primary functional modules: an input processor 2100, a content generator 2110, and a content refiner 2120, each containing specialized components that work together to create a seamless zoom experience.

Input processor 2100 serves as the interface between the Lorentzian autoencoder system and the generative components. A Lorentzian data interface 2101 receives and interprets the mini-Lorentzian representations from Lorentzian autoencoder 1620, maintaining the tensor structure that preserves spatiotemporal relationships. This interface enables the generative AI model to understand the structured information embedded in the compressed video representations, preserving both spatial details and temporal coherence essential for realistic video zoom operations.

A zoom level controller 2102 manages user zoom requests and determines the appropriate detail level required for the current magnification. For example, when a user begins zooming into a landscape scene, the controller might first access available high-resolution data, then gradually transition to generatively created details as the zoom level exceeds the resolution of the original content. This component works closely with the user interface to interpret zoom gestures or commands and translate them into appropriate generation parameters.

A prompt conditioner 2103 enables contextual guidance of the generative process by incorporating metadata, scene information, or explicit user instructions. In a historical documentary application, this component might incorporate period-specific architectural styles or costume details to ensure historically accurate content generation when zooming into a scene. This conditioning allows for controlled generation that maintains thematic and stylistic consistency with the original content.

A content generator 2110 contains the core AI models responsible for synthesizing new visual elements at various zoom levels. A latent diffusion model 2111 generates high-fidelity details through iterative refinement processes, creating realistic textures and structures that extend beyond the resolution of the original video. For instance, when zooming into foliage in a nature documentary, the latent diffusion model might generate individual leaves with appropriate venation patterns and surface textures that weren't visible in the original footage.

A neural radiance field 2112 creates 3D-aware representations that enable more realistic zoom experiences by modeling how light interacts with surfaces in the scene. This component is particularly important for maintaining proper perspective, lighting, and depth cues as users zoom into a scene. Rather than simply magnifying pixels, the neural radiance field helps create a sense of navigating through three-dimensional space, revealing how surfaces and objects would actually appear when viewed from closer distances.

A detail synthesis generator 2113 specializes in creating fine visual elements appropriate to the specific zoom level and context. When zooming into a crowd scene, this generator might create plausible facial details for distant individuals or fabric textures on clothing that maintain consistency with the style and period of the original content. This component works closely with the other generation modules to ensure that newly synthesized details integrate seamlessly with existing content.

Content refiner 2120 ensures that generated content maintains coherence, consistency, and realism. The scene processor 2121 analyzes the overall scene context to ensure that generated details fit naturally within the broader visual environment. This component ensures that elements like lighting, color palette, and stylistic attributes remain consistent across different zoom levels and between original and generated content.

A context-aware neural refiner 2122 examines relationships between different visual elements to maintain logical coherence when generating new details. For example, when zooming into text on a sign, this component ensures that the generated text is contextually appropriate for the setting and maintains consistent language and typography. In a sports broadcast, it might ensure that generated details of players' uniforms maintain team-specific patterns and colors.

A temporal consistency validator 2123 verifies that generated details remain stable and coherent across consecutive frames, preventing distracting flickering or sudden changes when zooming while video is in motion. This is helpful for maintaining the illusion of continuous zoom in dynamic scenes, such as zooming into a moving vehicle while maintaining consistent details across frames.

Generative AI model 2010 connects bidirectionally with the Lorentzian autoencoder 1620, creating a feedback loop where compressed representations inform the generation process, and generated details can be integrated back into the compressed representation for consistent playback. This integration enables a unified experience where users can seamlessly zoom in to explore fine details or zoom out to gain contextual understanding, with generated content that maintains the visual quality and temporal coherence of the original video.

In practical applications, this architecture enables advanced features such as allowing viewers to zoom into background elements of a film scene to discover hidden details; enabling sports analysts to progressively zoom into player techniques with generated details that remain consistent with the original footage; or allowing educators to take students on virtual tours where they can continuously zoom from macro to micro scales while maintaining realistic detail at every level.

Cognitive Navigation Integration

Figure 24:
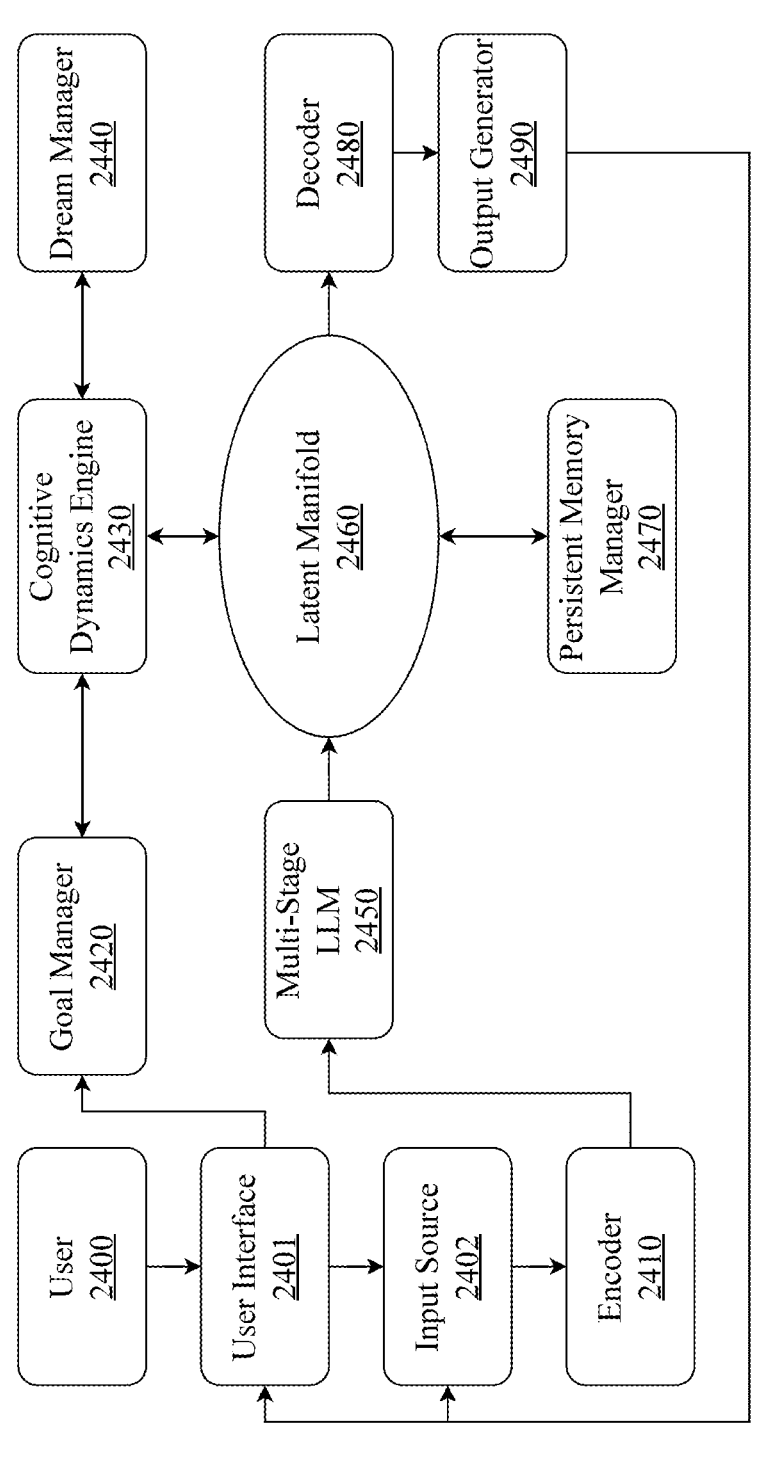
FIG. 24 is a block diagram illustrating an exemplary system architecture for a Persistent Cognitive Machine (PCM).

FIG. 24 is a block diagram illustrating an exemplary system architecture of a Persistent Cognitive Machine (PCM). The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 2400 represents human operators or external systems that interact with the PCM through user interface 2401. User interface 2401 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 2401 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 2402 aggregates various data streams including but not limited to multimodal inputs such as text, images, audio, sensor data, and system state information. These heterogeneous inputs are channeled to the encoder 2410, which implements the mathematical transformation, mapping external data from the input space into points within the latent manifold. An encoder 2410 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 2410 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 2450 serves as a language processing component that works in conjunction with encoder 2410 to generate semantic structures from raw inputs. Unlike traditional architectures where LLMs operate independently, here multi-stage LLM 2450 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 2460. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 2450 might first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 2420 creates and maintains goal potential fields that shape how attention flows through the manifold. Rather than implementing goals as discrete objectives or symbolic constraints, goal manager 2420 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 2420 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 2420 creates a potential field with high values in manifold regions containing relevant knowledge, effectively "pulling" the system's attention toward useful information while avoiding irrelevant areas. In cases where goals conflict or compete, goal manager 2420 can create field configurations that allow the system to explore multiple solution paths simultaneously or to find creative compromises that satisfy multiple objectives.

The connections between these components are designed to support the flow of geometric information rather than simple data passing. The relationship between a user 2400 to goal manager 2420 represents not just goal specification but the continuous shaping of the potential landscape based on user intent and feedback. The bidirectional connection between encoder 110 and multi-stage LLM 2450 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 2430 serves as the geometric substrate processor and the core architectural component responsible for maintaining and evolving the structure of the latent manifold 2460. Operating analogously to a physics engine in a simulation environment, CDE 2430 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 2430 implements a geodesic equation:

$$\frac{d^2\gamma^k}{dt^2} + \Gamma_{ij}^k \frac{d\gamma^i}{dt} \frac{d\gamma^j}{dt} = F^k(\gamma(t), t)$$

where the Christoffel symbols $\Gamma^k_{ij}$ encode the manifold's connection structure and $F^k$ represents forces from compression pressure and goal potentials. During active cognition, CDE 2430 continuously computes Ricci curvature across the manifold, deriving the compression pressure field $P(x)=-R$ (x) that penalizes traversal through semantically dense regions. For example, when processing a complex inference task, CDE 2430 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 2440 implements autonomous structural reorganization of the manifold during off-task periods, analogous to sleep-driven memory consolidation in biological systems. Connected to CDE 2430, dream manager 2440 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k \subset M_t$. From each bundle, points $z_i \in B_i$ are perturbed using a stochastic kernel: $z'_i = z_i + \varepsilon_i$, $\varepsilon_i \sim N(0, \tau_i)$, where $\Sigma_i$ reflects local uncertainty or curvature. These perturbations probe the neighborhood structure, testing whether extrapolated directions are compressible or divergent. These perturbations test the stability and compressibility of cognitive structures, identifying opportunities for consolidation or abstraction. The dream manager 2440 performs recombination operations, creating weighted interpolations across semantically related bundles to discover emergent abstractions.

$$z_{meta} = \sum_{i=1}^{k} \alpha_i z'_i, \quad \sum \alpha_i = 1,$$

where weights $\alpha_i$ may reflect prior co-activation, semantic alignment, or exploratory policy. The resulting $z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 2440 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 2440 might identify common mathematical structures across these domains, create meta-bundles that capture these abstractions, and reshape the manifold to enable faster traversal between related concepts in future interactions.

A latent manifold 2460 represents the central geometric substrate where all cognitive operations occur, existing as a dynamic, evolving space with rich internal structure. Unlike static embedding spaces in traditional architectures, latent manifold 2460 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 2430 enables continuous reading and reshaping of these structures, while connections to multi-stage LLM 2450, persistent memory manager 2470, and decoder 2480 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 2470 orchestrates the long-term storage and retrieval of cognitive structures, maintaining a bidirectional connection with latent manifold 2460. Unlike traditional memory systems that store static data, persistent memory manager 2470 preserves geometric structures including thought bundles, established geodesic paths, learned metric relationships, and compression patterns. It implements caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought $T_i$ is associated with an activation energy $\Sigma_i(t)$, which dissipates over time:

$$\frac{dE_i}{dt} = -\lambda \cdot A_i(t)$$

where $\lambda$ is a decay constant and $A_i(t)$ reflects inactivity—high when idle, zero when active. When $E_i(t) < E_{min}$, the thought is pruned from memory. This process ensures that storage is focused on thoughts that contribute to ongoing cognition. This decay yields several emergent properties: This creates a natural forgetting mechanism that maintains cognitive efficiency while preserving frequently accessed or structurally important memories. Persistent memory manager 2470 also coordinates with federated memory systems, enabling knowledge sharing across multiple PCM instances while maintaining privacy through geometric abstraction.

For example, when storing a complex reasoning pattern, the manager preserves not just the conclusion but the entire geodesic path, the local curvature context, and the relationships to other thought structures, enabling the system to later traverse similar reasoning paths more efficiently.

A decoder 2480 implements the inverse transformation, converting geometric structures from latent manifold 2460 back into observable outputs. This component must interpret rich geometric information including positions within the manifold, local curvature and pressure, nearby thought bundles, and traversed geodesic paths, transforming these into coherent external representations. Decoder 2480 often works in conjunction with multi-stage LLM 2450 to generate natural language outputs, using the LLM's language generation capabilities while being guided by the geometric structures extracted from the manifold. The decoding process is context-sensitive, considering not just the final position reached through inference but the entire trajectory taken, enabling explanations that reflect the reasoning process rather than just conclusions. For instance, when answering a complex question, decoder 2480 can trace the geodesic path taken through the manifold, identify key thought bundles that were traversed, and generate an explanation that reflects this structured reasoning process.

An output generator 2490 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 2490 back to user 2400 completes the interaction cycle, enabling iterative refinement and continuous learning.

The connections from goal manager 2420 and dream manager 2440 to CDE 2430 show how intentionality and reorganization influence geometric dynamics. The flow from multi-stage LLM 2450 through latent manifold 2460 to decoder 2480 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

Figure 25:
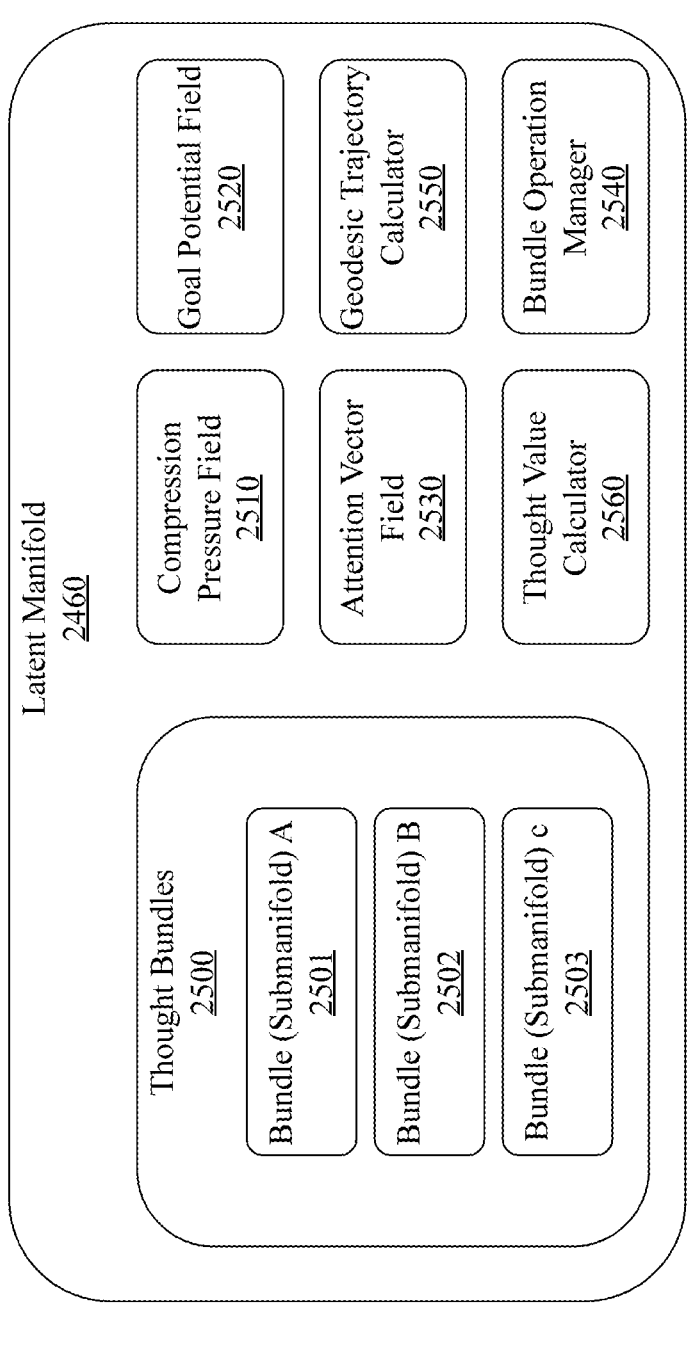
FIG. 25 is a block diagram illustrating an exemplary architecture of a latent manifold within a PCM.

FIG. 25 is a block diagram illustrating an exemplary architecture of a component within a Persistent Cognitive Machine (PCM), a latent manifold. Latent manifold 2460 serves as the central cognitive substrate of the PCM system, existing as a continuously evolving geometric space where all cognitive operations unfold. Unlike traditional flat embedding spaces, this manifold exhibit variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 2500 represent the primary organizational structures for persistent cognitive content. These bundles are not simple clusters of related vectors but rather compact submanifolds with their own internal geometry and semantic coherence. Thought bundles

2500 section contains exemplary bundle submanifolds: bundle (submanifold) A 2501, bundle (submanifold) B 2502, and bundle (submanifold) C 2503, each representing a distinct region of semantic space with its own local metric structure. Bundle A 2501 might represent a coherent concept such as "machine learning algorithms," containing not just definitional information but also procedural knowledge, historical context, mathematical foundations, and connections to related concepts. The internal structure of bundle A 2501 includes a local metric that defines distances between sub-concepts, principal directions corresponding to major semantic variations, and boundary conditions that determine how the bundle interfaces with surrounding manifold regions. Bundle B 2502 could embody a different domain such as "quantum mechanics principles," maintaining its own geometric structure while potentially sharing boundary regions with bundle A 2501 where interdisciplinary concepts like quantum machine learning emerge. Bundle C 2503 might represent more abstract or procedural knowledge, such as "problem-solving strategies," with a flatter internal geometry that facilitates flexible application across domains.

A compression pressure field 2510 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 2501 and B 2502 might exhibit extremely high compression pressure where concepts from machine learning and quantum mechanics have been repeatedly integrated, forming dense theoretical structures that encode sophisticated interdisciplinary insights. The compression pressure field 2510 continuously evolves as new thoughts are added, existing structures are reinforced through use, and the dream manager performs offline reorganization to optimize the manifold's geometry.

A goal potential field 2520 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 2520 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 2530 represents the instantaneous flow of cognitive focus throughout the manifold, defined as. Let $_A(x, t)$ denote the attention vector field at point $_x \in M_{thought}$ and time $_t$. This vector encodes both the direction and intensity of attentional flow through the manifold. The evolution of $_A$ is governed by a field equation analogous to fluid dynamics:

$$\frac{\partial A}{\partial t} + \nabla_A A = -\nabla(P - \phi)$$

Here $$\frac{\partial A}{\partial t}$$

is the temporal rate of change of attention, $\nabla_A A$ is the convective derivative Here (attention moving along itself), and $_{-\nabla(P\_}\Phi)$ is the driving force of flow—combining compression pressure and goal potential. This equation captures the local evolution of attention under the influence of memory structure and cognitive drive.

Attention vector field 2530 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 2550 computes optimal paths through the manifold by solving the variational problem of minimizing cognitive action. Let $\gamma(t): [0,T] \rightarrow M_t$ be a smooth curve in the cognitive manifold, representing the evolution of attention over time. We define the cognitive action functional:

$$S[\gamma] = \int_0^T \left( \|\dot{\gamma}(t)\|^2 + P(\gamma(t)) - \Phi(\gamma(t)) \right) dt,$$

where $\|\dot{\gamma}(t)\|^2$ represents the kinetic energy of cognitive motion, $P(\gamma(t))$ is the compression pressure field at $\gamma(t)$, and $\Phi(\gamma(t))$ is the cognitive potential, encoding goal relevance.

The geodesic $\gamma^*(t)$ is defined as the path that minimizes $\gamma^* = \arg\min S[\gamma]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 2501 to a goal state in bundle C 2503, the geodesic trajectory calculator 2550 might identify multiple viable paths: a direct route through high-pressure regions requiring intense cognitive effort, a longer path circumnavigating dense areas while maintaining semantic coherence, or a creative trajectory that leverages unexpected connections through bundle B 2502.

A thought value calculator 2560 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 2560 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 2540 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 2540 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 2540 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 2500 provide persistent semantic anchors, compression pressure field 2510 and goal potential field 2520 create a dynamic energy landscape, attention vector field 2530 enables fluid cognitive flow, the geodesic trajectory calculator 2550 determines optimal reasoning paths, thought value calculator 2560 maintains cognitive efficiency, and bundle operation manager 2540 ensures the manifold evolves to support increasingly sophisticated reasoning. Together, they implement a form of geometric intelligence where memory shapes space, attention follows structure, and learning reshapes the very terrain of thought.

Figure 26:
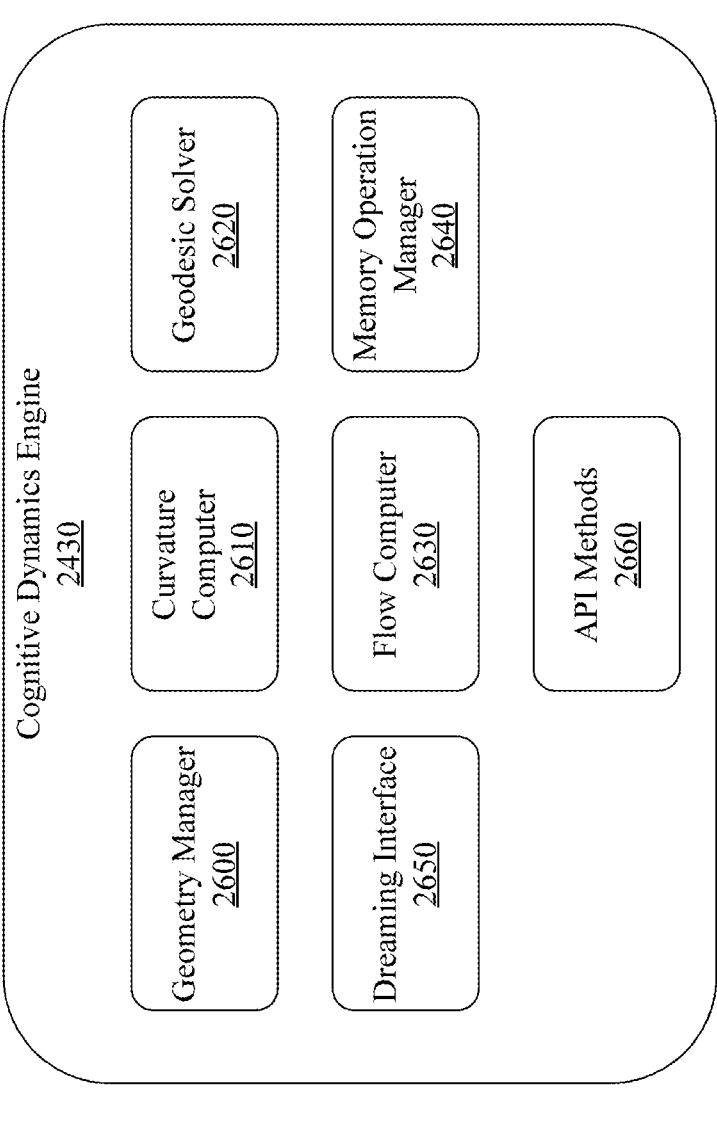
FIG. 26 is a block diagram illustrating an exemplary architecture of a Cognitive Dynamics Engine (CDE).

FIG. 26 is a block diagram illustrating an exemplary architecture of a component within a Persistent Cognitive Machine (PCM), a Cognitive Dynamics Engine (CDE). Operating as a specialized geometry processor analogous to a physics engine in simulation environments, CDE 2430 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space.

A geometry manager 2600 serves as the component responsible for maintaining and evolving the manifold's geometric structure. Geometry manager 2600 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 2600 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 2600 adjusts the connection to make these transitions smoother and more efficient. Geometry manager 2600 implements algorithms for metric learning from trajectory data, using transition frequencies, co-activation patterns, and semantic alignment to continuously refine the geometric structure. It also manages coordinate transformations between different local charts of the manifold, ensuring smooth transitions as attention moves between semantic regions.

A curvature computer 2610 calculates the various curvature tensors that characterize the manifold's local and global geometric properties. Curvature computer 2610 computes a Riemann curvature tensor, which fully describes how the manifold deviates from flat Euclidean space. From this fundamental tensor, curvature computer 2610 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow. Curvature computer 2610 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 2620 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas. Geodesic solver 2620 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. The solver must handle multiple challenging scenarios such as non-convex optimization landscapes with multiple local minima, regions of high curvature where standard methods become unstable, and multi-goal situations requiring Pareto-optimal path selection. For instance, when solving a complex reasoning task that requires connecting disparate concepts, geodesic solver

2620 might identify several viable paths: a direct route through high-pressure theoretical abstractions, a longer but clearer path through concrete examples, or an innovative trajectory that discovers unexpected connections through analogical reasoning.

A flow computer 2630 models' attention as a continuous vector field evolving over the manifold according to geometric dynamics. Rather than treating attention as discrete selections or weights, this component implements a partial differential equation, where attention behaves as a cognitive fluid flowing through shaped space. The flow computer 2630 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. The component also computes derived quantities such as the divergence indicating where attention is focusing or dispersing, the curl revealing rotational patterns in thought, and flow stability metrics that identify robust versus fragile reasoning patterns. Flow computer 2630 enables the system to maintain multiple concurrent attention streams, supporting parallel reasoning processes that can later merge or inform each other.

A memory operation manager 2640 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 2640 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions. Memory operation manager 2640 also handles subspace alignment for federated learning scenarios, enabling knowledge transfer between different PCM instances while respecting privacy boundaries.

A dreaming interface 2650 provides the connection point between CDE 2430 and dream manager 2440, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 2650 manages the transition between active cognition and dreaming states, ensuring that ongoing reasoning processes reach stable states before reorganization begins, that critical structures are preserved during transformation, and that the manifold returns to a coherent state before resuming active operation. During dreaming phases, the interface coordinates bundle recombination algorithms that discover emergent abstractions, topology modification procedures that create new conceptual bridges, and compression operations that consolidate redundant structures. It monitors dreaming progress through geometric health metrics, ensuring that reorganization improves rather than disrupts cognitive capability.

An API methods 2660 component provides a clean programmatic interface for external modules to interact with the CDE's geometric capabilities. API methods may include accepting a goal embedding and current state to return an optimal geodesic path, leveraging the geodesic solver while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through the dreaming interface. Getting pressure returns the compression pressure at any point, enabling other components to make informed decisions about traversal costs. Getting a goal field constructs a potential field for a given goal configuration, coordinating with the goal manager to shape attention flow. These methods abstract away the complex geometric computations while providing powerful primitives for cognitive operations. API methods 360 also handles request queuing, resource management, and error handling to ensure robust operation under varying computational loads.

Together, these components within cognitive dynamics engine 2430 create a geometric substrate for persistent cognition. Geometry manager 2600 maintains the foundational structure, curvature computer 2610 derives the pressure landscape that guides efficient reasoning, geodesic solver 2620 finds optimal paths through semantic space, flow computer 2630 enables fluid attention dynamics, memory operation manager 2640 evolves the manifold through use, dreaming interface 2650 enables autonomous optimization, and API methods 2660 provide clean access to these capabilities. This architecture transforms the principles of geometric cognition into a practical computational system where thought truly becomes motion through shaped space, memory becomes curvature, and learning becomes the evolution of geometry itself.

Goal-Driven Navigation

Figure 28:
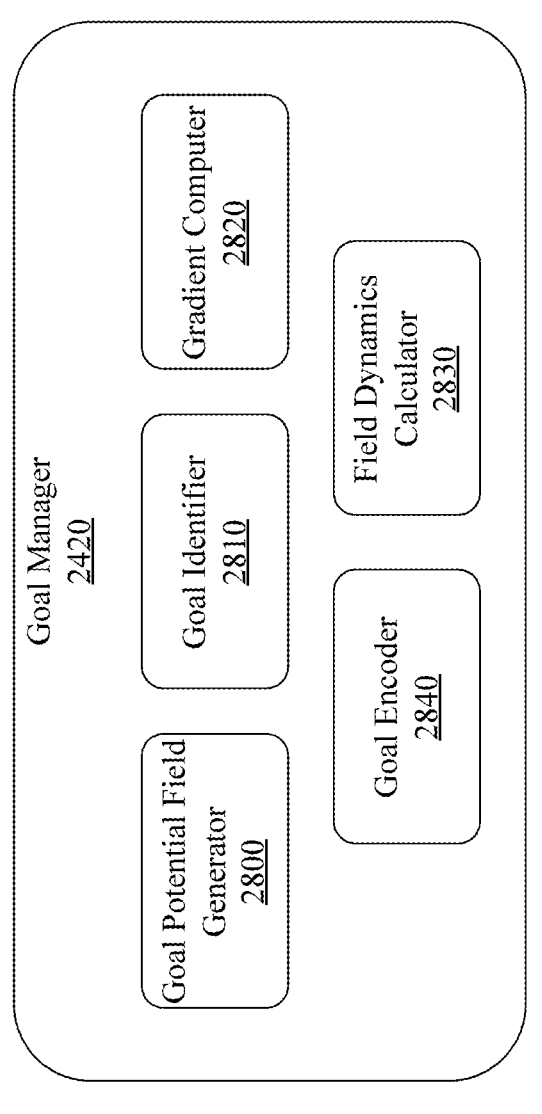
FIG. 28 is a block diagram illustrating an exemplary architecture of a goal manager within a PCM.

FIG. 28 is a block diagram illustrating an exemplary architecture of a component within a Persistent Cognitive Machine (PCM), a goal manager. Unlike traditional goal-directed systems that implement objectives as discrete targets or symbolic constraints, goal manager 2420 generates continuous scalar fields that attract attention and guide reasoning through geometric influence. This component transforms abstract intentions, user queries, and system objectives into structured force fields that interact with the manifold's compression landscape to create rich cognitive dynamics.

A goal identifier 2810 serves as the initial processing stage that recognizes, categorizes, and prioritizes various goal sources entering the system. Goal identifier 2810 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 2810 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications. Goal identifier 2810 also performs goal decomposition, breaking complex objectives into hierarchical subgoals that can be pursued in parallel or sequence. It maintains a goal registry that tracks active objectives, their priorities, interdependencies, and completion states. The component implements conflict detection mechanisms that identify when multiple goals may be contradictory or competing for the same cognitive resources, flagging these for special handling by other components. For long-term interactions, goal identifier 2810 maintains persistent goal structures that evolve across sessions, enabling the system to pursue complex objectives that require extended reasoning or multiple interaction cycles.

A goal encoder 2840 transforms identified goals from their raw representational form into geometric structures compatible with the manifold's architecture. This encoding process goes beyond simple embedding, creating rich geometric objects that can effectively influence manifold dynamics. Goal encoder 2840 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 2840 also implements contrastive encoding for goals that require distinguishing between concepts, creating potential fields with opposing gradients that push attention away from certain regions while pulling toward others. For complex multi-faceted goals, goal encoder 2840 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. For instance, when encoding a goal related to creative problem-solving, the component might generate a potential field with multiple local maxima in different semantic regions, encouraging exploration of diverse solution approaches rather than convergence on a single path.

A goal potential field generator 2800 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 2800 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics. Goal potential field generator 2800 also generates time-varying fields for goals that evolve during reasoning, smoothly interpolating between different field configurations to maintain continuity. For hierarchical goals, it creates nested potential structures where achieving subgoals creates local maxima within the broader landscape of the primary objective. The generator must balance field strength to create sufficient attractive force without overwhelming the natural dynamics of compression and manifold structure. For example, when generating a field for a goal requiring innovative connections between disparate concepts, the component might create a potential landscape with a valley between the concepts that gradually rises, encouraging exploration of the intermediate space where novel connections might emerge.

A gradient computer 2820 calculates the vector field that determines the direction and magnitude of goal-induced forces at each point in the manifold. This component implements efficient algorithms for computing gradients in curved space, accounting for the manifold's metric structure to ensure that gradients represent true geometric directions rather than naive coordinate derivatives. Gradient computer 2820 employs multiple computational strategies including finite difference methods adapted for manifolds, automatic differentiation through the field generation process, and analytical gradients for simple field configurations. It computes not only first-order gradients but also higher-order derivatives such as the Hessian, which indicates the local curvature of the potential field and helps identify critical points such as maxima, minima, and saddle points. The component maintains a continuously updated gradient map across frequently accessed regions of the manifold, enabling rapid attention flow calculations without repeated gradient computation. For regions of high curvature or complex metric structure, gradient computer 2820 implements adaptive sampling strategies that ensure accurate gradient estimation despite geometric complications. It also computes gradient statistics such as divergence and curl, providing insights into the global flow patterns induced by the goal field. These computations enable analyses of goal dynamics, identifying convergence regions where attention naturally flows, circulation patterns that might indicate conceptual loops, and divergence zones where exploratory behavior is encouraged.

A field dynamics calculator 2830 analyzes and predicts the complex behaviors that emerge from the interaction between goal potential fields and the manifold's other forces. This component simulates how attention will flow under the combined influence of goal attraction, compression resistance, and the inherent dynamics of the attention field itself. Field dynamics calculator 2830 implements several analytical capabilities including trajectory prediction that estimates likely attention paths given current conditions, stability analysis that identifies whether goal configurations will lead to stable focus or oscillatory behavior, and bifurcation detection that recognizes when small changes in goals might lead to dramatically different cognitive outcomes. The component models various emergent phenomena such as gradient following where attention flows smoothly up potential gradients toward goal regions, tunneling effects where strong goal potentials can overcome high compression barriers, and competitive dynamics where multiple goals create complex flow patterns with unpredictable outcomes. For multi-goal scenarios, field dynamics calculator 2830 computes Pareto frontiers that identify optimal trade-offs between competing objectives, helping the system navigate complex decision spaces. It also analyzes temporal dynamics, predicting how goal influences will evolve as the manifold structure changes through use and learning. The component can identify potential failure modes such as local maxima that might trap attention before reaching true goals, unstable equilibria where small perturbations cause large behavioral changes, and chaotic regions where goal interactions create unpredictable dynamics. For instance, when analyzing goals that require balancing exploration with exploitation, field dynamics calculator 2830 might identify parameter regimes where the system naturally alternates between focused pursuit and broad exploration, optimizing long-term learning and performance.

The components within goal manager 2420 create a system for translating abstract objectives into concrete geometric influences that shape cognitive behavior. Goal identifier 2810 recognizes and structures incoming objectives, goal encoder 2840 transforms them into geometric representations, goal potential field generator 2800 creates smooth scalar fields across the manifold, gradient computer 2820 determines the resulting force fields, and field dynamics calculator 2830 predicts and analyzes the emergent behaviors. This architecture enables the PCM to pursue complex goals not through rigid programming or symbolic planning, but through the natural dynamics of attention flowing through shaped space. Goals become not commands to be executed but influences that guide the fluid motion of thought, creating a form of intentionality that emerges from geometry rather than being imposed upon it. Goal manager 2420 thus provides the motivational landscape that, combined with the manifold's memory structure and compression dynamics, enables purposeful yet flexible cognitive behavior that can adapt, learn, and discover unexpected solutions through the natural evolution of geometric attention.

Figure 27:
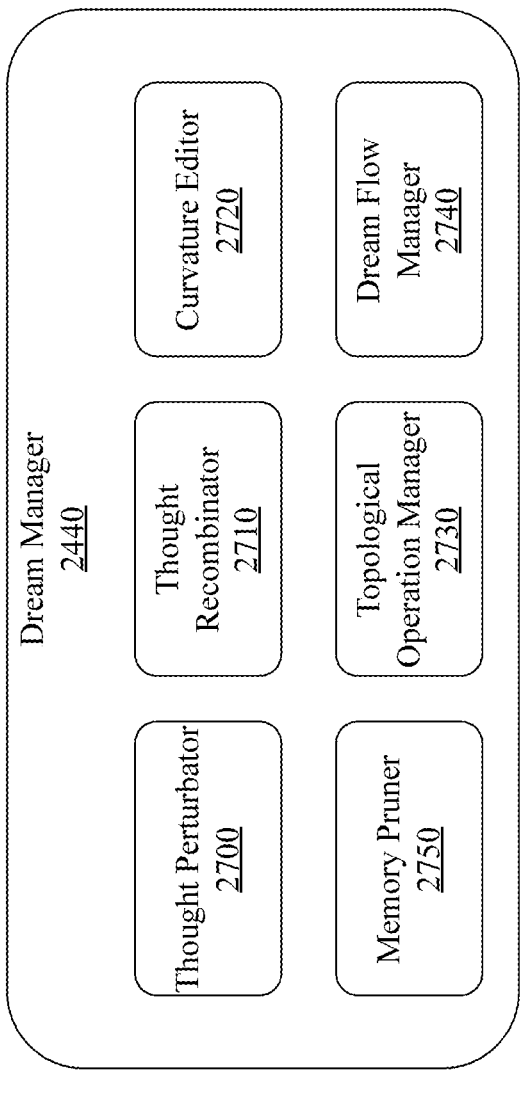
FIG. 27 is a block diagram illustrating an exemplary architecture of a dream manager within a PCM.

FIG. 27 is a block diagram illustrating an exemplary architecture of a component within a Persistent Cognitive Machine (PCM), a dream manager. Operating analogously to sleep-driven memory consolidation in biological systems, dream manager 2440 performs essential geometric maintenance and optimization that enables the PCM to develop increasingly efficient and generalized cognitive structures without requiring explicit retraining or parameter updates. This component transforms the theoretical concept of manifold evolution into practical computational processes that reshape the space of thought based on accumulated experience and structural patterns.

A thought perturbator 2700 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 2700 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations. Thought perturbator 2700 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. These perturbations serve as probes into the local geometry, revealing opportunities for consolidation, identifying unstable structures that may need reinforcement, and discovering latent connections between seemingly disparate concepts.

A thought recombinator 2710 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 2710 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful. The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. For example, when recombining thoughts about "gradient descent" from a machine learning bundle with thoughts about "energy minimization" from a physics bundle, thought recombinator 2710 might discover a meta-concept about "optimization in curved spaces" that provides a unified framework applicable across domains.

A curvature editor 2720 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 2720 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 2720 may also implement curvature sharpening around stable conceptual cores, reinforcing well-established knowledge while maintaining softer boundaries for evolving concepts. When editing curvature, the component must maintain global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability.

A topological operation manager 2730 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 2710 discovers stable interpolations between distant bundles, topological operation manager 2730 evaluates whether to establish permanent connections. It implements sophisticated surgery operations that can split overly complex regions into simpler components, merge adjacent regions that have developed sufficient similarity, or create higher-genus structures that enable multiply-connected reasoning paths. Topological operation manager 2730 performs topological analysis to identify features such as holes in the manifold representing conceptual gaps, bottlenecks where all reasoning must pass through constrained regions, and islands of isolated knowledge that could benefit from connection. For instance, if the system has separately developed expertise in "visual pattern recognition" and "time series analysis," topological operation manager 2730 might identify an opportunity to create a bridge through "spatiotemporal pattern analysis," fundamentally expanding the system's reasoning capabilities. All topological modifications are carefully validated to ensure they preserve essential semantic relationships while enabling new forms of inference.

A dream flow manager 2740 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold. Dream flow manager 2740 monitors the overall health of the dreaming process through metrics such as semantic coherence, structural stability, and compression efficiency. It implements adaptive control mechanisms that adjust flow parameters based on the current state of the manifold and the outcomes of recent modifications, ensuring that dreaming remains beneficial rather than disruptive.

A memory pruner 2750 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold. Memory pruner 2750 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving the unique aspects that provide contextual flexibility.

These components within dream manager 2440 implement a process of autonomous cognitive evolution. Thought perturbator 2700 explores the stability and potential of existing structures, thought recombinator 2710 synthesizes new abstractions and connections, curvature editor 2720 optimizes the geometric landscape, topological operation manager 2730 enables fundamental structural innovations, dream flow manager 2740 orchestrates coherent evolution, and memory pruner 2750 maintains cognitive efficiency. This architecture enables the PCM to continuously improve its internal representations without external supervision, developing increasingly sophisticated reasoning capabilities through the natural evolution of its geometric substrate. The dreaming process transforms accumulated experience into structural wisdom, creating a manifold that not only stores knowledge but embodies understanding in its very geometry.

Advanced Navigation Methods

FIG. 22 is a flow diagram illustrating an exemplary method for implementing continuous zoom in video using hierarchical Lorentzian representations. In a first step 2200, a video input is organized into sequential segments represented as three-dimensional tensors with spatial and temporal dimensions. This initial organizational step involves partitioning the incoming video stream into manageable units for processing by the Lorentzian autoencoder system. The segmentation may be performed based on various criteria such as scene changes, fixed time intervals, or content characteristics. Each segment is structured as a three-dimensional tensor where the first two dimensions represent spatial information (height and width), and the third dimension represents time (sequence of frames). For example, in a satellite imagery application, a continuous video feed might be divided into 5-second segments, each containing 150 frames at 30 frames per second, with spatial dimensions corresponding to the camera resolution. This tensor structure preserves the spatial and temporal relationships within each video segment, which is essential for maintaining continuity during zoom operations.

In a step 2210, each video segment is compressed using a Lorentzian autoencoder to create multi-level representations at different scales of detail. The Lorentzian autoencoder employs a hierarchical approach to compression, generating representations at multiple resolutions or scales rather than a single compressed format. This multi-level compression process involves a cascade of encoding operations, each focused on capturing features at different levels of detail. For instance, in a medical imaging application, the first level might capture the overall structure of an organ, the second level might represent tissue boundaries, and the third level might preserve cellular details. The Lorentzian autoencoder maintains the tensor structure throughout this hierarchical compression, ensuring that spatiotemporal relationships are preserved at each scale to support seamless zooming operations.

In a step 2220, a hierarchical latent structure is generated that preserves spatial and temporal relationships at multiple resolution levels. This hierarchical structure organizes the compressed representations in a way that maintains their relationships across different scales, facilitating efficient zoom operations. The structure may implement various data hierarchies such as pyramidal representations or other schemes that explicitly encode the connections between different resolution levels. This organization ensures that when a user zooms into a specific region, the system can efficiently access the appropriate level of detail from the stored representations and provide a coherent transition between resolution levels.

In a step 2230, zoom instructions are received from a user interface specifying a region of interest and desired magnification level. This interactive step involves capturing user input regarding which part of the video they wish to examine more closely and how much they want to magnify it. The user interface may provide various input mechanisms such as mouse controls, touch gestures, or explicit numerical inputs for specifying the zoom parameters. For example, in a sports video analysis application, a coach might use a bounding box to select a specific player and request a 4× magnification to examine their technique in greater detail. The zoom instructions include both spatial information (the selected region of interest) and scale information (the desired magnification level).

In a step 2240, the latent representations are processed through a generative AI model to synthesize additional scene details beyond the original resolution. When the requested zoom level exceeds the detail available in the original video, the generative AI model creates plausible new details based on learned patterns and contextual understanding. For example, when zooming into a historical battlefield scene, the generative AI might create details of uniforms, weapons, and facial expressions that weren't visible in the original footage but are consistent with the historical context and visual style. The generative model uses the hierarchical latent representations as a foundation, extending them with synthesized details that maintain visual consistency with the original content.

In a step 2250, context-aware neural refinement is applied to ensure visual coherence and consistency in the generated content. This refinement process examines the generated details in relation to their surrounding context, verifying that they maintain appropriate style, lighting, texture, and logical consistency with the scene. For instance, when generating details of text on a distant sign, the refinement process ensures that the text style matches the era and location of the scene, and that the text content is logically consistent with the surrounding environment. This step is crucial for maintaining the illusion that zoomed details were captured in the original footage rather than generated artificially.

In a step 2260, the selected region is rendered with progressively enhanced detail, seamlessly blending recorded and synthesized information for a continuous zoom experience. This rendering process combines multiple levels of detail, including both the stored representations and the newly synthesized details, into a coherent visual output. The rendering employs sophisticated blending techniques to create smooth transitions between different levels of detail and between recorded and synthesized content. For instance, in a virtual tourism application, as a user zooms into architectural details of a historical building, the system would smoothly blend from the recorded overview to increasingly detailed views, with synthesized fine details appearing naturally as the zoom continues.

In a step 2270, the video display is updated in real-time while maintaining temporal coherence across frames as zoom levels change. This step ensures that the continuous zoom experience remains fluid even as the video content changes over time. The system maintains consistent generation of details across consecutive frames, preventing visual artifacts such as flickering or sudden changes in generated content. For example, when zooming into a flowing river while the video plays, the system ensures that the generated water ripple details remain consistent with the motion of the water across frames, creating a natural and immersive zoom experience. This real-time updating allows users to explore video content dynamically, zooming in and out while the video continues to play, without disrupting the temporal coherence of the scene.

This method enables capabilities for video exploration, allowing users to zoom continuously into any part of a video scene beyond the original resolution constraints. Applications include entertainment platforms where viewers can discover hidden details in movie scenes; educational systems where students can explore scientific phenomena across multiple scales; and professional tools for forensic analysis, medical imaging, or sports performance review where detailed examination of specific regions is essential.

FIG. 23 is a flow diagram illustrating an exemplary method for bidirectional zoom using generative AI and Lorentzian autoencoders. In a first step 2300, a video segment is extracted from a video input, forming a three-dimensional tensor where spatial and temporal relationships are preserved. This initial step involves isolating a manageable portion of video data for processing, typically consisting of a sequence of frames. The extraction process may involve techniques such as sliding windows over the video stream, scene detection for natural segmentation, or fixed-interval partitioning. For example, in a high-definition video streaming application, the system might extract segments of 30 frames (1 second at 30 fps) with spatial dimensions of 1920×1080 pixels, forming a tensor of shape [1920, 1080, 30, 3] where the last dimension represents the RGB color channels. The three-dimensional tensor structure is essential for preserving the spatiotemporal relationships within the video data, allowing the system to model both spatial patterns and temporal dynamics simultaneously for seamless bidirectional zoom operations.

In a step 2310, the three-dimensional tensor is processed through a Lorentzian autoencoder to produce a compact mini-Lorentzian representation. The Lorentzian autoencoder employs specialized 3D convolutional neural networks that operate across both spatial and temporal dimensions. Unlike traditional autoencoders that might flatten video frames into vectors, the Lorentzian autoencoder maintains the tensor structure throughout the encoding process, preserving essential spatiotemporal relationships. This step involves a series of 3D convolutional operations, potentially with pooling layers and non-linear activations that progressively reduce the dimensions of the input tensor while extracting relevant features. For instance, the original [1920, 1080, 30, 3] tensor might be compressed to a mini-Lorentzian representation of shape [240, 135, 10, 64], significantly reducing the data size while maintaining the tensor structure necessary for high-quality bidirectional zoom operations.

In a step 2320, the latent space dynamics are analyzed using a diffusion engine to understand patterns of detail across different scales. This analytical step examines how features and patterns in the latent space vary across different resolution levels and how they evolve over time. The diffusion engine employs specialized neural network architectures designed to model transitions between different scales of detail. It learns how features at coarser scales relate to and predict features at finer scales, enabling more effective synthesis of high-resolution details during zoom-in operations. Similarly, it learns how features at finer scales can be aggregated into coherent representations at coarser scales for zoom-out operations. For example, in an architectural video tour, the diffusion engine might learn that certain building facade patterns tend to exhibit specific detailed features at higher resolutions, allowing for accurate prediction of architectural details when zooming in.

In a step 2330, user zoom interactions are monitored to determine whether to implement zoom-in detail enhancement or zoom-out scene expansion. This step involves tracking user input through interface elements such as touch gestures, mouse movements, or explicit zoom controls to understand the user's intended exploration direction and magnitude. The system differentiates between zoom-in requests, where users want to see more detail in a specific region, and zoom-out requests, where users want to gain broader context beyond the original frame boundaries. For instance, in a digital museum application, the system would detect whether a user is pinching outward to examine the brushstrokes in a painting (zoom-in) or pinching inward to see the entire gallery wall containing multiple paintings (zoom-out) and route the request to the appropriate processing pipeline.

In a step 2340, for zoom-in operations, synthetic details are generated for regions beyond original resolution using the generative AI model to predict plausible fine structures. When a user zooms beyond the resolution limits of the original video, the generative AI model creates new details that were not captured in the original footage but are consistent with its visual style and content. For example, when zooming into a crowd at a sporting event, the generative model might create plausible facial features for distant spectators, realistic fabric textures on clothing, or detailed expressions that maintain consistency with the overall scene context. This generative process is guided by the mini-Lorentzian representation, which provides the structural foundation for detail synthesis, ensuring that generated elements align with the original video's content and style.

In a step 2350, for zoom-out operations, the generative AI model is employed to expand the visual field with contextually appropriate surrounding elements. When users zoom out beyond the boundaries of the original frame, the system generates plausible content for the newly revealed areas. This requires understanding the scene context and extending it in a coherent manner. For example, in a documentary about a historical building, zooming out might reveal the surrounding street, neighboring buildings, and landscaping that weren't included in the original frame but are created to be historically accurate and visually consistent with the available footage. The generative model uses the mini-Lorentzian representation to understand the scene's style, lighting, and content, then extends these attributes into the expanded regions.

In a step 2360, temporal consistency validation is applied to ensure that generated content maintains coherence across consecutive frames. This validation process verifies that the AI-generated details, whether for zoom-in or zoom-out operations, remain stable and consistent over time as the video plays. This is crucial for maintaining the illusion of a continuous, natural zoom experience without distracting flickering or sudden changes in the generated content. For instance, when zooming into a flowing river while the video plays, the system ensures that the generated water ripple details not only look realistic in each frame but also move consistently with the flow of water across frames. This temporal consistency is particularly important for dynamic scenes where both the camera and subjects may be in motion during zoom operations.

In a step 2370, the enhanced video is output with seamless transitions between original and generated content as zoom level changes. This final step delivers the processed video with integrated zoom capabilities to the user, presenting a fluid experience whether zooming in to explore fine details or zooming out to gain context. The output includes sophisticated blending mechanisms that ensure smooth transitions between different levels of detail and between original and generated content. For example, in an educational nature video, a user could start with a view of a forest ecosystem, smoothly zoom in to examine the structure of a specific plant, continue zooming to see cellular details that weren't in the original footage but are biologically accurate, then zoom back out beyond the original frame to see the broader geological context of the region—all with imperceptible transitions between recorded and generated content.

This bidirectional zoom method revolutionizes video interaction by enabling users to freely explore content at any scale—from microscopic details to panoramic views—regardless of the original video resolution or framing. Applications range from entertainment platforms where viewers can discover hidden details in scenes or explore beyond the frame; interactive educational content where students can examine subjects across multiple scales of organization; professional tools for forensic analysis, medical imaging, or sports coaching where both detail examination and contextual understanding are valuable; and virtual tourism experiences where visitors can freely explore locations by zooming into interesting features or zooming out to understand geographical context.

FIG. 18 is a flow diagram illustrating an exemplary method for compressing and restoring video data using Lorentzian autoencoders. In a first step 1800, a video segment is extracted from a video input, forming a three-dimensional tensor where the first two dimensions comprise spatial data and the third dimension represents time. This initial step involves isolating a manageable portion of video data for processing, typically consisting of a sequence of frames. The extraction process may involve techniques such as sliding windows over the video stream, scene detection for natural segmentation, or fixed-interval partitioning. For example, in a high-definition video streaming application, the system might extract segments of 30 frames (1 second at 30 fps) with spatial dimensions of 1920×1080 pixels, forming a tensor of shape [1920, 1080, 30, 3] where the last dimension represents the RGB color channels. The three-dimensional tensor structure is essential for preserving the spatiotemporal relationships within the video data, allowing the system to model both spatial patterns and temporal dynamics simultaneously.

In a step 1810, the three-dimensional tensor is processed through a Lorentzian autoencoder to produce a compact mini-Lorentzian representation that preserves spatial and temporal relationships. The Lorentzian autoencoder employs specialized 3D convolutional neural networks that operate across both spatial and temporal dimensions. Unlike traditional autoencoders that might flatten video frames into vectors, the Lorentzian autoencoder maintains the tensor structure throughout the encoding process. This step involves a series of 3D convolutional operations, potentially with pooling layers and non-linear activations that progressively reduce the dimensions of the input tensor while extracting relevant features. The encoding process effectively maps the high-dimensional video data into a lower-dimensional latent space while preserving the essential spatial and temporal patterns. For instance, the original [1920, 1080, 30, 3] tensor might be compressed to a mini-Lorentzian representation of shape [240, 135, 10, 64], significantly reducing the data size while maintaining the tensor structure.

In a step 1820, the mini-Lorentzian representation is stored as a compressed output that maintains the tensor structure while significantly reducing dimensionality. This step involves the efficient storage or transmission of the compressed representation, potentially with additional entropy coding or quantization to further reduce the data size. The storage format preserves the tensor structure of the mini-Lorentzian representation, which is crucial for the subsequent restoration processes. Unlike traditional compression approaches that might store video frames independently or use motion vector approximations, the mini-Lorentzian format encapsulates both spatial and temporal information in an integrated representation. This enables more efficient storage while maintaining the information necessary for high-quality restoration. In practical implementations, this step might also involve metadata management, indexing, or organization of the compressed data to facilitate efficient retrieval and processing.

In a step 1830, the mini-Lorentzian representation is processed through a latent diffusion engine to model temporal dynamics and predict potential missing information. The latent diffusion engine analyzes patterns and trajectories within the mini-Lorentzian representation to understand how features evolve over time. This step employs specialized neural network architectures designed to capture temporal dependencies and dynamics in the latent space. The latent diffusion engine may use techniques such as but not limited to recurrent neural networks, attention mechanisms, or transformer architectures to model how the compressed representation would evolve over time. By understanding these temporal dynamics, the system can predict information that might have been lost during compression or generate plausible extensions beyond the original video segment. For example, in a surveillance video application, the latent diffusion engine might predict how objects in the scene would continue to move beyond the recorded frames, enabling more effective analysis and restoration.

In a step 1840, the mini-Lorentzian representation and latent diffusion model outputs are input to a three-dimensional convolutional decoder to produce a decompressed output. The 3D convolutional decoder performs operations that are essentially the inverse of the encoding process, progressively expanding the spatial and temporal dimensions while reducing the feature depth. This step involves a series of transposed 3D convolutions, upsampling operations, and potentially skip connections from the encoder to preserve fine details. The decoder combines the structured information from the mini-Lorentzian representation with the temporal predictions from the latent diffusion engine to generate a decompressed video segment that approximates the original input. The decoder's architecture is typically symmetric to the encoder, with corresponding layers that gradually restore the original dimensions of the video data. The integration of the latent diffusion model outputs enhances the temporal coherence and visual quality of the decompressed video, particularly for dynamic content with complex motion patterns.

In a step 1850, an enhanced correlation network is applied to the decompressed output to restore data potentially lost during compression by leveraging relationships between multiple mini-Lorentzian representations. The correlation network identifies patterns and similarities across different video segments or regions within a segment to enhance the restoration quality. This step involves analyzing how different parts of the video relate to each other and using these relationships to recover information that might have been lost during compression. The correlation network may employ self-attention mechanisms, graph neural networks, or other architectures designed to capture non-local dependencies within the data. For example, in a video conference application, the correlation network might identify that certain facial expressions or hand gestures repeat throughout the video, allowing it to enhance the details of these features based on their best-preserved instances. By exploiting these correlations, the system can achieve higher restoration quality than would be possible from the compressed representation alone.

In a step 1860, resolution and detail levels are controlled using a zoom controller that interfaces with both the latent diffusion engine and decoder network. The zoom controller manages the synthesis of fine details when zooming into specific regions of the video. This step involves determining the appropriate level of detail required for the current zoom level and directing the decoder to generate the necessary information. The zoom controller works in conjunction with the latent diffusion engine to predict plausible details at finer scales than were present in the original video. This enables the infinite zoom capability, where users can continuously zoom into regions of interest beyond the resolution limits of the original recording. The zoom controller may employ techniques such as progressive generation of details, detail synthesis guided by learned priors, or multi-scale representation management to achieve smooth and realistic zooming experiences. For instance, in a security footage analysis application, the zoom controller might enable investigators to zoom into a license plate or facial features with continuously increasing detail, even beyond what was captured in the original video.

In a step 1870, the restored video data is output with enhanced quality, preserving both spatial details and temporal coherence. This final step delivers the fully processed video segment, which has undergone compression, restoration, and potentially enhancement through the various components of the system. The output maintains the original dimensions and structure of the video data but with improved quality compared to what would be achieved with traditional compression methods at equivalent data rates. The spatial details are preserved or enhanced through the correlation network, while the temporal coherence is maintained through the latent diffusion engine and 3D convolutional processing. The output video may be displayed to users, further processed for specific applications, or integrated into broader systems. The enhanced quality is particularly evident in complex scenes with fine details or dynamic content, where traditional compression approaches might introduce artifacts or temporal inconsistencies.

FIG. 19 is a flow diagram illustrating an exemplary method for implementing infinite zoom capability using hierarchical Lorentzian representations. In a first step 1900, a video input is organized into sequential segments, each represented as a three-dimensional tensor with spatial and temporal dimensions. This organizational step involves partitioning the incoming video stream into manageable units for processing by the Lorentzian autoencoder system. The segmentation may be performed based on various criteria such as scene changes, fixed time intervals, or content characteristics. Each segment is structured as a three-dimensional tensor where the first two dimensions represent spatial information (height and width), and the third dimension represents time (sequence of frames). For example, in a satellite imagery application, a continuous video feed might be divided into 5-second segments, each containing 150 frames at 30 frames per second, with spatial dimensions corresponding to the camera resolution. This tensor structure preserves the spatial and temporal relationships within each video segment, which is essential for the subsequent processing steps. The organization may also involve preprocessing techniques such as stabilization, noise reduction, or color normalization to ensure consistent input quality across segments.

In a step 1910, each video segment is compressed using a Lorentzian autoencoder to create multi-level representations at different scales of detail. The Lorentzian autoencoder employs a hierarchical approach to compression, generating representations at multiple resolutions or scales rather than a single compressed format. This multi-level compression process involves a cascade of encoding operations, each focused on capturing features at different levels of detail. The highest level represents coarse, global features, while subsequent levels capture increasingly fine-grained details. For instance, in a medical imaging application, the first level might capture the overall structure of an organ, the second level might represent tissue boundaries, and the third level might preserve cellular details. The Lorentzian autoencoder maintains the tensor structure throughout this hierarchical compression, ensuring that spatiotemporal relationships are preserved at each scale. This approach differs from traditional compression methods that typically generate a single compressed representation, as the multi-level structure specifically supports the zoom functionality implemented in subsequent steps.

In a step 1920, the hierarchical mini-Lorentzian representations are stored in a structured format that preserves relationships between different resolution levels. This storage step involves organizing the multi-level compressed representations in a way that maintains their hierarchical relationships and facilitates efficient retrieval. The storage format may implement various data structures such as pyramidal representations, octrees, or other hierarchical schemes that explicitly encode the connections between different resolution levels. For example, in a video surveillance system, the storage might organize the representations in a pyramid-like structure where each level contains a progressively higher-resolution representation of the same content, with explicit links between corresponding regions across levels. The structured storage also includes metadata that describes the relationships between different scales and regions, facilitating navigation across the hierarchy during zoom operations. This organization ensures that when a user zooms into a specific region, the system can efficiently access the appropriate level of detail from the stored representations.

In a step 1930, the latent space dynamics are analyzed using a diffusion engine to understand patterns of detail across different scales. This analytical step involves examining how features and patterns in the latent space vary across different resolution levels and how they evolve over time. The diffusion engine applies specialized neural network architectures designed to model transitions between different scales of detail. It learns how features at coarser scales relate to and predict features at finer scales, enabling more effective synthesis of high-resolution details. For instance, in an astronomical video application, the diffusion engine might learn that certain cloud patterns in a gas nebula tend to exhibit fractal-like detail at higher resolutions, with specific types of turbulence emerging at finer scales. This analysis creates a predictive model of detail across scales, which guides the subsequent detail synthesis process. The diffusion engine may employ techniques such as score-based generative models, energy-based models, or other approaches that can model complex distributions and transitions in the latent space.

In a step 1940, zoom instructions are received from a user interface specifying a region of interest and desired magnification level. This interactive step involves capturing user input regarding which part of the video they wish to examine more closely and how much they want to magnify it. The user interface may provide various input mechanisms such as mouse controls, touch gestures, or explicit numerical inputs for specifying the zoom parameters. For example, in a sports video analysis application, a coach might use a bounding box to select a specific player and request a 4× magnification to examine their technique in greater detail. The zoom instructions include both spatial information (the selected region of interest) and scale information (the desired magnification level). The user interface may also support additional parameters such as zoom speed, transition effects, or specific enhancement requests. This step provides the essential input for the subsequent zoom processing steps, directing the system to focus its computational resources on the relevant portion of the video content.

In a step 1950, the zoom controller is activated to select appropriate levels from the hierarchical Lorentzian representations based on the zoom parameters. The zoom controller determines which levels of the hierarchical representation should be accessed to achieve the requested magnification while maintaining optimal visual quality. For lower magnification levels, the controller might directly use the stored representations from the appropriate level of the hierarchy. As the magnification increases beyond what was explicitly stored, the controller creates a processing plan that combines information from multiple levels and prepares for the synthesis of new details. For instance, in a retail security application, if a user zooms into a barcode at 2× magnification, the zoom controller might directly access the next level of detail from the hierarchy; but at 8× magnification, it would need to combine the finest stored level with synthesized details. The zoom controller also manages transitions between different levels of detail, ensuring smooth visual experiences as the user adjusts the magnification. It determines the optimal balance between using stored information and generating new details based on factors such as computational resources, required response time, and desired quality.

In a step 1960, synthetic details are generated for regions beyond original resolution using the correlation network to predict plausible fine structures. This generative step creates new visual information that was not explicitly present in the original video but is consistent with its content and style. The correlation network analyzes patterns and relationships in the available data to infer how details would likely appear at finer scales than were captured in the original recording. It leverages both spatial correlations (patterns across different regions of the same frame) and temporal correlations (patterns across different frames) to guide this synthesis process. For example, in an archaeological documentation application, when zooming into ancient text inscriptions, the correlation network might generate enhanced details of partially eroded characters based on the patterns observed in better-preserved sections and similar characters elsewhere in the inscription. The detail synthesis process combines multiple approaches, including pattern matching, style transfer, and generative modeling, to create visually plausible fine structures. The correlation network ensures that the synthesized details maintain consistency with the surrounding content and adhere to the natural statistics of the video domain, avoiding artifacts or unrealistic features.

In a step 1970, the selected region is rendered with progressively enhanced detail, seamlessly blending recorded and synthesized information for a continuous zoom experience. This final rendering step combines the multiple levels of detail, including both the stored representations and the newly synthesized details, into a coherent visual output. The rendering process employs sophisticated blending techniques to create smooth transitions between different levels of detail and between recorded and synthesized content. For instance, in a real estate virtual tour application, as a user zooms into the details of a property's architectural features, the system would smoothly blend from the recorded overview to increasingly detailed views, with synthesized fine details appearing naturally as the zoom continues. The rendering may also incorporate visual enhancements such as sharpening, contrast adjustment, or noise reduction to improve the perceived quality of the zoomed region. The progressive nature of the rendering ensures that details appear gradually and naturally as the zoom level increases, rather than suddenly popping into view. This creates a continuous zoom experience that feels natural and immersive to the user, even when examining regions at magnification levels far beyond the original recording resolution.

Figure 16:
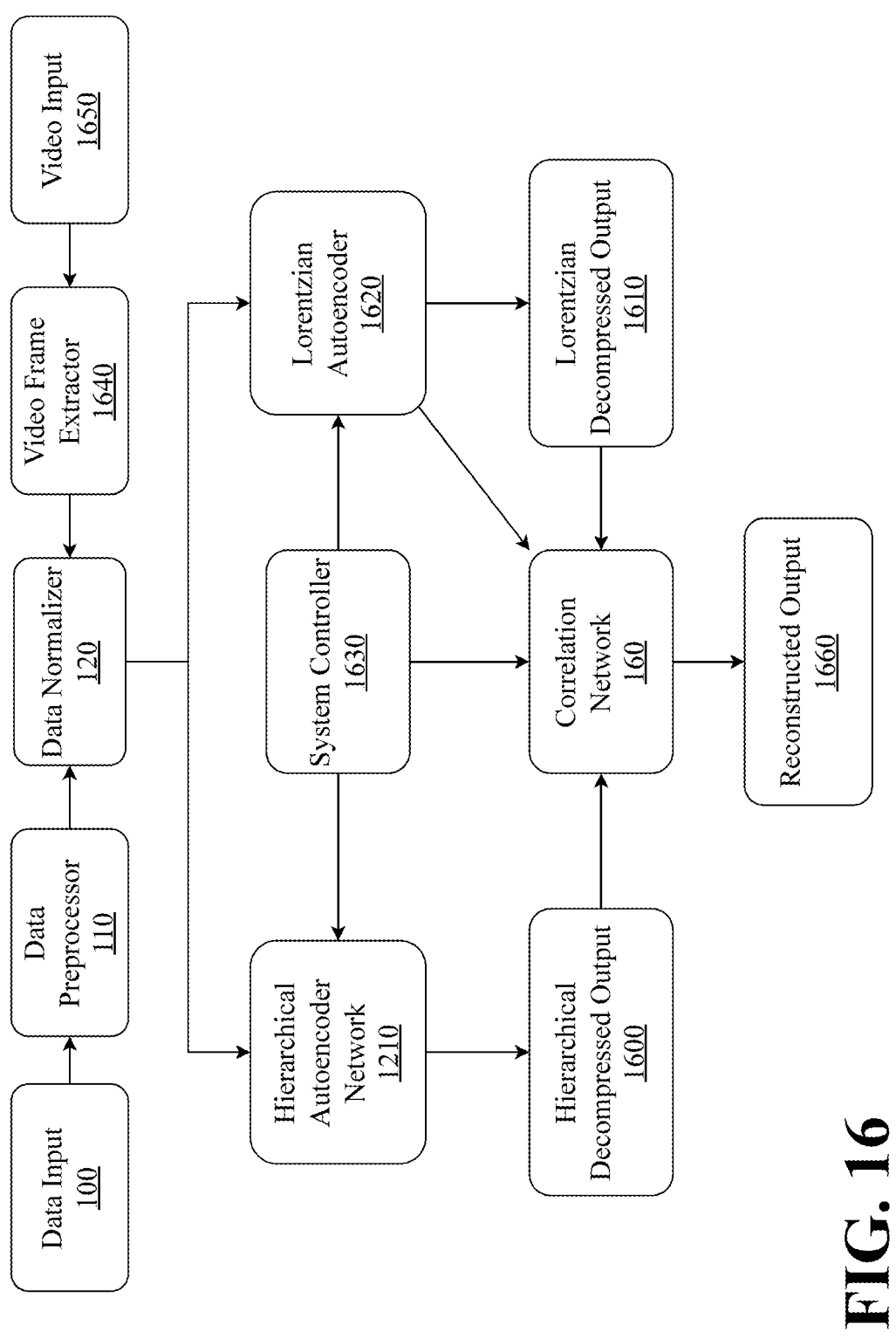
FIG. 16 is a block diagram illustrating an exemplary system architecture for video-focused compression with hierarchical and Lorentzian autoencoders.

FIG. 16 is a block diagram illustrating an exemplary system architecture for video-focused compression with hierarchical and Lorentzian autoencoders. The system combines traditional data processing capabilities with specialized video processing features to provide enhanced compression and restoration performance across multiple data types. The system comprises a data input 100 which receives general data for processing. This data input may include various forms of structured or unstructured data such as images, audio, text, or sensor readings. The data from data input 100 is passed to a data preprocessor 110 which performs initial preparation operations such as cleaning, formatting, and organizing the incoming data. Preprocessor 110 may implement different strategies depending on the data type, including but not limited to noise reduction, artifact removal, format conversion, and feature extraction. After preprocessing, the data proceeds to a data normalizer 120 which standardizes the data to consistent ranges and scales. Normalization is for ensuring that different data types and ranges can be processed effectively by the neural networks in subsequent stages. Data normalizer 120 may employ techniques such as but not limited to min-max scaling, z-score normalization, or other transformations appropriate to the specific data characteristics.

In parallel with the traditional data path, the system provides specialized processing for video content. A video input 1650 feeds video data into the system, which is then processed by a video frame extractor 1640. Video frame extractor 1640 segments the incoming video stream into appropriate units for processing, extracting frames and organizing them into three-dimensional tensors where the first two dimensions represent spatial information (height and width) and the third dimension represents time. This organization preserves the spatiotemporal relationships within the video data, which is useful for the Lorentzian processing approach. The output from video frame extractor 1640 is also passed to data normalizer 120, ensuring that the video data is appropriately scaled and prepared for subsequent processing stages. From data normalizer 120, the prepared data can follow one of two main processing paths depending on its nature and the required compression approach.

For general data, the system employs a hierarchical autoencoder network 1210 which processes data through multiple levels of abstraction, capturing features at different scales and resolutions. Hierarchical autoencoder network 1210 implements a multi-level compression approach, with each level focusing on features of different scales, from coarse to fine-grained. Each level in the hierarchy operates as a distinct encoding and decoding layer, where the output of one level serves as input to the next. The coarsest level captures global structure and overall patterns, while subsequent levels progressively preserve finer details and local features. This cascade of processing enables efficient representation of data with varying complexity across different spatial regions.

For video data specifically, the system utilizes a Lorentzian autoencoder 1620 which maintains the tensor structure throughout the compression process. Lorentzian autoencoder 1620 is specialized for processing three-dimensional tensors where the dimensions represent height, width, and time. Unlike traditional approaches that flatten frames into vectors or process them separately, Lorentzian autoencoder 1620 preserves spatiotemporal relationships by applying 3D convolutional operations directly to the tensor structure. This preserves motion patterns, temporal continuity, and spatial coherence that would otherwise be lost during compression. The mini-Lorentzian representation produced by the encoder maintains this tensor format but with reduced dimensions, allowing for efficient storage while retaining the essential structural information needed for high-quality restoration. This tensor-based approach supports advanced features such as temporal prediction and infinite zoom capabilities, where the system can synthesize plausible details beyond the original video resolution.

Both autoencoder systems are monitored and controlled by a system controller 1630 which coordinates operations between the different processing components. System controller 1630 manages compression parameters, quality settings, processing priorities, and other operational aspects of the autoencoders. It also facilitates the implementation of advanced features such as infinite zoom capability by coordinating the appropriate processing levels and resources. After processing through their respective autoencoders, the data produces two types of decompressed outputs: hierarchical decompressed output 1600 from the hierarchical autoencoder network, and Lorentzian decompressed output 1610 from the Lorentzian autoencoder. These outputs represent restored versions of the original inputs but may still contain artifacts or information loss from the compression process.

To further enhance the quality of restoration, both decompressed outputs are passed to a correlation network 160. Correlation network 160 analyzes relationships and patterns between different aspects of the decompressed data, leveraging cross-correlations to recover information that might have been lost during compression. For video data, correlation network 160 can exploit temporal and spatial patterns to predict and restore missing details. Correlation network 160 may implement different strategies for different data types, with specialized processing for the tensor-structured outputs from Lorentzian autoencoder 1620. The final stage of the system produces a reconstructed output 1660 which represents the fully processed and restored data. This output combines the strengths of both autoencoder approaches and the enhancement capabilities of the correlation network, resulting in high-quality reconstructions that preserve essential information from the original inputs.

In operation, the system dynamically routes different types of data through the appropriate processing paths based on their characteristics. For example, video data would primarily flow through video frame extractor 1640 and Lorentzian autoencoder 1620 path, while other data types would be processed through hierarchical autoencoder network 1210. System controller 1630 continuously monitors and adjusts the processing parameters to optimize quality and efficiency. This integrated architecture enables several advanced capabilities, such as multi-modal data processing where the system can handle diverse data types through appropriate specialized pathways; enhanced video compression by maintaining tensor structure throughout the process, with Lorentzian autoencoder 1620 achieving better preservation of spatiotemporal relationships; infinite zoom functionality where the hierarchical representations and Lorentzian processing enable continuous zooming beyond original resolution by synthesizing plausible details at finer scales; and cross-domain correlation where the correlation network can leverage patterns across different data types and representations to enhance overall restoration quality. The system may be implemented on various computing platforms, including but not limited to cloud-based systems, edge devices, or specialized hardware accelerators. The specific implementation may vary based on the computational resources available and the requirements of the application domain.

Figure 17:
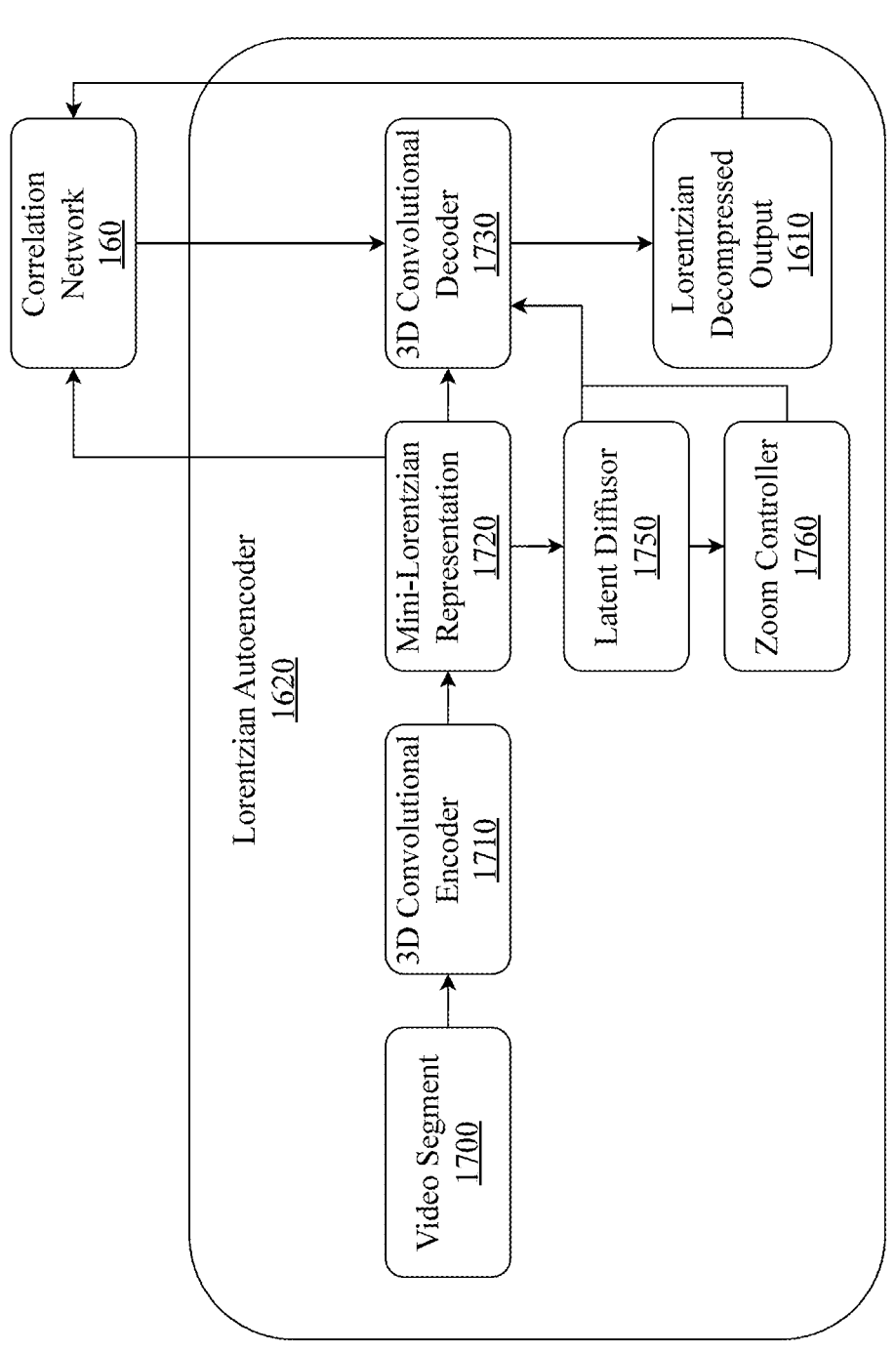
FIG. 17 is a block diagram illustrating an exemplary architecture for a subsystem of the system for video-focused compression with hierarchical and Lorentzian autoencoders, a Lorentzian autoencoder.

FIG. 17 is a block diagram illustrating an exemplary architecture for a subsystem of the system for video-focused compression with hierarchical and Lorentzian autoencoders, a Lorentzian autoencoder. Lorentzian autoencoder 1620 is designed for processing video data while preserving spatiotemporal relationships throughout the compression and restoration process. The autoencoder contains multiple specialized components that work together to achieve efficient compression and high-quality restoration of video content. The process begins with a video segment 1700 which serves as the input to Lorentzian autoencoder 1620. This video segment represents a sequence of video frames structured as a three-dimensional tensor, where the dimensions correspond to height, width, and time. The tensor format enables the system to process spatial and temporal information simultaneously, preserving important relationships that might be lost in traditional frame-by-frame processing approaches. The video segment may be extracted from a larger video stream by the video frame extractor 1640, with appropriate preprocessing and normalization applied before reaching the Lorentzian autoencoder.

Video segment 1700 is first processed by a 3D convolutional encoder 1710, which applies a series of three-dimensional convolutional operations to the input tensor. Unlike traditional two-dimensional convolutional networks that process images, 3D convolutional encoder 1710 operates across both spatial and temporal dimensions simultaneously. This approach allows the encoder to capture spatiotemporal patterns and dependencies within the video data. The 3D convolutional operations progressively reduce the dimensions of the input tensor while increasing the feature depth, effectively compressing the video data into a more compact representation. 3D convolutional encoder 1710 may employ various architectural elements such as pooling layers, activation functions, and skip connections to optimize the encoding process for different types of video content and compression requirements.

The output of the 3D convolutional encoder 1710 is a mini-Lorentzian representation 1720, which is a compressed version of the original video segment that maintains the tensor structure. The mini-Lorentzian representation preserves the three-dimensional nature of the original data but with reduced spatial and temporal dimensions and potentially increased feature channels. This compressed representation serves as the central element of Lorentzian autoencoder 1620, connecting to multiple subsequent processing components. The mini-Lorentzian representation 1720 maintains matrix and tensor structures in the latent space, rather than flattening to vectors as is common in traditional autoencoders. This structural preservation enables more effective modeling of complex relationships within the video data and supports advanced features such as infinite zoom capabilities.

From the mini-Lorentzian representation 1720, the data follows multiple paths within the autoencoder. One path leads to 3D convolutional decoder 1730, which is responsible for reconstructing the original video data from the compressed representation. 3D convolutional decoder 1730 performs operations that are essentially the inverse of the encoder, progressively expanding the spatial and temporal dimensions while reducing the feature depth. The decoder may employ transposed convolutions, upsampling operations, and other techniques to effectively reconstruct the video data from its compressed form. The decoder's architecture often mirrors that of the encoder, potentially with skip connections between corresponding encoder and decoder layers to preserve fine details that might otherwise be lost during compression.

Another path from mini-Lorentzian representation 1720 leads to latent diffusor 1750, which models and analyzes the dynamics of the latent space. The latent diffusor examines patterns and trajectories within the mini-Lorentzian representation to understand how features evolve over time. This component plays a role in temporal prediction and synthesis, enabling the system to generate coherent video content beyond what was explicitly encoded in the compressed representation. Latent diffusor 1750 provides information to 3D convolutional decoder 1730, enhancing its ability to reconstruct temporally consistent and visually plausible video sequences. Latent diffusor 1750 may incorporate recurrent neural network architectures, attention mechanisms, or other specialized components designed to capture temporal dependencies and patterns.

Mini-Lorentzian representation 1720 also connects to correlation network 160. Correlation network 160 can identify patterns and similarities across different compressed representations, enabling it to recover information that might have been lost during compression. The output from correlation network 160 flows back to the 3D convolutional decoder 1730, providing additional information that enhances the quality of the reconstructed video.

Latent diffusor 1750 connects to a zoom controller 1760, which manages the infinite zoom capability of the system. Zoom controller 1760 uses information about the latent space dynamics to generate additional details when zooming into specific regions of the video. By understanding the structured nature of the mini-Lorentzian representations across different scales, the zoom controller 1760 can direct the decoder to synthesize plausible fine details even beyond the resolution of the original video. Zoom controller 1760 also provides input to 3D convolutional decoder 1730, influencing how it reconstructs the video data based on the desired zoom level and region of interest.

The final output of Lorentzian autoencoder 1620 is a Lorentzian decompressed output 1610, which represents the restored video segment after all processing stages. This output maintains the tensor structure of the original input but with potentially enhanced quality due to the restoration capabilities of the various components within the autoencoder. Lorentzian decompressed output 1610 may then be further processed by the correlation network 160 as part of the broader system, where it can be integrated with outputs from the hierarchical autoencoder to produce the final reconstructed output. Lorentzian autoencoder 1620 architecture represents a significant advancement in video compression technology, enabling higher compression ratios while maintaining better visual quality and supporting advanced features such as infinite zoom. The preservation of tensor structure throughout the processing pipeline allows for more effective modeling of spatiotemporal relationships, resulting in superior compression and restoration performance compared to traditional approaches that process video frames independently or flatten the data to vectors in the latent space.

FIG. 1 is a block diagram illustrating an exemplary system architecture for compressing and restoring data using multi-level autoencoders and correlation networks. In one embodiment, a system for compressing and restoring data using multi-level autoencoders and correlation networks comprises a plurality of data inputs 100, a data preprocessor 110, a data normalizer 120, a multi-layer autoencoder network 130 which further comprises an encoder network 131 and a decoder network 132, a plurality of compressed outputs 140, plurality of decompressed outputs 170, a decompressed output organizer 190, a plurality of correlation networks 160, and a reconstructed output 180. The plurality of data inputs 100 are representations of raw data from various sources, such as sensors, cameras, or databases. The raw data can be in different formats, including but not limited to images, videos, audio, or structured data. The plurality of data inputs 100 may be transferred to the data preprocessor 110 for further processing. The data preprocessor 110 applies various preprocessing techniques to the raw data received from the data input 100. These techniques may include data cleaning, noise reduction, artifact removal, or format conversion. The preprocessor 110 ensures that the data is in a suitable format and quality for subsequent stages of the system.

The preprocessed data may then be passed to the data normalizer 120. The data normalizer 120 scales and normalizes the data to a consistent range, typically between 0 and 1. Normalization helps to improve the training stability and convergence of the autoencoder network 130. The normalized data is fed into the autoencoder network 130, which includes both the encoder network 131 and the decoder network 132. The encoder network 131 is responsible for encoding the input data into a lower-dimensional latent space representation. It consists of multiple layers of encoders that progressively reduce the dimensionality of the data while capturing the most important features and patterns.

The compressed latent representation obtained from the encoder network 131 is the compressed output 140. The compressed output 140 has a significantly reduced size compared to the original input data, enabling efficient storage and transmission. The compressed output 140 may be stored in a storage system. A storage system may can be any suitable storage medium, such as a database, file system, or cloud storage. Storage systems allow for the efficient management and retrieval, or the compressed data as needed.

When the compressed data needs to be restored or reconstructed, it may be retrieved from the storage system and passed to the decoder network 132. Additionally, the compressed data may be directly passed to the decompression network 132. The decoder network 132 is responsible for decoding the compressed latent representation back into the original data space by outputting a decompressed output 170. It consists of multiple layers of decoders that progressively increase the dimensionality of the data, reconstructing the original input.

The decompressed output 170 from the encoder network 132 may have some loss of information compared to the original input data due to the compression process. To further enhance the quality of the decompressed output, the system may incorporate a correlation network 160. The correlation network 160 leverages the correlations and patterns between different compressed inputs to restore the decompressed output more accurately. It learns to capture the relationships and dependencies within the data, allowing for better reconstruction and restoration of the original information. The correlation network 160 takes the decompressed outputs 170 as inputs. It analyzes the correlations and similarities between the data samples and uses this information to refine and enhance the decompressed output. The refined decompressed output from the correlation network 160 is a reconstructed output 180 of the system. The reconstructed output 180 closely resembles the original input data, with minimal loss of information and improved quality compared to the output from the decoder network 132 alone.

In one embodiment, the correlation network 160 may receive inputs from a decompressed output organizer 190 which that operates on the decompressed outputs 170 obtained from the decoder network 132. The decompressed output organizer 190 may organize the decompressed outputs 170 into groups based on their correlations and similarities.

By grouping decompressed outputs 170 based on similarities, the correlation network 160 will more easily be able to identify correlations between decompressed outputs 170. The correlation network 160 finds patterns and similarities between decompressed outputs 170 to develop a more holistic reconstructed original input. By priming the correlation network 160 with already grouped, similar compressed outputs 170, the correlation network 160 will be able to generate even more reliable reconstructions. The multilayer autoencoder network 130 and the correlation network 160 are trained using a large dataset of diverse samples. The training process involves minimizing the reconstruction loss between the original input data and the decompressed output 170. The system learns to compress the data efficiently while preserving the essential features and patterns.

Figure 2:
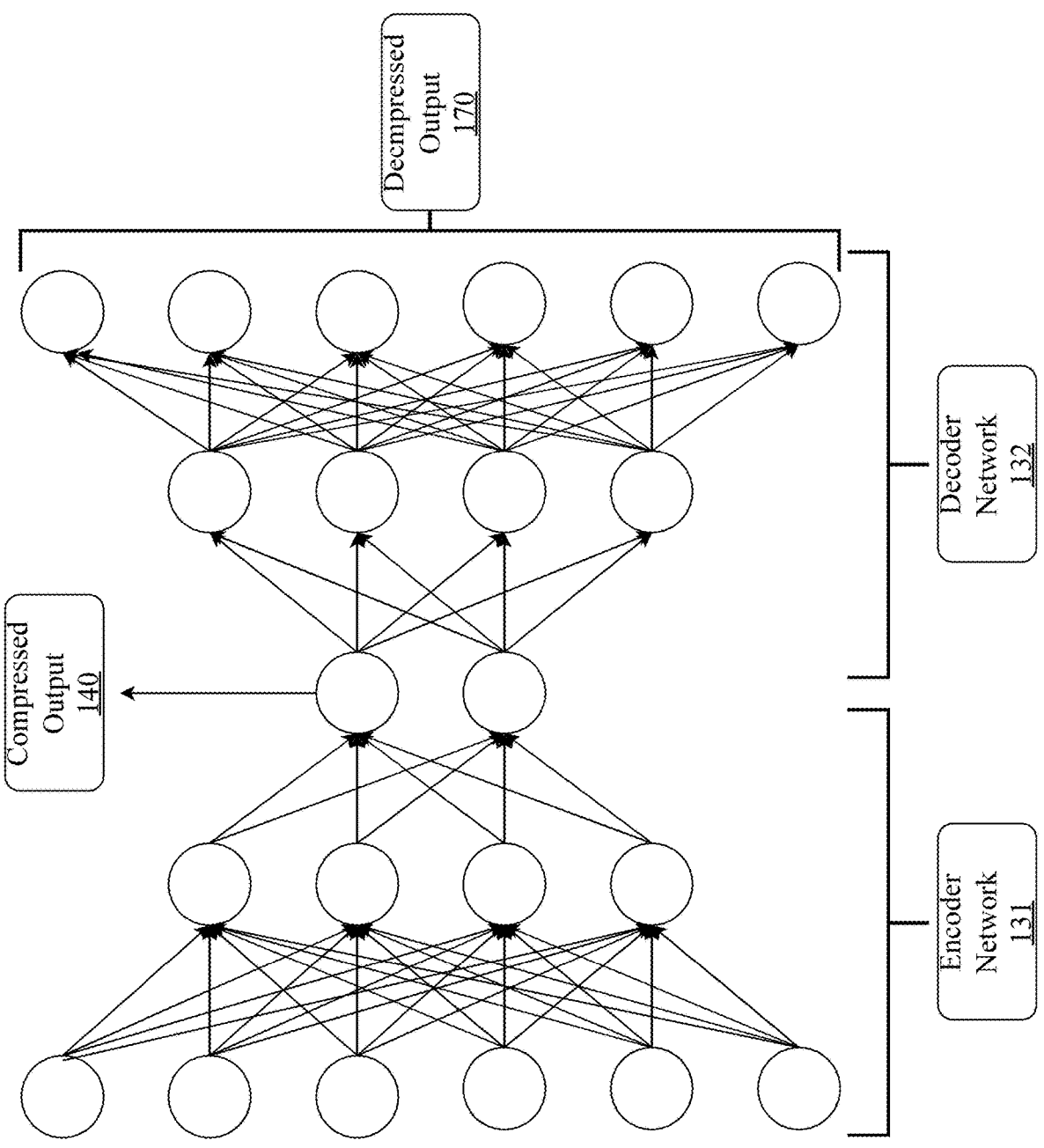
FIG. 2 is a block diagram illustrating an exemplary architecture for a subsystem of the system for compressing and restoring data using multi-level autoencoders and correlation networks, an autoencoder network.

FIG. 2 is a block diagram illustrating an exemplary architecture for a subsystem of the system for compressing and restoring data using multi-level autoencoders and correlation networks, a multi-layer autoencoder network. The multi-layer autoencoder network comprises an encoder network 131 or a decoder network 132 that work together to encode and decode data effectively. The encoder network 131 and decoder network 132 within the multi-layer autoencoder network 210 is comprised of a plurality of layers that contribute to the encoding and decoding process. These layers include, but are not limited to, convolutional layers, pooling layers, and a bottleneck layer. Some embodiments also include functions that operate on information including but not limited to rectified linear unit functions, sigmoid functions, and skip connections.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem. The bottleneck layer represents the most compressed representation of the input data. The bottleneck layer has a significantly reduced dimensionality compared to the input and output layers of the autoencoder. It forces the network to learn a compact and meaningful encoding of the data, capturing the essential features and discarding redundant information. In one embodiment, the multi-layer autoencoder network is comprised of a plurality of the previously mentioned layers where the sequence and composition of the layers may vary depending on a user's preferences and goals. The bottleneck layer is where the compressed output 140 is created. Each layer previous to the bottleneck layer creates a more and more compressed version of the original input. The layers after the bottleneck layer represent the decoder network 132 where a plurality of layers operate on a compressed input to decompress a data set. Decompression results in a version of the original input which is largely similar but has some lost data from the transformations.

Figure 3:
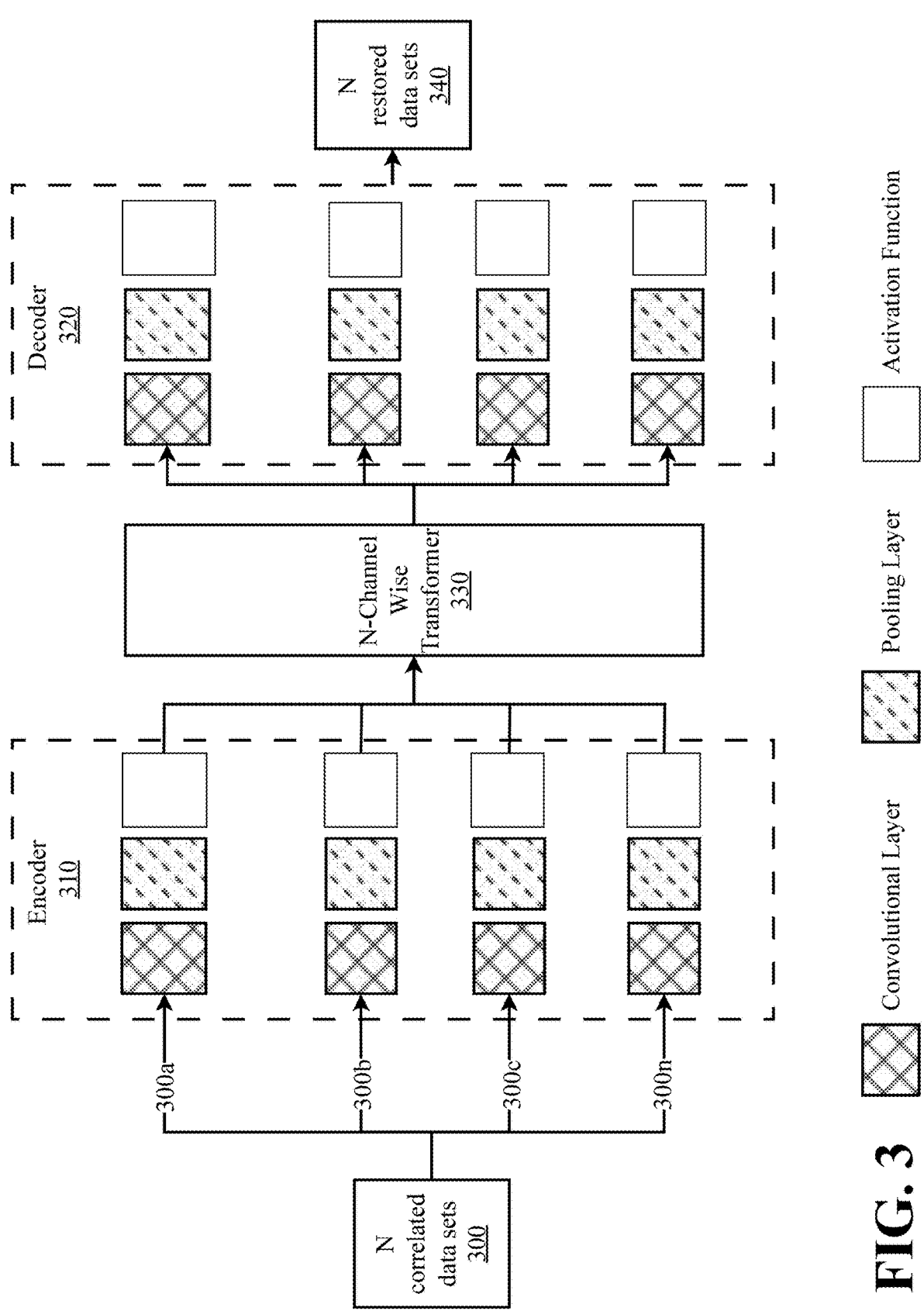
FIG. 3 is a block diagram illustrating an exemplary architecture for a subsystem of the system for compressing and restoring data using multi-level autoencoders and correlation networks, a correlation network.

FIG. 3 is a block diagram illustrating an exemplary architecture for a subsystem of the system for compressing and restoring data using multi-level autoencoders and correlation networks, a correlation network. The correlation network 160 is designed to enhance the reconstruction of decompressed data by leveraging correlations and patterns within the data. The correlation network 160 may also be referred to as a neural upsampler. The correlation network 160 comprises a plurality of correlation network elements that work together to capture and utilize the correlations for improved data reconstruction. Each correlation network element within the correlation network 160 contributes to the correlation learning and data reconstruction process. These elements include, but are not limited to, convolutional layers, skip connections, pooling layers and activation functions such as but not limited to, rectified linear unit functions or sigmoid functions.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the auto-encoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem.

In one embodiment, the correlation network 160 may comprise an encoder 310, a decoder 320, an N number of correlated data sets 300, an N number-channel wise transformer 330, and an N number of restored data sets 340. Additionally, the correlation network 160 may be comprised of a plurality of convolutional layers, pooling layers, and activation functions. In one embodiment, the correlation network 160 may be configured to receive N correlated data sets 300 where each correlated data set includes a plurality of decompressed data points. In one embodiment, the correlation network 160 may be configured to receive four correlated data sets as an input. The correlated data sets may have been organized by a decompressed output organizer 170 to maximize the similarities between the data points in each set. One data set, 300, may include data points 300a, 300b, 300c, through 300n, where the decompressed output organizer 170 has determined the N number of data points are similar enough to be grouped together. The correlation network 160 may then receive and process full data sets at a time. In FIG. 3, the data is processed through an encoder 310 by passing through a convolutional layer, a pooling layer, and an activation function.

Activation functions introduce non-linearity into the network, enabling it to learn and represent complex patterns and relationships in the data. Common activation functions include but are not limited to sigmoid, tanh, ReLU (Rectified Linear Unit), and its variants. These functions have different properties and are chosen based on the specific requirements of the task and the network architecture. For example, ReLU is widely used in deep neural networks due to its ability to alleviate the vanishing gradient problem and promote sparsity in the activations. By applying activation functions, the neural network can learn capture non-linear relationships in the data, enabling it to model complex patterns and make accurate predictions or decisions.

The encoder 310 breaks the decompressed outputs passed by the decompressed output organizer 170 down into smaller representations of the original data sets. Following the encoder the data may pass through a transformer 330. A transformer is a type of neural network architecture that may rely on a self-attention mechanism which allows the model to weigh the importance of different parts of the input sequence when processing each element. This enables the transformer to capture dependencies and relationships between elements in the sequence efficiently. After being processed by a transformer 330, the data sets may be further processed by a decoder 320 which restores the smaller representations back into the original decompressed data sets. The decoder 320 may have a similar composition as the encoder 310, but reversed, to undo the operations performed on the data sets by the encoder 310. The transformer 330 may identify important aspects in each group of decompressed data passed through the correlation network which allows the decoder 320 to rebuild a more complete version of the original decompressed data sets. The decoder 320 may output an N number of restored data sets 340 which correspond to the N number of correlated data sets 300 originally passed through the correlation network 170.

Figure 4:
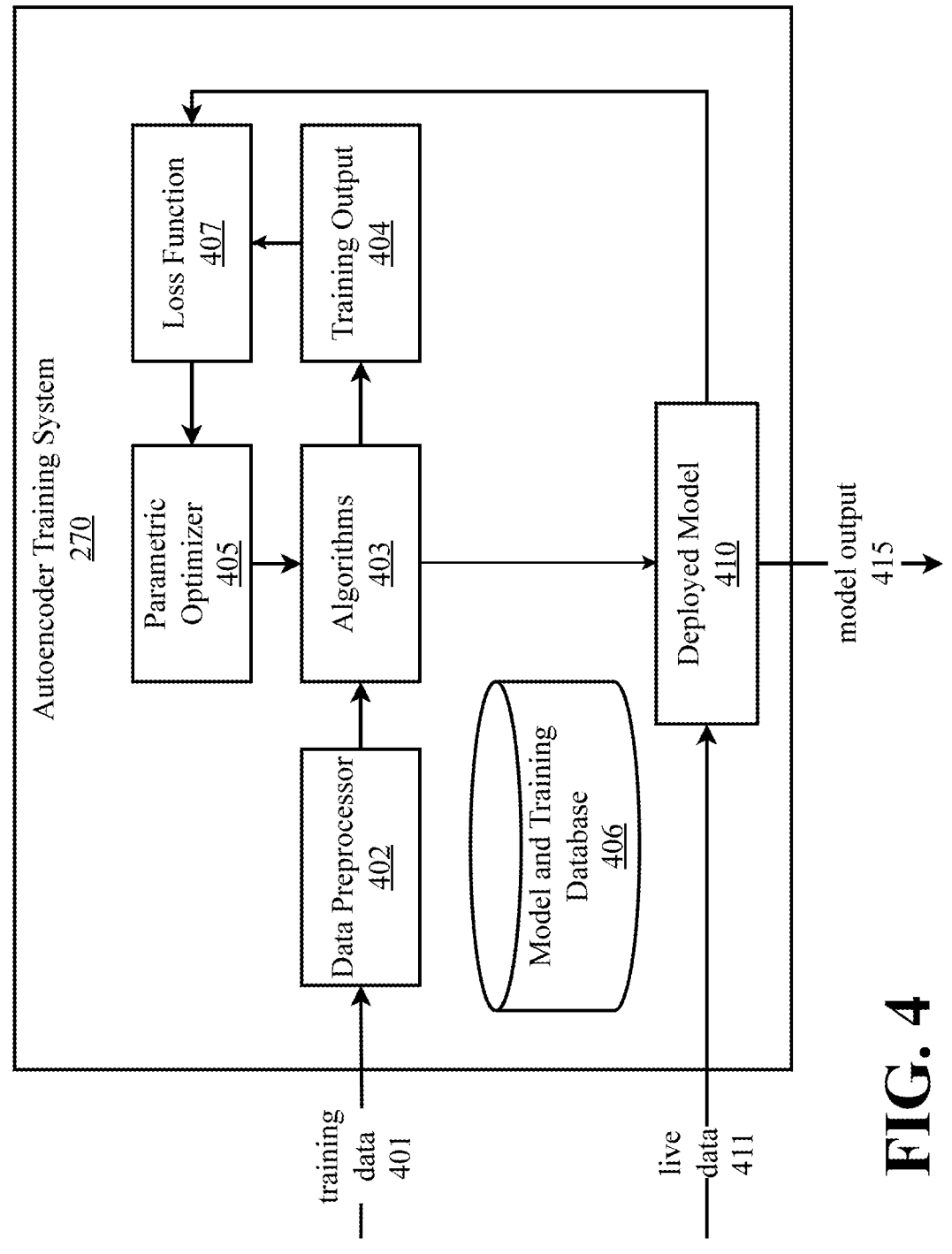
FIG. 4 is a block diagram illustrating an exemplary architecture for a subsystem of the system for compressing and restoring data using multi-level autoencoders and correlation networks, an autoencoder training system.

FIG. 4 is a block diagram illustrating an exemplary aspect of a platform for a subsystem of the system for compressing and restoring data using multi-level autoencoders and correlation networks, an autoencoder training system 270. According to the embodiment, the autoencoder training system 270 may comprise a model training stage comprising a data preprocessor 402, one or more machine and/or deep learning algorithms 403, training output 404, and a parametric optimizer 405, and a model deployment stage comprising a deployed and fully trained model 410 configured to perform tasks described herein such as transcription, summarization, agent coaching, and agent guidance. Autoencoder training system 270 may be used to train and deploy the multi-layer autoencoder network 210 in order to support the services provided by the compression and restoration system.

At the model training stage, a plurality of training data 401 may be received at the autoencoder training system 270. In some embodiments, the plurality of training data may be obtained from one or more storage systems 150 and/or directly from various information sources. In a use case directed to hyperspectral images, a plurality of training data may be sourced from data collectors including but not limited to satellites, airborne sensors, unmanned aerial vehicles, ground-based sensors, and medical devices. Hyperspectral data refers to data that includes wide ranges of the electromagnetic spectrum. It could include information in ranges including but not limited to the visible spectrum and the infrared spectrum. Data preprocessor 402 may receive the input data (e.g., hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 403 to train a predictive model for object monitoring and detection.

During model training, training output 404 is produced and used to measure the quality and efficiency of the compressed outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the autoencoder training system 270 to evaluate a model's performance. Metrics can include, but are not limited to, compression ratio, the amount of data lost, the size of the compressed file, and the speed at which data is compressed, to name a few. In one embodiment, the system may utilize a loss function 407 to measure the system's performance. The loss function 407 compares the training outputs with an expected output and determined how the algorithm needs to be changed in order to improve the quality of the model output. During the training stage, all outputs may be passed through the loss function 407 on a continuous loop until the algorithms 403 are in a position where they can effectively be incorporated into a deployed model 415.

The test dataset can be used to test the accuracy of the model outputs. If the training model is compressing or decompressing data to the user's preferred standards, then it can be moved to the model deployment stage as a fully trained and deployed model 410 in a production environment compressing or decompressing live input data 411 (e.g., hyperspectral data). Further, model compressions or decompressions made by deployed model can be used as feedback and applied to model training in the training stage, wherein the model is continuously learning over time using both training data and live data and predictions.

A model and training database 406 is present and configured to store training/test datasets and developed models. Database 406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.). In some implementations, the autoencoder training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 406.

Figure 5:
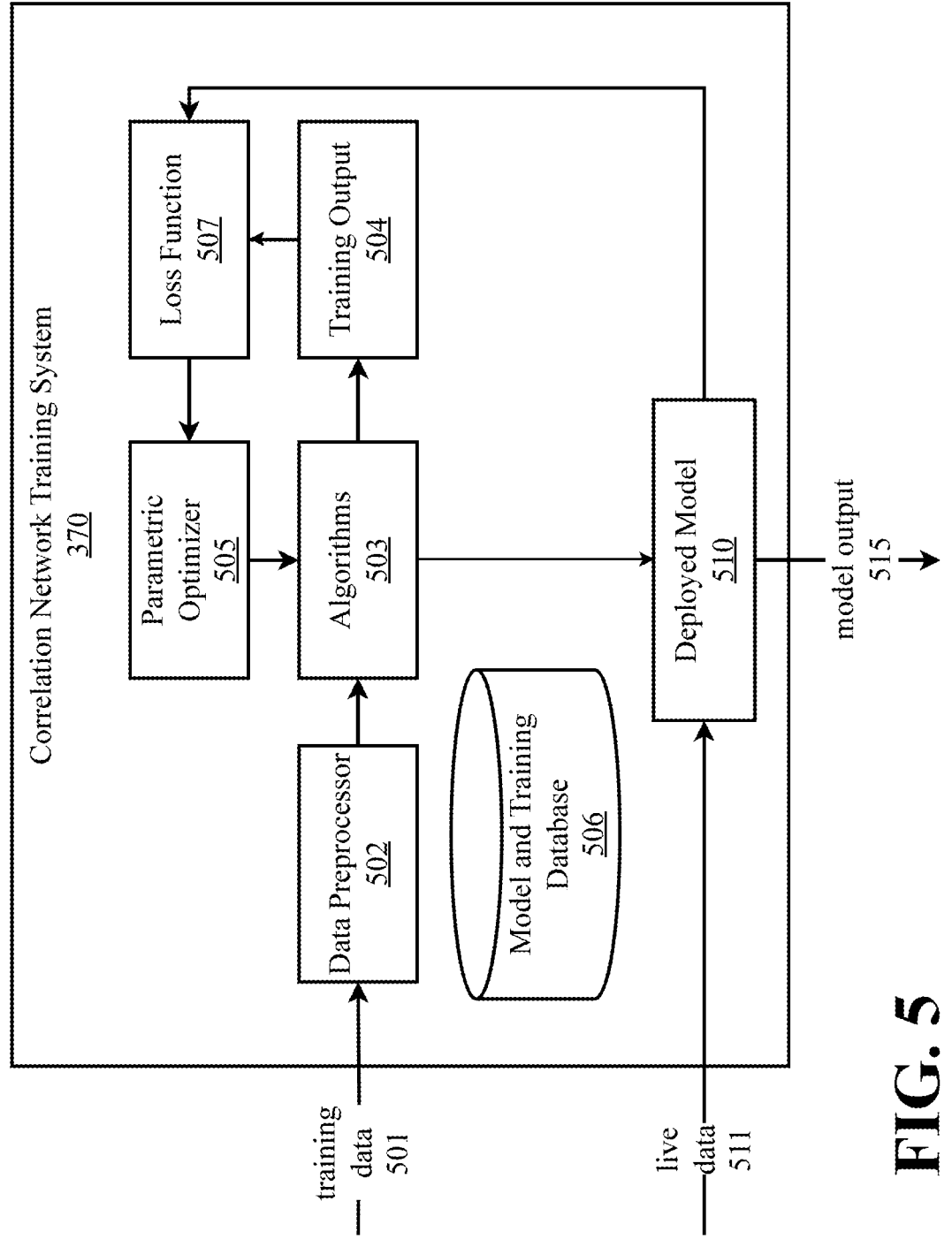
FIG. 5 is a block diagram illustrating an exemplary architecture for a subsystem of the system for compressing and restoring data using multi-level autoencoders and correlation networks, correlation network training system.

FIG. 5 is a block diagram illustrating an exemplary aspect of a subsystem of the system for compressing and restoring data using multi-level autoencoders and correlation networks, a correlation network training system 370. According to the embodiment, correlation network training system 370 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such determining correlations between compressed data sets. The correlation network training system 370 may be used to train and deploy the correlation network 300 in order to support the services provided by the compression and decompression system.

At the model training stage, a plurality of training data 501 may be received by the correlation network training system 500. In some embodiments, the plurality of training data may be obtained from one or more storage systems 150 and/or directly from the compression network 131. In some embodiments, the correlation network training system may obtain data sets from a vector grouping system 180. In a use case directed to hyperspectral data sets, a plurality of decompressed training data may be sourced from a hyperspectral data compression system. Data preprocessor 502 may receive the input data (e.g., decompressed hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 400 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 507 to measure the system's performance. The loss function 507 compares the training outputs with an expected output and determined how the algorithm needs to be changed in order to improve the quality of the model output. During the training stage, all outputs may be passed through the loss function 507 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., compressed hyperspectral data). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the correlation network training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

Detailed Description of Exemplary Aspects

Figure 34:
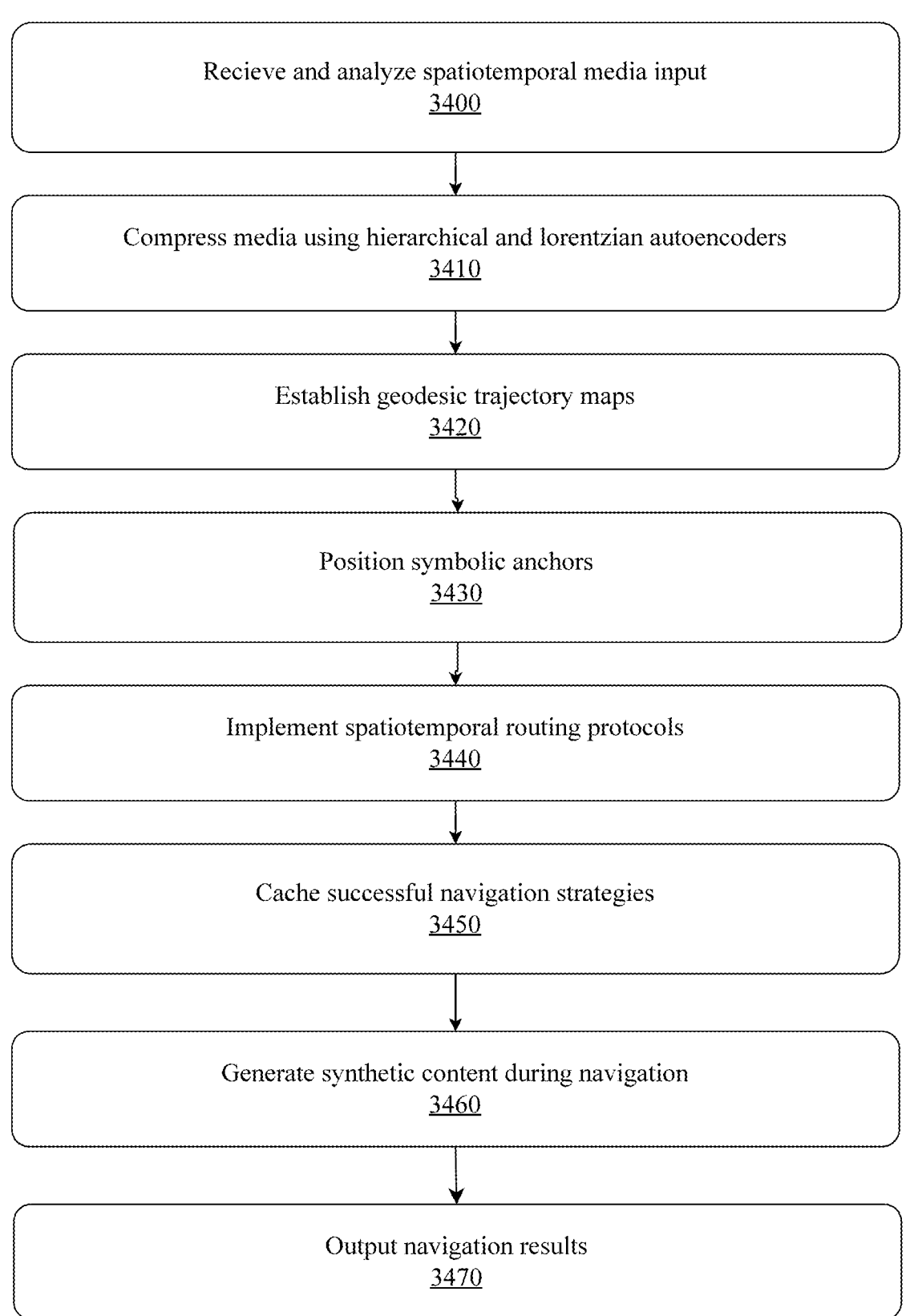
FIG. 34 is a flow diagram illustrating an exemplary method for latent hyperspace navigation in spatiotemporal media.

FIG. 34 is a flow diagram illustrating an exemplary method for latent hyperspace navigation in spatiotemporal media, showing the complete sequence of operations that transform raw spatiotemporal media content into navigation systems with sophisticated cognitive capabilities. The method combines advanced compression techniques with geometric navigation algorithms and cognitive processing frameworks to create a comprehensive approach that treats spatiotemporal media as navigable cognitive terrain rather than static data streams, enabling sophisticated exploration, analysis, and synthesis capabilities across diverse application domains.

The method begins with step 3400, where spatiotemporal media input is received and analyzed to determine content characteristics, temporal structure, and semantic domains. This initial analysis step provides the foundation for all subsequent processing by establishing a comprehensive understanding of the input material's properties, organization, and potential navigation requirements. The analysis includes determination of content characteristics such as resolution, frame rates, color spaces, and encoding formats that affect processing strategies and quality requirements. Temporal structure analysis examines the chronological organization of the content, identifying sequence boundaries, scene transitions, narrative elements, and causal relationships that influence navigation planning and trajectory optimization. Semantic domain identification categorizes the content into thematic regions, conceptual clusters, and meaningful categories that guide anchor placement and routing decisions. This comprehensive initial analysis ensures that subsequent processing steps are optimized for the specific characteristics and requirements of the input media content.

The method proceeds to step 3410, where the media content is compressed using hierarchical and Lorentzian autoencoders to create navigable latent representations while preserving both spatial and temporal relationships. This compression step transforms the high-dimensional input media into structured latent representations that support intelligent navigation while maintaining the essential geometric and semantic properties required for meaningful traversal and reconstruction. The hierarchical autoencoder component creates multi-scale representations that span from global scene structure to fine-grained detail levels, enabling navigation across different resolution scales and abstraction levels. The Lorentzian autoencoder component ensures that temporal causality and motion dynamics are preserved through pseudo-Riemannian geometric constraints that maintain proper temporal ordering and causal relationships. The compression process preserves spatial and temporal relationships by maintaining tensor structure coherence and implementing geometric regularization that prevents distortion of essential structural properties during dimensionality reduction.

Quality validation occurs through a decision point, which evaluates whether the compression process has achieved sufficient quality for subsequent navigation operations. If the quality check indicates insufficient compression fidelity, the method returns to step 3410 with adjusted parameters or alternative compression strategies. If quality is acceptable, the method proceeds to the next processing stage, ensuring that only adequately compressed representations enter the navigation pipeline.

In step 3420, geodesic trajectory maps are established within the latent hyperspace to define optimal paths through high-dimensional media spaces. This trajectory mapping process accounts for the geometric properties of the latent space and provides the mathematical foundation for intelligent navigation that respects both semantic coherence and temporal consistency. The establishment of geodesic trajectory maps involves analysis of manifold curvature, identification of natural path corridors, and computation of optimal routes that minimize traversal cost while maintaining semantic coherence. The geometric property accounting ensures that trajectory calculations respect the intrinsic structure of the latent manifold and avoid paths that would create semantic conflicts or temporal inconsistencies. The intelligent navigation foundation enables sophisticated routing decisions that balance efficiency with meaningfulness, creating navigation experiences that are both computationally optimal and semantically coherent.

Step 3430 involves positioning symbolic anchors at semantically significant locations throughout the latent hyperspace, creating persistent reference points that enable strategic planning and consistent navigation across extended temporal sequences. The anchor positioning process identifies significant locations based on semantic importance, navigational utility, temporal significance, and strategic value to ensure that anchors provide maximum benefit for navigation and cognitive processing. The creation of persistent reference points establishes stable landmarks that maintain their identity and utility as the latent space evolves through continued use and learning. Strategic planning enablement provides the cognitive infrastructure necessary for long-term navigation planning and objective achievement across complex scenarios and extended interaction sessions.

In step 3440, spatiotemporal routing protocols are implemented to enable intelligent navigation across multiple scales and domains while coordinating immediate navigation requirements with long-term strategic objectives. The routing protocol implementation establishes systematic procedures for navigation decision-making that operate effectively across different temporal scales and semantic domains. Multi-scale navigation capability enables the system to handle navigation decisions ranging from immediate frame-to-frame transitions to long-term strategic planning spanning entire media sequences. The coordination between immediate and long-term objectives ensures that tactical navigation decisions support broader strategic goals while maintaining flexibility for adaptive responses to changing conditions and emerging opportunities.

Navigation success is evaluated through a decision point, which determines whether the implemented routing protocols have achieved their intended objectives effectively. If navigation has failed to meet success criteria, the method returns to step 3430 to revise anchor positioning and routing strategies. If navigation is successful, the method proceeds to capture and preserve the successful strategies for future reuse.

Step 3450 involves caching successful navigation strategies for reuse in similar contexts, creating a form of procedural memory that enables continuous learning and increasingly sophisticated navigation behaviors. The strategy caching process preserves navigation patterns that have demonstrated effectiveness, including not only the specific paths taken but also the contextual conditions and decision criteria that contributed to success. Strategy reuse capability enables the system to apply proven approaches to similar scenarios while adapting them to meet specific contextual requirements. Continuous learning support allows the system to accumulate knowledge and improve performance over time through systematic analysis of successful strategies and their application contexts.

Step 3460 generates synthetic content during navigation to support seamless exploration and interaction beyond the boundaries of original media content. The synthetic content generation process maintains consistency with existing material while enabling infinite exploration capabilities that extend user interaction beyond the limitations of captured content. The content generation includes contextual appropriateness assessment that ensures synthesized material fits naturally with surrounding content, consistency maintenance mechanisms that preserve style, quality, and semantic coherence across generated and original content, and infinite exploration support that enables continuous user interaction without artificial boundaries or discontinuities.

A decision point evaluates whether additional synthetic content is needed for continued navigation or whether the current session can proceed to output generation. If additional content is needed, the method continues navigation with synthetic content generation. If no additional content is required, the method proceeds to output the final navigation results.

Step 3470 outputs navigation results in forms appropriate for specific applications, providing the final products of the complete latent hyperspace navigation process. The output generation includes enhanced media content with improved quality, accessibility, and interactive capabilities, navigation recommendations that guide users toward content of interest based on strategic objectives and contextual analysis, and strategic insights that provide high-level understanding of content relationships, patterns, and opportunities for further exploration or analysis. The output formatting ensures that results are presented in forms suitable for specific application requirements and user interfaces, enabling effective integration with diverse technological frameworks and user interaction paradigms.

The method incorporates several continuous processes that operate throughout the navigation sequence to ensure optimal performance and adaptation. Continuous monitoring provides ongoing performance tracking, quality assessment, strategy effectiveness evaluation, user satisfaction monitoring, and system optimization to maintain optimal operation and identify opportunities for improvement. The monitoring process tracks key performance indicators across multiple dimensions and provides real-time feedback that enables adaptive responses to changing conditions or emerging issues.

Adaptive learning enables the system to improve performance over time through pattern recognition, strategy refinement, context adaptation, performance improvement analysis, and knowledge accumulation. The learning process analyzes successful and unsuccessful navigation episodes to identify effective patterns and approaches while continuously refining strategies and adapting to new contexts and requirements. This adaptive capability ensures that the system becomes increasingly effective and sophisticated through accumulated experience and systematic learning.

Error handling provides robust exception detection, recovery strategies, graceful degradation capabilities, alternative routing options, and system stability maintenance to ensure reliable operation even when unexpected conditions or failures occur. The error handling framework includes comprehensive exception detection that identifies various types of failures or suboptimal conditions, recovery strategies that restore normal operation, when possible, graceful degradation that maintains reduced functionality when full recovery is not feasible, alternative routing that provides backup navigation options when primary approaches fail, and system stability mechanisms that prevent cascading failures and maintain overall system integrity.

The method characteristics define the operational properties that distinguish this approach from conventional media processing techniques, including sequential execution that ensures proper ordering of processing steps, iterative refinement that enables continuous improvement through repeated application and feedback, adaptive feedback that allows real-time adjustment based on performance monitoring and user interaction, quality validation that ensures adequate performance at each processing stage, continuous learning that accumulates knowledge and improves effectiveness over time, error resilience that maintains functionality despite unexpected conditions, performance optimization that maximizes efficiency and effectiveness across multiple evaluation dimensions, real-time adaptation that responds dynamically to changing requirements and conditions, context awareness that considers environmental and strategic factors in decision-making, strategic intelligence that aligns tactical decisions with broader objectives, scalable implementation that accommodates diverse application requirements and system configurations, multi-modal support that handles various types of spatiotemporal media content, and cognitive integration that combines geometric navigation with symbolic reasoning and strategic planning.

The complete method flow thus provides a comprehensive framework for transforming spatiotemporal media into intelligent navigation systems that support sophisticated exploration, analysis, and synthesis capabilities. The method's integration of advanced compression, geometric navigation, cognitive processing, and adaptive learning creates a robust approach that enables applications ranging from immersive media exploration and educational systems to scientific visualization and strategic analysis across diverse domains and use cases. The systematic progression through compression, trajectory mapping, anchor positioning, routing implementation, strategy caching, content generation, and output production ensures that each processing stage builds upon previous results while contributing to the overall goal of creating intelligent, navigable representations of spatiotemporal media content.

Figure 35:
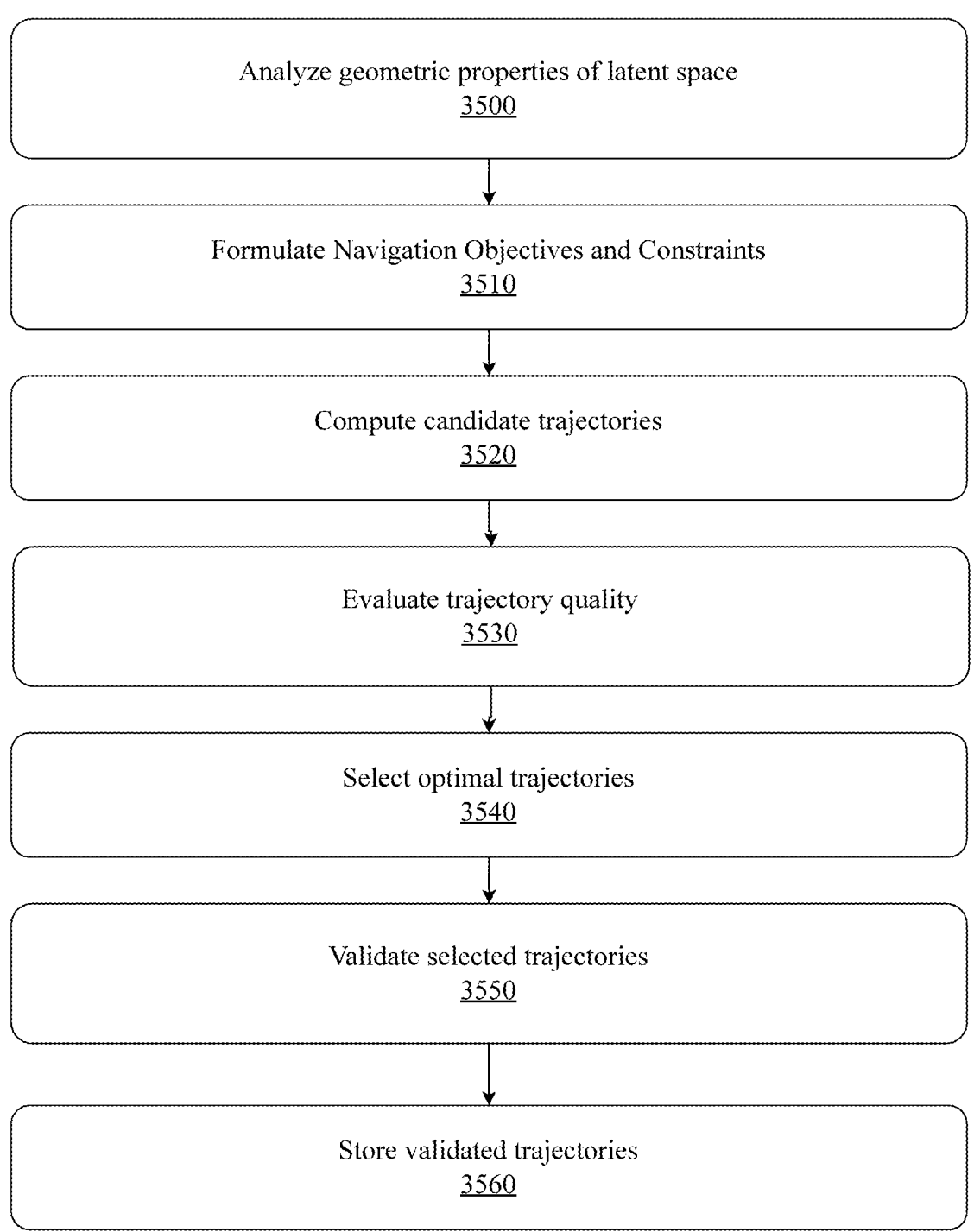
FIG. 35 is a flow diagram illustrating an exemplary method for geodesic trajectory mapping within latent hyperspaces.

FIG. 35 is a flow diagram illustrating an exemplary method for geodesic trajectory mapping within latent hyperspaces, providing a detailed procedural framework for computing optimal navigation paths through high-dimensional manifolds using sophisticated geometric analysis and mathematical optimization techniques. This method implements the core computational functionality required for intelligent navigation within spatiotemporal media representations, combining principles from differential geometry, optimal control theory, and computational mathematics to identify and validate trajectories that optimize multiple competing objectives while respecting the intrinsic geometric structure and semantic constraints of the latent hyperspace.

The method begins with step 3500, where the geometric properties of the latent space are analyzed to provide the mathematical foundation for all subsequent trajectory calculations. This comprehensive geometric analysis includes computation of local curvature measures such as Ricci curvature, sectional curvature, and mean curvature to understand how the manifold curves in different regions and how these curvature properties affect geodesic path formation and optimization strategies. The analysis of density variations and information distribution examines how semantic information is distributed throughout the latent space, identifying regions of high information density that may require special consideration during path planning and regions of low density that may offer efficient transit corridors for navigation optimization. The identification of topological features and connectivity patterns examines the global structural properties of the manifold, including critical points, saddle regions, topological obstacles, and connectivity relationships that may affect path feasibility and optimization strategies.

A decision point evaluates whether the geometric analysis is sufficiently comprehensive for reliable trajectory computation. If the geometric analysis is incomplete or insufficient, the method returns to step 3500 with enhanced analysis parameters or alternative geometric computation approaches. If the analysis is complete and adequate, the method proceeds to objective formulation, ensuring that trajectory calculations are based on comprehensive geometric understanding.

Step 3510 involves formulating navigation objectives and constraints in mathematical terms that can be incorporated into trajectory optimization algorithms. This formulation process transforms high-level goals into mathematical expressions by converting abstract objectives such as "find similar content," "explore creative variations," or "maintain temporal consistency" into quantitative measures and mathematical functions that can be optimized computationally. The definition of constraint equations for operational boundaries establishes mathematical representations of limitations such as resource constraints, temporal requirements, accessibility restrictions, and semantic coherence requirements that must be satisfied during trajectory optimization. The establishment of optimization criteria and performance metrics creates comprehensive evaluation frameworks that enable quantitative assessment of trajectory quality across multiple dimensions including efficiency, effectiveness, semantic coherence, and strategic alignment.

In step 3520, candidate trajectories are computed using differential geometry techniques and optimal control methods that account for the curved nature of the latent manifold and the complex optimization requirements established in the previous step. The application of differential geometry techniques involves solving geodesic equations of the form $d^2\gamma^i/dt^2 + \Gamma^i_{jk}(d\gamma^j/dt)(d\gamma^k/dt) = 0$, where $\gamma$ represents the trajectory path and $\Gamma^i_{jk}$ represents the Christoffel symbols encoding the manifold's geometric structure. The use of optimal control methods for path optimization applies advanced mathematical techniques such as variational calculus, Pontryagin's maximum principle, and dynamic programming to identify trajectories that optimize specified objective functions while satisfying operational constraints. The accounting for curved manifold geometry and constraints ensures that trajectory computation respects the intrinsic geometric properties of the latent space and incorporates all relevant limitations and requirements established during the formulation process.

Step 3530 evaluates trajectory quality using comprehensive assessment criteria that consider multiple dimensions of trajectory effectiveness and suitability. The assessment of path efficiency and geometric optimality analyzes whether computed trajectories achieve their navigation objectives with minimal resource expenditure and optimal geometric properties such as minimal length, curvature, or energy consumption. The evaluation of semantic coherence and meaningful transitions examines whether trajectories maintain conceptual consistency and logical progression throughout their length, ensuring that navigation paths produce semantically meaningful and contextually appropriate experiences. The checking of alignment with objectives and feasibility verifies that computed trajectories satisfy the original navigation goals and can be executed successfully within the operational constraints and resource limitations of the system.

A decision point determines whether the computed trajectories meet quality standards for subsequent selection and validation. If trajectory quality is inadequate, the method returns to step 3520 to recompute trajectories with adjusted parameters, alternative optimization approaches, or modified constraint formulations. If trajectory quality is acceptable, the method proceeds to trajectory selection, ensuring that only adequately optimized paths enter the selection and validation pipeline.

Step 3540 selects optimal trajectories from the candidate set using comprehensive evaluation criteria that balance multiple competing factors and strategic priorities. The comparison of candidates using comprehensive evaluation criteria involves systematic assessment of each trajectory across all relevant performance dimensions, including efficiency measures, quality indicators, constraint satisfaction levels, and strategic alignment scores. The balancing of multiple competing factors and strategic priorities implements sophisticated decision-making algorithms that consider trade-offs between different objectives when no single trajectory optimizes all criteria simultaneously. The choice of best paths for specific navigation scenarios involves contextual selection that considers the specific requirements, constraints, and objectives of particular navigation tasks to identify the most appropriate trajectories for each scenario.

Step 3550 validates selected trajectories to ensure feasibility and semantic coherence throughout their length before final storage and deployment. The verification of feasibility and execution requirements confirms that selected trajectories can be successfully executed within the operational constraints of the navigation system, considering factors such as computational requirements, memory limitations, processing time constraints, and resource availability. The ensuring of semantic coherence throughout trajectory length verifies that trajectories maintain meaningful conceptual relationships and logical progression from start to finish, preventing paths that would create semantic conflicts or conceptual discontinuities during navigation. The checking for discontinuities and potential conflicts identifies mathematical singularities, geometric inconsistencies, or logical contradictions that could compromise trajectory execution or produce unacceptable navigation results.

A decision point evaluates whether selected trajectories pass validation requirements for reliable deployment and use. If validation fails, the method returns to step 3540 to reselect trajectories using modified criteria or alternative selection strategies. If validation passes, the method proceeds to trajectory storage and documentation, ensuring that only validated, reliable trajectories are preserved for navigation execution.

Step 3560 stores validated trajectories with comprehensive metadata and documentation that enables efficient retrieval and effective utilization during navigation operations. The storage of trajectories with comprehensive metadata includes preservation of trajectory mathematical representations, geometric properties, optimization parameters, performance characteristics, and contextual information that may affect future utilization decisions. The documentation of properties, constraints, and usage contexts creates detailed records of trajectory characteristics, operational limitations, appropriate application scenarios, and performance expectations that enable informed trajectory selection and deployment decisions. The enabling of efficient retrieval and navigation execution implements sophisticated indexing and access mechanisms that support rapid trajectory identification and retrieval based on current navigation requirements and contextual conditions.

A mathematical framework provides the theoretical foundation supporting the geodesic computation process, incorporating essential mathematical expressions that govern trajectory optimization and geometric analysis. The geodesic equations $d^2\gamma^i/dt^2 + \Gamma^i_{jk}(d\gamma^j/dt)(d\gamma^k/dt) = 0$ define the fundamental mathematical relationships that determine optimal paths through curved manifolds, where the Christoffel symbols $\Gamma^i_{jk}$ encode the geometric structure of the latent space. The path length calculation $L[\gamma] = \int \sqrt{g(\dot{\gamma},\dot{\gamma})}dt$ provides the metric-based distance measure used to evaluate trajectory efficiency and optimize path selection based on geometric properties. The Ricci curvature computation $R_{ij} = R^k_{ikj}$ enables analysis of manifold curvature properties that influence geodesic behavior and trajectory optimization strategies. The optimization formulation minimize $J[\gamma] = \int L(\gamma,\dot{\gamma},t)dt$ subject to constraints provides the mathematical framework for incorporating multiple objectives and limitations into the trajectory computation process.

A computational methods framework implements the numerical and algorithmic techniques required for practical trajectory computation and optimization, including numerical integration schemes that solve differential equations governing geodesic paths, finite element discretization methods that approximate continuous optimization problems using discrete computational approaches, variational calculus methods that identify optimal trajectories through systematic optimization of objective functionals, shooting method algorithms that solve boundary value problems by iterative initial condition adjustment, collocation techniques that approximate optimal trajectories using polynomial interpolation and constraint satisfaction, boundary value solvers that handle trajectory optimization problems with specified endpoint conditions, optimization convergence algorithms that ensure reliable convergence to optimal solutions, constraint handling mechanisms that incorporate operational limitations into the optimization process, and error estimation procedures that assess the accuracy and reliability of computed trajectories.

The quality assessment framework provides comprehensive evaluation criteria for trajectory effectiveness and suitability, including path length optimization measures that assess geometric efficiency and resource utilization, curvature minimization criteria that evaluate trajectory smoothness and mathematical optimality, semantic coherence scores that quantify conceptual consistency and logical progression throughout trajectory length, constraint satisfaction levels that measure compliance with operational limitations and requirements, computational efficiency indicators that assess the resource requirements and processing time needed for trajectory execution, numerical stability measures that evaluate the mathematical robustness and reliability of computed trajectories, and robustness measures that assess trajectory performance under varying conditions and parameter uncertainties.

A storage organization framework implements sophisticated data management and access mechanisms that enable efficient trajectory storage, retrieval, and utilization, including hierarchical indexing structures that organize trajectories based on performance characteristics and application contexts, performance-based ranking systems that prioritize trajectories according to effectiveness measures and success probabilities, context-aware retrieval mechanisms that identify appropriate trajectories based on current navigation requirements and environmental conditions, similarity clustering algorithms that group related trajectories to enable efficient comparative analysis and selection, metadata preservation systems that maintain comprehensive trajectory documentation and property information, and efficient query support mechanisms that enable rapid trajectory identification and retrieval based on complex selection criteria.

The method properties framework defines the operational characteristics that distinguish this geodesic trajectory mapping approach from conventional pathfinding and navigation techniques, including mathematical rigor that ensures theoretical soundness and computational reliability, geometric consistency that respects the intrinsic structure and properties of the latent manifold, computational efficiency that enables practical implementation and real-time operation, semantic awareness that incorporates conceptual coherence and meaningful progression into trajectory optimization, iterative refinement that enables continuous improvement through feedback and adaptation, quality validation that ensures reliable performance and appropriate trajectory selection, context adaptivity that enables flexible response to varying navigation requirements and environmental conditions, performance optimization that maximizes effectiveness across multiple evaluation dimensions, scalable implementation that accommodates diverse application requirements and system configurations, robust design that maintains functionality despite parameter variations and unexpected conditions, systematic organization that ensures consistent and comprehensive trajectory management, and intelligent integration that enables seamless coordination with broader navigation and cognitive processing systems.

The complete geodesic trajectory mapping method thus provides a comprehensive computational framework for identifying and validating optimal navigation paths through high-dimensional latent hyperspaces using sophisticated mathematical analysis and optimization techniques. The method's integration of geometric analysis, mathematical optimization, quality assessment, and systematic validation creates a robust approach that enables reliable computation of trajectories that balance efficiency, effectiveness, semantic coherence, and strategic alignment while respecting the intrinsic geometric structure and operational constraints of the latent hyperspace navigation system.

Figure 36:
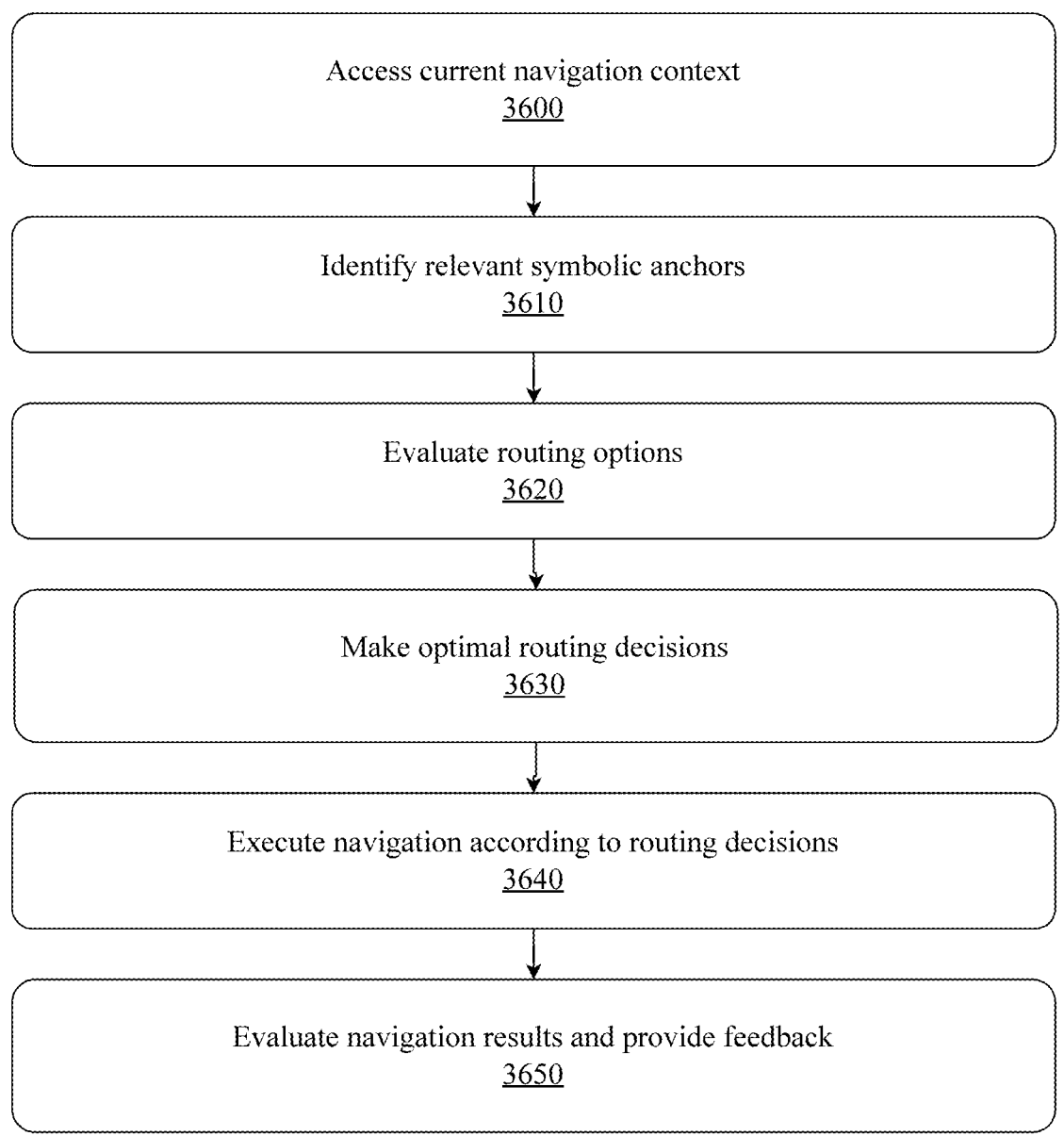
FIG. 36 is a flow diagram illustrating an exemplary method for spatiotemporal routing with symbolic anchor integration.

FIG. 36 is a flow diagram illustrating an exemplary method for spatiotemporal routing with symbolic anchor integration, providing a comprehensive procedural framework for intelligent navigation decision-making that leverages persistent cognitive landmarks within high-dimensional latent hyperspaces. This method integrates contextual analysis, anchor-based navigation strategies, and multi-scale temporal coordination to enable routing decisions that balance immediate navigation requirements with long-term strategic objectives while maintaining semantic coherence and temporal consistency throughout extended navigation sequences.

The method begins with step 3600, where current navigation context is assessed to provide comprehensive situational awareness that forms the foundation for all subsequent routing decisions. This contextual assessment includes determination of position within latent space and recent navigation history, providing spatial awareness of the current location within the high-dimensional manifold and temporal awareness of the path taken to reach the current position, including recent decisions, performance outcomes, and trajectory characteristics that may influence future routing strategies. The analysis of active objectives and strategic priorities examines the current goals, constraints, and success criteria that should guide routing decisions, including both immediate tactical objectives and longer-term strategic goals that may influence path selection and resource allocation. The evaluation of temporal constraints and resource availability assesses the operational limitations and capabilities that affect routing feasibility, including processing time limitations, computational resource constraints, memory availability, and other factors that may influence the scope and complexity of routing strategies that can be successfully implemented.

The decision point evaluates whether the contextual assessment provides sufficient information for reliable routing decisions. If the context analysis is incomplete or insufficient for effective decision-making, the method returns to step 3600 with enhanced assessment parameters or alternative analysis approaches. If the contextual information is adequate and comprehensive, the method proceeds to anchor identification, ensuring that routing decisions are based on complete situational understanding.

Step 3610 involves identifying relevant symbolic anchors based on semantic relevance, spatial proximity, and strategic significance to establish the cognitive landmarks that will guide navigation planning and execution. The evaluation of semantic relevance and spatial proximity analyzes the conceptual relationships between current navigation objectives and available anchors, considering both the thematic coherence of potential anchor targets and their geometric accessibility within the latent hyperspace structure. This evaluation includes semantic similarity assessment that measures the conceptual alignment between navigation goals and anchor meanings, and spatial proximity calculation that determines the geometric distance and accessibility of anchors from the current position. The assessment of strategic significance and navigational utility evaluates the potential value of different anchors for achieving navigation objectives, considering factors such as anchor connectivity to other important locations, historical effectiveness in similar navigation scenarios, and alignment with long-term strategic goals. The consideration of temporal alignment and objective support examines how potential anchors fit within the temporal structure of the navigation sequence and their ability to support the achievement of specified objectives within given time constraints and resource limitations.

A decision point determines whether suitable anchors are available for effective routing support. If no appropriate anchors are identified or available anchors are insufficient for navigation needs, the method returns to step 3600 to reassess the navigation context with modified parameters or alternative objectives. If relevant anchors are found and available for navigation support, the method proceeds to routing option evaluation.

Step 3620 evaluates routing options by analyzing multiple factors including path efficiency, semantic coherence, temporal consistency, and strategic alignment to identify optimal navigation strategies that balance competing requirements and constraints. The analysis of path efficiency and semantic coherence examines the geometric optimality and conceptual consistency of potential routing paths, considering factors such as path length, traversal difficulty, resource requirements, and the maintenance of meaningful semantic relationships throughout the navigation sequence. This analysis includes geometric efficiency assessment that evaluates path optimality using metrics such as geodesic length, curvature minimization, and energy consumption, and semantic coherence evaluation that ensures navigation paths maintain logical conceptual progression and avoid semantic conflicts or discontinuities. The assessment of temporal consistency and strategic alignment examines how potential routing options fit within the temporal structure of the navigation sequence and their contribution to achieving broader strategic objectives, including temporal flow preservation that maintains proper chronological ordering and causal relationships, and strategic goal support that ensures routing decisions contribute to long-term objective achievement. The consideration of resource requirements and constraint satisfaction evaluates the practical feasibility of different routing options within operational limitations, including computational resource assessment, processing time requirements, memory utilization, and compliance with specified constraints and limitations.

Step 3630 makes optimal routing decisions by balancing competing objectives and strategic priorities while accounting for both local optimization requirements and global strategic considerations. The balancing of competing objectives and strategic priorities involves sophisticated decision-making processes that consider trade-offs between different goals when simultaneous optimization is not possible, including objective prioritization that ranks different goals based on strategic importance and contextual requirements, trade-off optimization that finds acceptable compromises when objectives conflict, and priority weighting that allocates decision-making emphasis based on current strategic priorities and contextual factors. The accounting for local optimization and global considerations ensures that routing decisions optimize immediate navigation effectiveness while maintaining compatibility with broader strategic goals and long-term navigation requirements, including local efficiency optimization that maximizes immediate navigation performance, global consistency maintenance that ensures routing decisions support broader strategic objectives, and multi-scale coordination that balances immediate tactical requirements with strategic planning considerations. The selection of paths that maximize overall effectiveness involves comprehensive evaluation of routing options across multiple dimensions to identify strategies that provide optimal performance according to established criteria and constraints.

A decision point evaluates whether the routing decisions are optimal for current navigation requirements and constraints. If the routing decisions are suboptimal or fail to meet effectiveness criteria, the method returns to step 3620 to reevaluate routing options with modified parameters or alternative optimization approaches. If the routing decisions are optimal and meet quality standards, the method proceeds to navigation execution.

Step 3640 executes navigation according to selected routing decisions while implementing continuous monitoring and real-time adjustment capabilities to ensure optimal performance and adaptive response to changing conditions. The implementation of selected routing strategy with continuous monitoring involves systematic execution of chosen navigation approaches while maintaining ongoing assessment of progress, performance, and environmental conditions that may affect navigation success. This includes route execution that follows planned navigation paths while monitoring progress toward objectives, performance tracking that continuously assesses navigation effectiveness and efficiency, and environmental monitoring that detects changes in conditions that may require adaptive responses. The making of real-time adjustments for changing conditions enables dynamic adaptation to unexpected obstacles, emerging opportunities, or modified objectives without requiring complete re-planning of navigation strategies, including adaptive route modification that adjusts navigation paths based on current conditions, dynamic resource reallocation that optimizes resource utilization based on changing requirements, and opportunistic optimization that takes advantage of favorable conditions or unexpected opportunities. The maintenance of progress tracking and performance assessment provides ongoing feedback about navigation effectiveness and success probability, enabling informed decisions about continuation, modification, or termination of navigation activities.

Step 3650 evaluates navigation results and provides feedback to improve future routing decisions while identifying successful strategies for preservation and reuse. The assessment of objective achievement and efficiency measures evaluates the success of navigation activities across multiple dimensions, including goal attainment that measures the degree to which specified objectives were achieved, efficiency evaluation that assesses resource utilization and performance optimization, and quality assessment that examines the overall effectiveness and satisfaction with navigation outcomes. The identification of successful strategies for future use involves systematic analysis of effective navigation approaches to extract reusable patterns and principles, including pattern extraction that identifies key elements of successful navigation strategies, strategy generalization that creates reusable templates for similar navigation scenarios, and knowledge preservation that captures successful approaches for future reference and application. The updating of anchor relationships and routing knowledge involves systematic refinement of the navigation knowledge base based on experience and outcomes, including anchor relationship revision that updates understanding of connections and interactions between anchors, routing knowledge enhancement that incorporates new insights about effective navigation strategies, and performance model updating that refines predictive models based on observed outcomes and effectiveness measures.

A decision point determines whether navigation has been successful and objectives have been achieved. If navigation has failed or objectives have not been met, the method returns to step 3640 to retry navigation with modified approaches or alternative strategies. If navigation has been successful, the method can either conclude or continue with additional navigation activities, with the option to return to step 3620 for continued navigation in the same session.

An anchor analysis framework provides systematic approaches for evaluating and utilizing symbolic anchors within routing decisions, including semantic relevance assessment through content similarity evaluation and thematic coherence analysis that ensures anchors provide meaningful conceptual support for navigation objectives, spatial proximity evaluation through geometric distance calculation and accessibility assessment that determines the practical feasibility of anchor utilization, and strategic significance analysis through objective alignment scoring and priority weighting evaluation that assesses the value of different anchors for achieving strategic goals and supporting long-term navigation effectiveness.

A multi-scale coordination framework implements systematic management of navigation decisions across different temporal scales, ranging from immediate frame-level decisions (1-10 milliseconds) for real-time responsiveness, through short-term sequence-level planning (100 milliseconds to 1 second) for tactical coordination, medium-term scene-level coordination (1-10 seconds) for contextual management, long-term episode-level planning (10 seconds to minutes) for strategic sequence management, to strategic session-level coordination (minutes to hours) for comprehensive objective achievement. This framework ensures that decisions made at each temporal scale remain compatible and mutually supportive while enabling appropriate responses to the specific requirements and constraints of each time horizon.

A decision arbitration framework provides sophisticated mechanisms for resolving conflicts and optimizing routing choices when multiple competing factors must be considered, including objective prioritization that ranks goals based on strategic importance and contextual requirements, conflict resolution strategies that identify acceptable compromises when objectives cannot be simultaneously optimized, trade-off optimization that balances competing requirements to achieve acceptable overall performance, resource constraint handling that ensures routing decisions remain within operational limitations, strategic context integration that incorporates broader goals and long-term considerations into immediate decisions, performance prediction that estimates likely outcomes of different routing options, and risk assessment that evaluates potential negative consequences and mitigation strategies.

A performance monitoring framework implements comprehensive tracking and assessment of navigation effectiveness throughout execution, including real-time progress tracking that continuously monitors advancement toward objectives, efficiency measurement that assesses resource utilization and optimization, quality assessment that evaluates the effectiveness and satisfaction with navigation outcomes, objective achievement monitoring that tracks progress toward specified goals, resource utilization analysis that optimizes computational and operational resource allocation, adaptive adjustment triggers that identify conditions requiring dynamic response, and performance optimization mechanisms that continuously improve navigation effectiveness through experience and feedback.

A learning and adaptation framework enables continuous improvement of routing capabilities through systematic analysis of navigation experience and outcomes, including strategy effectiveness analysis that evaluates the success and efficiency of different routing approaches, pattern recognition and extraction that identifies successful navigation patterns for reuse, anchor relationship updates that refine understanding of anchor connections and utility, routing knowledge refinement that incorporates experience into the navigation knowledge base, context-strategy mapping that develops improved understanding of appropriate strategies for different scenarios, performance-based optimization that adjusts routing algorithms based on observed effectiveness, predictive model improvement that enhances forecasting accuracy through experience accumulation, adaptive parameter tuning that optimizes system configuration based on performance feedback, knowledge base expansion that incorporates new insights and capabilities, and continuous capability enhancement that enables increasingly sophisticated and effective routing performance over time.

Method characteristics define the operational properties that distinguish this spatiotemporal routing approach from conventional navigation techniques, including context-aware routing that considers comprehensive situational factors in decision-making, anchor-guided navigation that leverages persistent cognitive landmarks for strategic routing, multi-scale coordination that manages decisions across different temporal horizons, strategic optimization that balances immediate and long-term objectives, real-time adaptation that responds dynamically to changing conditions, quality validation that ensures routing decisions meet effectiveness criteria, performance monitoring that tracks navigation success and efficiency, iterative refinement that enables continuous improvement through experience, learning integration that incorporates accumulated knowledge into routing decisions, semantic coherence that maintains meaningful conceptual relationships throughout navigation, temporal consistency that preserves proper chronological ordering and causal relationships, and strategic intelligence that aligns tactical routing decisions with broader strategic objectives and long-term goals.

The complete spatiotemporal routing method thus provides a comprehensive framework for intelligent navigation decision-making that integrates contextual awareness, symbolic anchor utilization, multi-scale coordination, and adaptive learning to enable sophisticated routing strategies that optimize navigation effectiveness while maintaining semantic coherence and strategic alignment across diverse scenarios and application domains.

Figure 37:
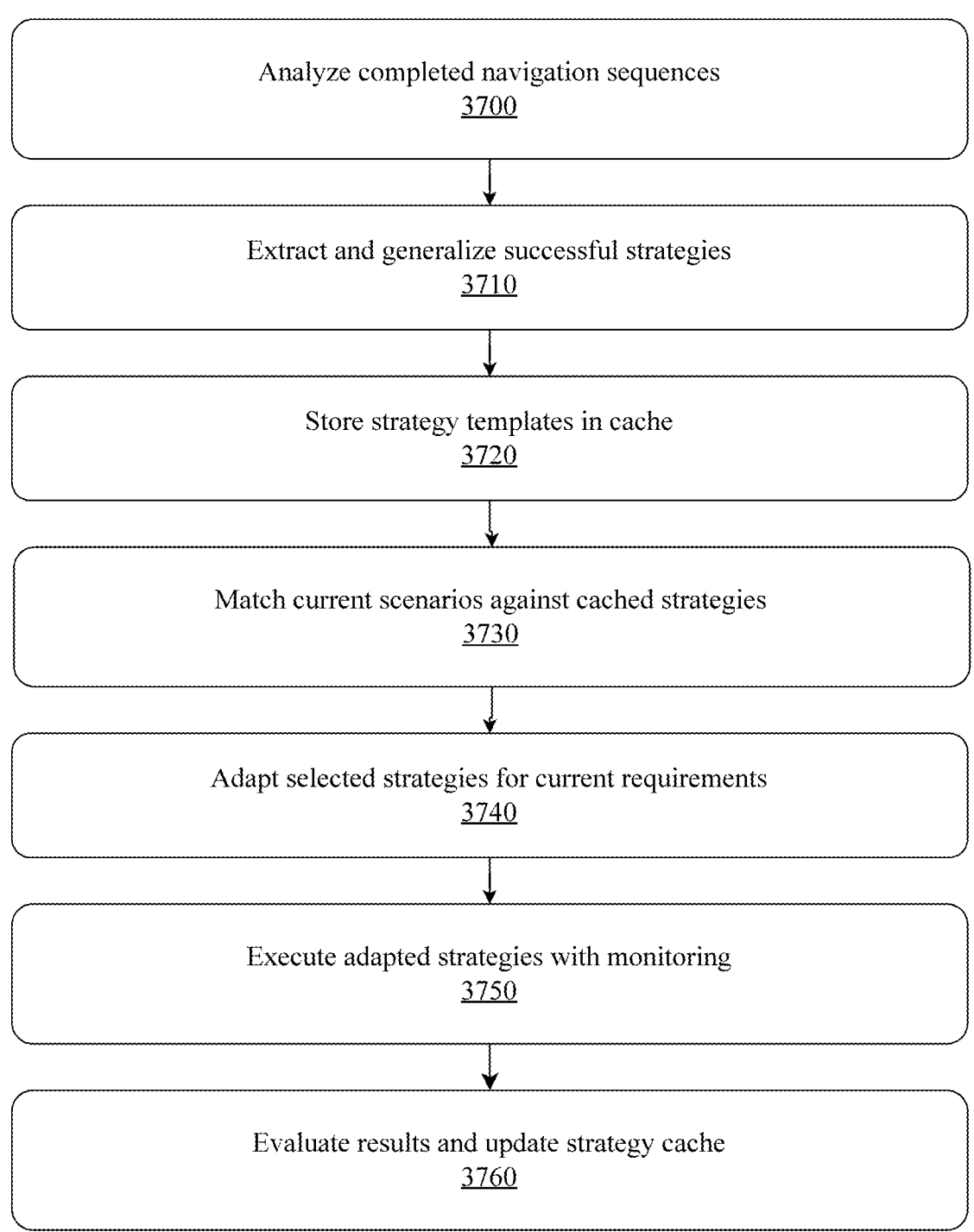
FIG. 37 is a flow diagram illustrating an exemplary method for strategy caching and reuse in cognitive media systems.

FIG. 37 is a flow diagram illustrating an exemplary method for strategy caching and reuse in cognitive media systems, providing a comprehensive procedural framework for systematic learning from navigation experience and intelligent application of accumulated knowledge to improve future performance. This method implements a sophisticated form of procedural memory that enables cognitive media systems to develop increasingly effective behaviors through experience accumulation, pattern recognition, and adaptive strategy application, creating a continuous improvement cycle that enhances navigation capabilities over time while preserving successful approaches for reuse across similar scenarios.

The method begins with step 3700, where completed navigation sequences are analyzed to identify successful strategies and the contextual conditions that contributed to their effectiveness. This comprehensive analysis includes identification of successful strategies and contextual conditions through systematic evaluation of navigation episodes to determine which approaches achieved their objectives effectively and efficiently, considering multiple dimensions of success including goal attainment, resource utilization, temporal performance, user satisfaction, and strategic alignment. The evaluation of effectiveness measures and outcome quality involves quantitative assessment of navigation performance using established metrics and criteria, including efficiency measurements that assess resource utilization and optimization, quality indicators that evaluate the overall effectiveness and satisfaction with navigation outcomes, and success probabilities that quantify the likelihood of achieving desired objectives under similar conditions. The extraction of decision patterns and performance metrics involves systematic analysis of the decision-making processes and behavioral patterns that characterized successful navigation episodes, including decision sequence analysis that identifies effective choice patterns and timing, navigation path characterization that captures optimal routing strategies and trajectory properties, and performance quantification that establishes measurable indicators of strategy effectiveness across multiple evaluation dimensions.

A decision point evaluates whether the strategy analysis has identified patterns of sufficient quality for generalization and template creation. If the strategy quality is inadequate or patterns are insufficient for reliable extraction, the method returns to step 3700 to reanalyze navigation sequences with enhanced analysis parameters or alternative evaluation approaches. If strategy quality is adequate for generalization, the method proceeds to strategy extraction and template creation.

Step 3710 extracts and generalizes successful strategies to create reusable templates that can be applied across similar but not identical scenarios. The creation of reusable templates from specific instances involves sophisticated abstraction processes that identify the core principles underlying successful strategies while removing scenario-specific details that might limit broader applicability, including template creation algorithms that formalize successful patterns into structured representations, abstraction layer development that captures strategy characteristics at multiple levels of detail from high-level approaches to specific implementations, and parameter identification that distinguishes between variable elements that can be adjusted for different contexts and fixed elements that must be preserved to maintain strategy effectiveness. The identification of core principles while abstracting details implements systematic approaches for distinguishing between essential strategy characteristics and incidental features, including core principle extraction that identifies the fundamental approaches and decision criteria that enabled success, scenario-specific filtering that removes context-dependent details that would limit strategy reusability, and applicability range definition that establishes the scope of scenarios where strategies are likely to remain effective. The parameterization of strategies for broader applicability creates flexible strategy representations that can be systematically adapted to different contexts while maintaining their essential effectiveness characteristics, including parameter adjustment mechanisms that enable systematic modification of strategy variables, context-specific adaptation protocols that guide strategy modification based on scenario requirements, and quality preservation techniques that ensure adaptations maintain the essential characteristics that enabled original strategy success.

Step 3720 stores strategy templates in the cache with comprehensive metadata and documentation that enables efficient retrieval and effective utilization during future navigation activities. The storage of templates with comprehensive metadata includes preservation of strategy mathematical representations, performance characteristics, contextual requirements, applicability criteria, and historical effectiveness data that may affect future utilization decisions, including hierarchical organization systems that structure strategies based on performance levels and application domains, performance-based indexing mechanisms that enable efficient retrieval based on effectiveness measures and success criteria, and similarity clustering algorithms that group related strategies to enable efficient comparative analysis and selection. The documentation of properties and appropriate usage contexts creates detailed records of strategy characteristics, operational limitations, appropriate application scenarios, and performance expectations that enable informed strategy selection and deployment decisions, including metadata preservation systems that maintain comprehensive strategy documentation and property information, usage guideline development that creates operational instructions for effective strategy application, and context specification frameworks that define the conditions under which strategies are most effective. The enabling of efficient retrieval and similarity matching implements sophisticated search and access mechanisms that support rapid strategy identification based on current requirements and contextual conditions, including efficient query support mechanisms that enable complex strategy searches based on multiple criteria, similarity assessment algorithms that identify strategies most appropriate for current scenarios, and retrieval optimization techniques that minimize search time while maximizing selection accuracy.

Step 3730 matches current navigation scenarios against cached strategies to identify potentially applicable approaches through comprehensive similarity assessment and compatibility analysis. The assessment of contextual similarity and objective alignment involves systematic comparison between current scenarios and the historical contexts where cached strategies demonstrated effectiveness, including scenario similarity assessment that analyzes correspondence across multiple dimensions of context and requirements, contextual feature matching that compares specific environmental and operational factors, and objective alignment scoring that evaluates how well strategy goals match current navigation objectives. The evaluation of constraint compatibility and applicability examines whether current operational constraints and limitations are compatible with the requirements and assumptions underlying cached strategies, including constraint compatibility checking that identifies potential conflicts between strategy requirements and current limitations, resource requirement analysis that assesses whether adequate resources are available for strategy execution, and applicability assessment that determines whether strategies can be successfully applied under current conditions. The prediction of effectiveness based on historical performance involves systematic estimation of likely strategy outcomes in current scenarios based on previous results and contextual analysis, including performance prediction algorithms that estimate expected outcomes based on scenario similarity and historical data, confidence scoring mechanisms that quantify the reliability of effectiveness predictions, and multi-criteria ranking systems that prioritize strategies based on predicted performance across multiple evaluation dimensions.

A decision point determines whether suitable strategy matches have been found for current navigation requirements. If no adequate matches are identified, the method returns to step 3720 to broaden search criteria or modify matching parameters to identify potentially applicable strategies. If suitable matches are found, the method proceeds to strategy adaptation and optimization.

Step 3740 adapts selected strategies for current requirements when direct application is not optimal, implementing sophisticated modification techniques that preserve essential effectiveness characteristics while adjusting approaches to match current contextual requirements and constraints. The adjustment of parameters and modification of paths as needed involves systematic adaptation of strategy variables and routing approaches to optimize performance for current scenarios, including parameter adjustment algorithms that modify strategy variables based on current requirements and constraints, path modification techniques that adapt navigation routes to accommodate current spatial, temporal, and semantic conditions, and context-specific adaptation protocols that guide systematic strategy modification based on scenario-specific factors. The combination of elements from multiple strategies if beneficial creates hybrid approaches that leverage the most effective components from different cached strategies when no single strategy provides optimal coverage for current requirements, including hybrid strategy combination algorithms that intelligently merge elements from multiple approaches, component compatibility analysis that ensures combined elements work effectively together, and integration optimization techniques that create coherent unified strategies from multiple source approaches. The optimization for current constraints and objectives involves systematic tuning of adapted strategies to maximize their performance in current scenarios while respecting operational limitations and requirements, including optimization tuning methods that fine-tune strategy parameters for maximum effectiveness, quality preservation mechanisms that ensure adaptations maintain essential success characteristics, and real-time modification capabilities that enable dynamic strategy adjustment during execution.

Step 3750 executes adapted strategies with continuous monitoring and real-time adjustment capabilities to ensure optimal performance and adaptive response to changing conditions during navigation implementation. The implementation of strategies while tracking effectiveness involves systematic execution of chosen approaches while maintaining ongoing assessment of progress, performance, and environmental conditions that may affect strategy success, including strategy execution protocols that implement chosen approaches while monitoring progress toward objectives, performance tracking systems that continuously assess strategy effectiveness and efficiency, and environmental monitoring mechanisms that detect changes in conditions that may require adaptive responses. The making of real-time adjustments as needed enables dynamic adaptation to unexpected obstacles, emerging opportunities, or modified objectives without requiring complete re-planning of navigation strategies, including adaptive modification algorithms that adjust strategy execution based on current conditions, dynamic optimization techniques that optimize strategy performance in real-time, and contingency handling protocols that manage unexpected situations while maintaining strategy coherence. The monitoring of performance and outcome quality provides ongoing feedback about strategy effectiveness and success probability, enabling informed decisions about continuation, modification, or alternative strategy selection, including quality assessment mechanisms that evaluate strategy performance across multiple dimensions, outcome measurement systems that quantify strategy success and effectiveness, and feedback generation protocols that provide actionable information for strategy improvement and optimization.

A decision point evaluates whether strategy execution has been successful and objectives have been achieved. If execution has failed or performance is inadequate, the method returns to step 3740 to readapt strategies with modified parameters or alternative adaptation approaches. If execution has been successful, the method proceeds to result evaluation and cache updating.

Step 3760 evaluates strategy execution results and updates the strategy cache with improved strategies and refined effectiveness measures to enable continuous improvement of the caching system through experience accumulation. The assessment of strategy execution effectiveness and outcomes involves comprehensive evaluation of strategy performance across multiple dimensions to determine success levels and identify improvement opportunities, including strategy effectiveness assessment that measures goal achievement and performance optimization, outcome quality measurement that evaluates the overall satisfaction and success of navigation results, and performance trend analysis that identifies patterns and improvements in strategy effectiveness over time. The updating of cache with improved strategies and metrics involves systematic incorporation of experience-based improvements into the strategy repository, including cache integration protocols that add new successful strategies to the repository, performance metric updating that refines effectiveness measures based on observed outcomes, and strategy ranking adjustment that modifies priority and selection criteria based on accumulated performance data. The refinement of effectiveness measures and applicability data involves systematic improvement of the evaluation criteria and selection mechanisms used for strategy assessment and application, including learning rate optimization that adjusts the speed and accuracy of strategy improvement processes, predictive model enhancement that improves forecasting accuracy through experience accumulation, and knowledge base expansion that incorporates new insights and capabilities into the strategy caching system.

A strategy analysis framework provides systematic approaches for extracting valuable patterns and insights from completed navigation sequences, including success identification mechanisms that implement objective achievement assessment and efficiency metric evaluation to determine which navigation episodes warrant pattern extraction, pattern recognition algorithms that perform decision sequence analysis and navigation path characterization to identify reusable behavioral patterns, context analysis procedures that implement environmental condition mapping and constraint identification to understand the conditions that influenced strategy effectiveness, and effectiveness metrics systems that provide performance quantification and outcome assessment to enable data-driven strategy evaluation and improvement.

A generalization engine implements sophisticated abstraction and template creation mechanisms that transform specific successful strategies into broadly applicable patterns, including template creation algorithms that formalize successful navigation patterns into structured reusable representations, abstraction layer development that captures strategy characteristics at multiple levels of detail to enable flexible application, parameter identification procedures that distinguish between variable and fixed strategy elements to enable systematic adaptation, reusability analysis mechanisms that assess the potential applicability of strategies across different scenarios, core principle extraction algorithms that identify the fundamental approaches underlying successful strategies, scenario-specific filtering procedures that remove context-dependent details that would limit broader applicability, and applicability range definition protocols that establish the scope of scenarios where strategies are likely to remain effective.

A cache management framework provides sophisticated organization and access mechanisms for efficient strategy storage and retrieval, including hierarchical organization systems that structure strategies based on performance characteristics and application domains, performance-based indexing mechanisms that enable rapid retrieval based on effectiveness criteria and success measures, similarity clustering algorithms that group related strategies to facilitate comparative analysis and selection, metadata preservation systems that maintain comprehensive strategy documentation and property information, efficient retrieval support mechanisms that enable rapid strategy identification based on complex selection criteria, cache optimization procedures that maintain optimal organization and access performance, and storage consolidation techniques that manage cache size and organization efficiency while preserving strategy accessibility and utility.

A matching algorithms framework implements comprehensive similarity assessment and compatibility analysis capabilities that enable intelligent strategy selection based on scenario characteristics and requirements, including scenario similarity assessment procedures that analyze correspondence between current conditions and historical strategy contexts, contextual feature matching algorithms that compare specific environmental and operational factors across scenarios, objective alignment scoring mechanisms that evaluate compatibility between strategy goals and current navigation objectives, constraint compatibility checking procedures that identify potential conflicts between strategy requirements and current operational limitations, resource requirement analysis algorithms that assess whether adequate capabilities are available for strategy execution, performance prediction mechanisms that estimate likely strategy outcomes based on scenario similarity and historical effectiveness data, confidence scoring systems that quantify the reliability of strategy selection and effectiveness predictions, multi-criteria ranking algorithms that prioritize strategies based on comprehensive evaluation across multiple performance dimensions, and adaptive threshold tuning procedures that optimize strategy selection criteria based on accumulated experience and performance feedback.

An adaptation mechanism framework provides sophisticated strategy modification capabilities that enable effective application of cached strategies to new contexts while preserving their essential effectiveness characteristics, including parameter adjustment algorithms that systematically modify strategy variables based on current requirements and constraints, path modification techniques that adapt navigation routes to accommodate current spatial, temporal, and semantic conditions, hybrid strategy combination procedures that intelligently merge elements from multiple cached approaches when beneficial, optimization tuning methods that fine-tune adapted strategies for maximum effectiveness in current scenarios, context-specific adaptation protocols that guide systematic strategy modification based on scenario-specific requirements, real-time modification capabilities that enable dynamic strategy adjustment during execution based on changing conditions, and quality preservation mechanisms that ensure strategy adaptations maintain the essential characteristics that enabled original success.

A performance evaluation and learning framework enables continuous improvement of strategy caching effectiveness through systematic analysis of outcomes and refinement of system capabilities, including strategy effectiveness assessment procedures that measure goal achievement and performance optimization across multiple evaluation dimensions, outcome quality measurement systems that evaluate overall satisfaction and success of strategy application results, performance trend analysis algorithms that identify patterns and improvements in strategy effectiveness over time, and learning rate optimization mechanisms that adjust the speed and accuracy of strategy improvement processes based on accumulated experience and performance feedback.

Method characteristics define the operational properties that distinguish this strategy caching and reuse approach from conventional learning and adaptation techniques, including experience-based learning that accumulates knowledge through systematic analysis of navigation outcomes and performance patterns, pattern recognition and reuse that identifies successful behavioral patterns for application across similar scenarios, adaptive strategy matching that intelligently selects appropriate cached strategies based on scenario similarity and compatibility analysis, context-aware application that considers environmental and operational factors in strategy selection and adaptation, continuous improvement that enables increasingly sophisticated and effective performance through accumulated experience, performance optimization that maximizes strategy effectiveness through systematic refinement and adaptation, knowledge accumulation that builds comprehensive repositories of successful approaches and behavioral patterns, strategic intelligence that aligns tactical strategy application with broader navigation objectives and long-term goals, procedural memory that preserves successful behavioral patterns and decision-making approaches for future reuse, scalable implementation that accommodates diverse application requirements and system configurations while maintaining effectiveness, quality assurance that ensures strategy selection and adaptation maintain effectiveness standards and reliability requirements, and systematic organization that enables consistent and comprehensive strategy management and application across diverse scenarios and operational contexts.

The complete strategy caching and reuse method thus provides a comprehensive framework for learning from navigation experience and applying accumulated knowledge to improve future performance through intelligent strategy selection, adaptation, and optimization. The method's integration of pattern extraction, generalization, contextual matching, adaptive modification, and continuous learning creates a robust procedural memory capability that enables systematic improvement and increasingly sophisticated navigation behaviors through experience-based knowledge accumulation and intelligent strategy reuse across diverse scenarios and application domains.

Exemplary Computing Environment

Figure 38:
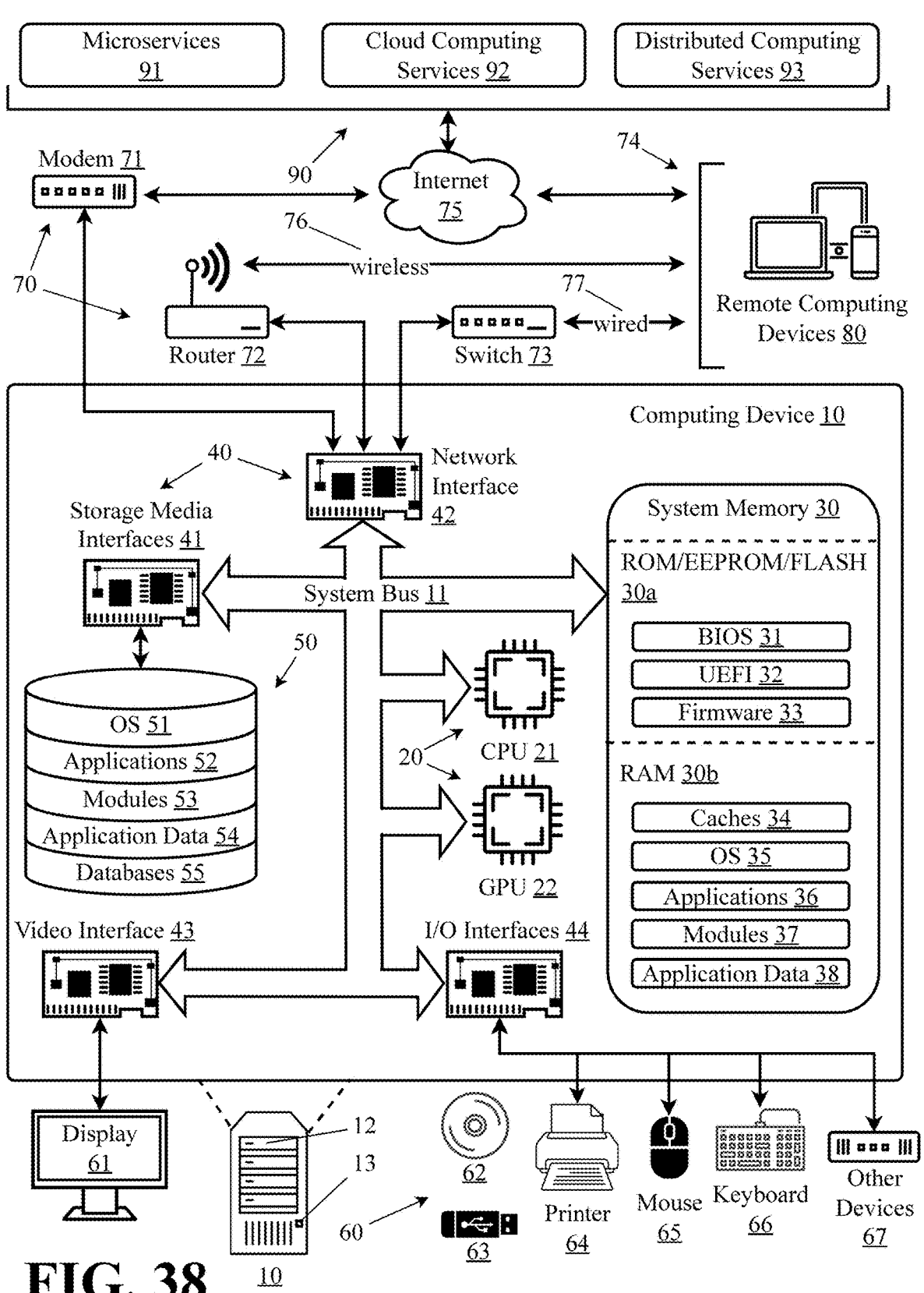
FIG. 38 illustrates an exemplary computing environment on which an embodiment described herein may be implemented, in full or in part.

FIG. 38 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containered or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions. The skilled person will be aware of a range of possible modifications of the various aspects described above. Accordingly, the present invention is defined by the claims and their equivalents.

What is claimed is:

1. A computer system for spatiotemporal media compression and navigation, comprising:

a hardware memory, wherein the computer system is configured to execute software instructions stored on nontransitory machine-readable storage media that:

obtain a plurality of spatiotemporal media input data sets comprising video data organized as three-dimensional tensors;

compress the input data sets into compressed mini-Lorentzian representations using a plurality of Lorentzian autoencoders that preserve tensor structure and spatiotemporal relationships through three-dimensional convolutional operations;

establish a latent hyperspace with geometric manifold structure organizing the compressed representations as navigable geodesic trajectories;

compute optimal navigation paths through the latent hyperspace using differential geometry principles that solve geodesic equations accounting for manifold curvature;

position symbolic anchors at locations within the latent hyperspace determined by content analysis algorithms to identify at least one of decision points, semantic boundaries, navigation waypoints, and temporal references;

implement spatiotemporal routing protocols configured to coordinate navigation decisions across multiple temporal scales;

train a correlation network using sets of cross-correlated training data sets;

decompress the compressed data sets using a plurality of three-dimensional convolutional decoders corresponding to the plurality of Lorentzian autoencoders; and restore data lost during compression using the trained correlation network to generate output data sets;

cache successful navigation strategies by extracting navigation patterns and storing them as reusable templates; and generate synthetic content during navigation using generative algorithms to support exploration beyond original media boundaries while maintaining temporal consistency across consecutive frames.

2. The computer system of claim 1, wherein the plurality of Lorentzian autoencoders comprise hierarchical encoders operating at multiple levels, each level configured to capture features at different scales from global scene structure to fine-grained details.

3. The computer system of claim 2, wherein the plurality of three-dimensional convolutional decoders comprise hierarchical decoders corresponding to the hierarchical encoders, configured to progressively reconstruct the spatiotemporal media from coarse to fine resolution levels.

4. The computer system of claim 1, wherein computing optimal navigation paths comprises solving the geodesic equation.

5. The computer system of claim 1, wherein the spatiotemporal routing protocols implement multi-scale temporal coordination with time horizons ranging from 1-10 milliseconds for frame-level decisions to minutes for session-level planning.

6. The computer system of claim 1, wherein caching successful navigation strategies comprises:

analyzing completed navigation sequences to identify patterns achieving specified performance criteria;

extracting core principles from successful patterns while filtering scenario-specific details; and storing generalized templates with performance metrics and applicability criteria.

7. The computer system of claim 1, wherein generating synthetic content comprises implementing infinite zoom capability by:

receiving user input specifying a region of interest and magnification level;

determining current magnification level relative to original media resolution;

selecting appropriate hierarchical representation levels based on the magnification level; and applying the generative algorithms to create visual details maintaining consistency with surrounding content characteristics.

8. The computer system of claim 7, wherein the generative algorithms comprise at least one of latent diffusion models, neural radiance fields, and detail synthesis generators trained on domain-specific visual pattern databases.

9. The computer system of claim 1, wherein the correlation network employs cross-modal fusion algorithms configured to combine text descriptions, sensor readings, and image data into unified latent representations.

10. The computer system of claim 1, wherein maintaining temporal consistency comprises applying coherence validation algorithms that analyze frame-to-frame stability metrics and adjust generated content to prevent visual artifacts across consecutive frames.

11. A computer-implemented method for latent hyperspace navigation in spatiotemporal media, comprising the steps of:

obtaining a plurality of spatiotemporal media input data sets comprising video data organized as three-dimensional tensors;

compressing the input data sets into compressed mini-Lorentzian representations using a plurality of Lorentzian autoencoders that preserve tensor structure and spatiotemporal relationships;

establishing a latent hyperspace with geometric manifold structure organizing the compressed representations as navigable geodesic trajectories;

computing optimal navigation paths through the latent hyperspace using differential geometry principles that solve geodesic equations accounting for manifold curvature;

positioning symbolic anchors at locations within the latent hyperspace determined by content analysis algorithms to identify at least one of decision points, semantic boundaries, navigation waypoints, and temporal references;

implementing spatiotemporal routing protocols configured to coordinate navigation decisions across multiple temporal scales;

training a correlation network using sets of cross-correlated training data sets;

decompressing the compressed representations using a plurality of three-dimensional convolutional decoders corresponding to the plurality of Lorentzian autoencoders;

restoring data lost during compression using the trained correlation network to generate enhanced output data sets;

caching successful navigation strategies by extracting navigation patterns and storing them as reusable templates;

generating synthetic content during navigation using generative algorithms to support exploration beyond original media boundaries while maintaining temporal consistency across consecutive frames.

12. The computer-implemented method of claim 11, wherein the plurality of Lorentzian autoencoders comprise hierarchical encoders operating at multiple levels, each level configured to capture features at different scales from global scene structure to fine-grained details.

13. The computer-implemented method of claim 12, wherein the plurality of three-dimensional convolutional decoders comprises hierarchical decoders corresponding to the hierarchical encoders, configured to progressively reconstruct the spatiotemporal media from coarse to fine resolution levels.

14. The computer-implemented method of claim 11, wherein computing optimal navigation paths comprises solving the geodesic equation.

15. The computer-implemented method of claim 11, wherein the spatiotemporal routing protocols implement multi-scale temporal coordination with time horizons ranging from 1-10 milliseconds for frame-level decisions to minutes for session-level planning.

16. The computer-implemented method of claim 11, wherein caching successful navigation strategies comprises:

analyzing completed navigation sequences to identify patterns achieving specified performance criteria;

extracting core principles from successful patterns while filtering scenario-specific details; and storing generalized templates with performance metrics and applicability criteria.

17. The computer-implemented method of claim 11, wherein generating synthetic content comprises implementing infinite zoom capability by:

receiving user input specifying a region of interest and magnification level; determining current magnification level relative to original media resolution;

selecting appropriate hierarchical representation levels based on the magnification level; and applying the generative algorithms to create visual details maintaining consistency with surrounding content characteristics.

18. The computer-implemented method of claim 17, wherein the generative algorithms comprise at least one of latent diffusion models, neural radiance fields, and detail synthesis generators trained on domain-specific visual pattern databases.

19. The computer-implemented method of claim 11, wherein the correlation network employs cross-modal fusion algorithms configured to combine text descriptions, sensor readings, and image data into unified latent representations.

20. The computer-implemented method of claim 11, wherein maintaining temporal consistency comprises applying coherence validation algorithms that analyze frame-to-frame stability metrics and adjust generated content to prevent visual artifacts across consecutive frames.

* * * * *